United States Patent
Rappon et al.

(10) Patent No.: US 12,092,905 B2
(45) Date of Patent: Sep. 17, 2024

(54) METHODS AND DEVICES FOR REDUCING MYOPIA IN CHILDREN

(71) Applicant: SIGHTGLASS VISION, INC., Palo Alto, CA (US)

(72) Inventors: Joseph Michael Rappon, Southlake, TX (US); Thomas W. Chalberg, Jr., Menlo Park, CA (US); Vanessa Anne Tasso-Pinas, Paso Robles, CA (US); Yufen Chung, Pacifica, CA (US); Peter Hones, Menlo Park, CA (US)

(73) Assignee: SightGlass Vision, Inc., Dallas, TX (US)

( * ) Notice: Subject to any disclaimer, the term of this patent is extended or adjusted under 35 U.S.C. 154(b) by 808 days.

(21) Appl. No.: 17/259,779

(22) PCT Filed: Jul. 12, 2019

(86) PCT No.: PCT/US2019/041605
§ 371 (c)(1),
(2) Date: Jan. 12, 2021

(87) PCT Pub. No.: WO2020/014613
PCT Pub. Date: Jan. 16, 2020

(65) Prior Publication Data
US 2022/0035179 A1    Feb. 3, 2022

Related U.S. Application Data

(60) Provisional application No. 62/808,214, filed on Feb. 20, 2019, provisional application No. 62/697,348, filed on Jul. 12, 2018.

(51) Int. Cl.
G02C 7/06    (2006.01)
G02C 7/02    (2006.01)

(52) U.S. Cl.
CPC ............. *G02C 7/061* (2013.01); *G02C 7/022* (2013.01); *G02C 2202/24* (2013.01)

(58) Field of Classification Search
CPC ............................... G02C 7/022; G02C 7/061
USPC ..................................... 351/159.42
See application file for complete search history.

(56) References Cited

U.S. PATENT DOCUMENTS

| | | |
|---|---|---|
| 149,270 A | 3/1847 | Watson |
| 338,003 A | 3/1886 | Ward |
| 506,983 A | 10/1893 | Diemmer et al. |
| 712,466 A | 10/1902 | Taylor |

(Continued)

FOREIGN PATENT DOCUMENTS

| | | |
|---|---|---|
| AU | 2005289302 | 4/2006 |
| CN | 1909860 | 2/2007 |

(Continued)

OTHER PUBLICATIONS

Ahern "Biochemical, reagents kits offer scientists good return on investment," The Scientist, Jul. 1995, 9(15):20.

(Continued)

*Primary Examiner* — James R Greece
(74) *Attorney, Agent, or Firm* — Fish & Richardson P.C.

(57) ABSTRACT

Methods and devices for treating a human child having myopia are disclosed. For example, a human child having myopia can be treated by wearing spectacles having one or two myopia control spectacle lenses.

23 Claims, 40 Drawing Sheets

(56) References Cited

U.S. PATENT DOCUMENTS

| | | | |
|---|---|---|---|
| 1,959,915 | A | 5/1934 | Guthrie |
| 3,507,566 | A | 4/1970 | Knapp |
| 4,194,814 | A | 3/1980 | Fischer et al. |
| 4,338,003 | A | 7/1982 | Adrian |
| 4,704,016 | A | 11/1987 | de Carle |
| 4,710,327 | A | 12/1987 | Neefe |
| 4,889,421 | A | 12/1989 | Cohen |
| 4,909,818 | A | 3/1990 | Jones |
| 5,034,100 | A | 7/1991 | Sides |
| 5,044,742 | A | 9/1991 | Cohen |
| 5,116,112 | A | 5/1992 | Rawlings |
| 5,260,727 | A | 11/1993 | Oksman et al. |
| 5,585,968 | A | 12/1996 | Guhman et al. |
| 5,800,992 | A | 9/1998 | Fodor et al. |
| 5,837,461 | A | 11/1998 | Neitz |
| 5,867,247 | A | 2/1999 | Martin et al. |
| 5,905,561 | A | 5/1999 | Lee et al. |
| 5,926,250 | A | 7/1999 | Mukaiyama et al. |
| 6,149,270 | A | 11/2000 | Hayashi |
| 6,343,861 | B1 | 2/2002 | Kris et al. |
| 6,582,908 | B2 | 6/2003 | Fodor et al. |
| 6,706,867 | B1 | 3/2004 | Lorenz |
| 6,712,466 | B2 | 3/2004 | Dreher |
| 6,712,467 | B1 | 3/2004 | Kitani |
| 6,752,499 | B2 * | 6/2004 | Aller .................. G02C 7/04 351/247 |
| 6,754,299 | B2 | 6/2004 | Patch |
| 6,836,619 | B2 | 12/2004 | Ohmura |
| 6,997,554 | B2 | 2/2006 | Nakada et al. |
| 7,025,460 | B2 | 4/2006 | Smith et al. |
| 7,506,983 | B2 | 3/2009 | To et al. |
| 7,604,351 | B2 | 10/2009 | Fukuma et al. |
| 7,665,842 | B2 | 2/2010 | Ho et al. |
| 7,766,482 | B2 | 8/2010 | Smith et al. |
| 7,862,171 | B2 | 1/2011 | Varnas et al. |
| 7,901,075 | B2 | 3/2011 | Rooney et al. |
| 7,992,997 | B2 | 8/2011 | Varnas |
| 7,997,727 | B2 | 8/2011 | Ho et al. |
| 8,052,278 | B2 | 11/2011 | Bovet et al. |
| 8,057,034 | B2 | 11/2011 | Ho et al. |
| 8,079,702 | B2 | 12/2011 | Ballet et al. |
| 8,115,792 | B2 | 2/2012 | Petsch et al. |
| 8,162,477 | B2 | 4/2012 | Carimalo et al. |
| 8,240,847 | B2 | 8/2012 | Holden et al. |
| RE43,851 | E | 12/2012 | To et al. |
| 8,342,684 | B2 | 1/2013 | Ho et al. |
| 8,500,278 | B2 | 8/2013 | Lo et al. |
| 8,540,365 | B2 | 9/2013 | Varnas |
| 8,684,520 | B2 | 4/2014 | Lindacher et al. |
| 8,690,319 | B2 | 4/2014 | Menezes |
| 8,807,747 | B2 | 8/2014 | Guilloux et al. |
| RE45,147 | E | 9/2014 | To et al. |
| 8,833,936 | B2 | 9/2014 | Varnas |
| 8,926,092 | B2 | 1/2015 | Weeber |
| 8,931,897 | B2 | 1/2015 | Holden et al. |
| 8,950,860 | B2 | 2/2015 | Tse et al. |
| 8,951,729 | B2 | 2/2015 | Neitz et al. |
| 8,992,010 | B2 | 3/2015 | Ho et al. |
| 8,998,408 | B2 | 4/2015 | Wei et al. |
| 9,360,683 | B2 | 6/2016 | Buehren |
| 9,417,463 | B2 | 8/2016 | Brennan et al. |
| 9,423,633 | B2 | 8/2016 | Ho et al. |
| 9,547,182 | B2 | 1/2017 | Collins et al. |
| 9,594,259 | B2 | 3/2017 | Brennan et al. |
| 9,625,739 | B2 | 4/2017 | Brennan et al. |
| 9,664,927 | B2 | 5/2017 | Wright et al. |
| 9,709,819 | B2 | 7/2017 | Lippens et al. |
| 9,720,253 | B2 | 8/2017 | Neitz et al. |
| 9,733,494 | B2 | 8/2017 | Brennan et al. |
| 9,746,693 | B2 | 8/2017 | Peloux et al. |
| 9,829,722 | B2 | 11/2017 | Tse et al. |
| 10,012,849 | B2 | 7/2018 | Collins et al. |
| RE47,006 | E | 8/2018 | To et al. |
| 10,042,091 | B2 | 8/2018 | Kildishev et al. |
| 10,061,143 | B2 | 8/2018 | Brennan et al. |
| 10,156,737 | B2 | 12/2018 | Martinez et al. |
| 10,203,522 | B2 | 2/2019 | Bakaraju et al. |
| 10,231,897 | B2 | 3/2019 | Tse et al. |
| 10,247,964 | B2 | 4/2019 | Sankaridurg et al. |
| 10,302,962 | B2 | 5/2019 | Neitz et al. |
| 10,429,670 | B2 | 10/2019 | Newman |
| 10,571,717 | B2 | 2/2020 | Neitz et al. |
| 10,787,707 | B2 | 9/2020 | Neitz et al. |
| 10,795,181 | B2 | 10/2020 | Neitz et al. |
| 10,884,264 | B2 | 1/2021 | Hones et al. |
| 11,048,102 | B2 | 6/2021 | Neitz |
| 2002/0140900 | A1 | 10/2002 | Streibig |
| 2003/0082576 | A1 | 5/2003 | Jones et al. |
| 2004/0110179 | A1 | 6/2004 | Shuber |
| 2004/0150787 | A1 | 8/2004 | Niculas |
| 2005/0208555 | A1 | 9/2005 | Raimond |
| 2006/0055627 | A1 | 3/2006 | Wilson |
| 2006/0082729 | A1 | 4/2006 | To et al. |
| 2006/0118263 | A1 | 6/2006 | Silvestrini |
| 2006/0235428 | A1 | 10/2006 | Silvestrini |
| 2006/0285071 | A1 | 12/2006 | Erickson et al. |
| 2007/0026167 | A1 | 2/2007 | Bourdelais et al. |
| 2007/0115431 | A1 | 5/2007 | Smith et al. |
| 2007/0247588 | A1 | 10/2007 | Cano |
| 2007/0296916 | A1 | 12/2007 | Holden et al. |
| 2008/0030675 | A1 | 2/2008 | Dillon |
| 2008/0084534 | A1 | 4/2008 | Lindacher et al. |
| 2008/0151183 | A1 | 6/2008 | Altmann |
| 2008/0218687 | A1 * | 9/2008 | Phillips .................. G02C 7/044 351/159.1 |
| 2008/0221674 | A1 | 9/2008 | Blum et al. |
| 2008/0309882 | A1 | 12/2008 | Thom et al. |
| 2009/0059168 | A1 | 3/2009 | Miller et al. |
| 2009/0115962 | A1 | 5/2009 | Bovet et al. |
| 2009/0257026 | A1 | 10/2009 | Varnas et al. |
| 2010/0021889 | A1 | 1/2010 | Juo |
| 2010/0091240 | A1 | 4/2010 | Drobe et al. |
| 2010/0149488 | A1 | 6/2010 | Lo et al. |
| 2011/0051079 | A1 | 3/2011 | Martinez et al. |
| 2011/0194195 | A1 | 8/2011 | Zalevsky et al. |
| 2011/0313058 | A1 | 12/2011 | Neitz et al. |
| 2012/0014977 | A1 | 1/2012 | Furihata |
| 2012/0062836 | A1 | 3/2012 | Tse et al. |
| 2012/0182520 | A1 | 7/2012 | Neitz et al. |
| 2013/0053425 | A1 | 2/2013 | To et al. |
| 2013/0103147 | A1 | 4/2013 | Christie et al. |
| 2013/0107206 | A1 | 5/2013 | Slater |
| 2014/0080900 | A1 | 3/2014 | Neitz et al. |
| 2014/0111763 | A1 | 4/2014 | Griffin |
| 2015/0036102 | A1 | 2/2015 | Ghosh et al. |
| 2015/0109574 | A1 | 4/2015 | Tse et al. |
| 2015/0111782 | A1 | 4/2015 | Neitz et al. |
| 2015/0160477 | A1 | 6/2015 | Dai et al. |
| 2015/0316788 | A1 | 11/2015 | Holden et al. |
| 2015/0331255 | A1 | 11/2015 | Sankaridurg et al. |
| 2016/0026000 | A1 | 1/2016 | Kester |
| 2016/0143801 | A1 | 5/2016 | Lam et al. |
| 2016/0377884 | A1 | 12/2016 | Lau et al. |
| 2017/0115509 | A1 | 4/2017 | Brennan et al. |
| 2017/0131567 | A1 | 5/2017 | To et al. |
| 2017/0168320 | A1 | 6/2017 | Tsubota et al. |
| 2017/0184875 | A1 | 6/2017 | Newman |
| 2017/0189168 | A1 | 7/2017 | Zickler et al. |
| 2017/0192252 | A1 | 7/2017 | Brennan et al. |
| 2017/0276963 | A1 | 9/2017 | Brennan et al. |
| 2017/0292160 | A1 | 10/2017 | Neitz et al. |
| 2017/0336653 | A1 | 11/2017 | Bakaraju |
| 2018/0112268 | A1 | 4/2018 | Neitz et al. |
| 2018/0275425 | A1 | 9/2018 | Collins et al. |
| 2018/0275427 | A1 | 9/2018 | Lau et al. |
| 2018/0284326 | A1 | 10/2018 | Arima et al. |
| 2019/0033619 | A1 | 1/2019 | Neitz et al. |
| 2019/0235279 | A1 | 8/2019 | Hones et al. |
| 2019/0302477 | A1 | 10/2019 | Neitz et al. |
| 2020/0073147 | A1 | 3/2020 | Bakaraju et al. |
| 2020/0089023 | A1 | 3/2020 | Zhou et al. |
| 2020/0271955 | A1 | 8/2020 | Neitz et al. |
| 2020/0393699 | A1 | 12/2020 | Neitz |
| 2021/0165244 | A1 | 6/2021 | Hones et al. |

(56) References Cited

U.S. PATENT DOCUMENTS

| | | | |
|---|---|---|---|
| 2021/0341753 A1 | 11/2021 | Neitz | |
| 2023/0107026 A1 | 4/2023 | Neitz et al. | |
| 2023/0137646 A1 | 5/2023 | Neitz et al. | |

FOREIGN PATENT DOCUMENTS

| | | | | |
|---|---|---|---|---|
| CN | 2924572 | | 7/2007 | |
| CN | 101198434 | | 6/2008 | |
| CN | 101273882 | | 10/2008 | |
| CN | 101595420 | | 12/2009 | |
| CN | 101730500 | | 6/2010 | |
| CN | 101268408 | | 3/2011 | |
| CN | 102238927 | | 11/2011 | |
| CN | 103097940 | | 5/2013 | |
| CN | 103959138 | | 7/2014 | |
| CN | 104094164 | | 10/2014 | |
| CN | 104094165 | | 10/2014 | |
| CN | 103293707 | | 12/2014 | |
| CN | 104656271 | | 5/2015 | |
| CN | 104678572 | | 6/2015 | |
| CN | 105378545 | | 3/2016 | |
| CN | 102892380 | | 10/2016 | |
| EP | 0457612 | | 11/1991 | |
| EP | 1042700 | | 3/2002 | |
| EP | 1799166 | | 6/2007 | |
| EP | 2131721 | | 12/2009 | |
| EP | 2616876 | | 7/2013 | |
| EP | 2962155 | | 1/2016 | |
| EP | 2548533 | | 2/2018 | |
| EP | 3614981 | | 3/2020 | |
| EP | 3667401 | | 6/2020 | |
| EP | 3746001 | | 12/2020 | |
| EP | 3931626 | | 1/2022 | |
| HK | 1210838 | | 5/2016 | |
| JP | S5829627 | | 2/1983 | |
| JP | 2003-004907 | | 1/2003 | |
| JP | 2003-029216 | | 1/2003 | |
| JP | 2004514921 | | 5/2004 | |
| JP | 2008040497 | | 2/2008 | |
| JP | 2008-512725 | | 4/2008 | |
| JP | 2008514318 | | 5/2008 | |
| JP | 2009-511962 | | 3/2009 | |
| JP | 4891249 | | 3/2012 | |
| JP | 2012513252 | | 6/2012 | |
| JP | 2012-185348 | | 9/2012 | |
| JP | 2013537317 | | 9/2013 | |
| JP | 2015-197679 | | 11/2015 | |
| JP | 2016-018158 | | 2/2016 | |
| JP | 2017-068216 | | 4/2017 | |
| JP | 2017510851 | | 4/2017 | |
| JP | 2019529968 | | 10/2019 | |
| KR | 100686551 | | 2/2007 | |
| KR | 100840845 | | 6/2008 | |
| RU | 2498367 | C2 * | 11/2013 | ........... A61B 3/0025 |
| TW | 279510 | | 6/1996 | |
| TW | I 446830 | | 7/2001 | |
| TW | 201211618 | | 3/2012 | |
| TW | I 370278 | | 8/2012 | |
| TW | 201307942 | | 2/2013 | |
| TW | I 493240 | | 7/2015 | |
| TW | I530727 | | 4/2016 | |
| TW | I559044 | | 11/2016 | |
| TW | I561885 | | 12/2016 | |
| WO | WO1986/006846 | | 11/1986 | |
| WO | WO1997/031286 | | 8/1997 | |
| WO | WO1999/066366 | | 12/1999 | |
| WO | WO2000/052516 | | 9/2000 | |
| WO | WO2002/031585 | | 4/2002 | |
| WO | WO2006/034652 | | 4/2006 | |
| WO | WO2006/113149 | | 10/2006 | |
| WO | WO2007/082268 | | 7/2007 | |
| WO | WO2007/132834 | | 11/2007 | |
| WO | WO2008/026674 | | 3/2008 | |
| WO | WO2008/045847 | | 4/2008 | |
| WO | WO2008/059178 | | 5/2008 | |
| WO | WO2008/083418 | | 7/2008 | |
| WO | WO2010/019397 | | 2/2010 | |
| WO | WO2010/075319 | | 7/2010 | |
| WO | WO2010/088644 | | 8/2010 | |
| WO | WO2011/031948 | | 3/2011 | |
| WO | WO2012/034265 | | 3/2012 | |
| WO | WO2012/097213 | | 7/2012 | |
| WO | WO2013/015743 | | 1/2013 | |
| WO | WO2013/082545 | | 6/2013 | |
| WO | WO2013/134825 | | 9/2013 | |
| WO | WO2014/194444 | | 12/2014 | |
| WO | WO2015/055322 | | 4/2015 | |
| WO | WO2015/147758 | | 10/2015 | |
| WO | WO-2015147758 | A1 * | 10/2015 | ........... A61F 2/1602 |
| WO | WO2015/186723 | | 12/2015 | |
| WO | WO2016/138512 | | 9/2016 | |
| WO | WO2017/178430 | | 10/2017 | |
| WO | WO2018/026697 | | 2/2018 | |
| WO | WO2018/076057 | | 5/2018 | |
| WO | WO2018/208724 | | 11/2018 | |
| WO | WO2019/166653 | | 9/2019 | |
| WO | WO2020/138127 | | 7/2020 | |

OTHER PUBLICATIONS

Applied Biosystems—Product Bulletin—Automated DNA Sequencing [online] "ABI Prism® BigDyeTM Primer Sequencing Kit," 2000, available via url: <tools.thermofisher.com/content/sfs/brochures/cms_040730.pdf>, 4 pages.

Carkeet et al., "Repeatability of IOLMaster Biometry in Children, Optometry and Vision Science", Nov. 2004, 81(11) : 829-834.

Carroll et al. "Estimates of L:M cone ratio from ERG flicker photometry and genetics", Journal of Vision, 2002, 2(8):531-542.

Carroll et al., "Cone photoreceptor mosaic disruption associated with Cys203Arg mutation in the M-cone opsin," Proceedings of the National Academy of Sciences of the United States of America, 2009, 106(49):20948-20953.

Carroll, et al., "Functional photoreceptor loss revealed with adaptive optics: An alternate cause of color blindness," Proceedings of the National Academy of Sciences of the United States of America, 2004, 101(22):8461-8466.

Carroll, J., McMahon, C., Neitz, M., & Neitz, J. (2000). Flicker-photometric electroretinogram estimates of L: M cone photoreceptor ratio in men with photopigment spectra derived from genetics. Journal of The Optical Society of America A, 17,499-509.

Crognale et al., "Characterization of a novel form of X-linked incomplete achromatopsia", Visual Neuroscience, 2004, 21(3):197-203.

Davidoff, "Cone opsin gene variants in color blindness and other vision disorders," 2015, Retrieved from the Internet: <https://digital.lib.washington.edu/researchworks/bitstream/handle/1773/33578/Davidoff_washington_0250E_15133.pdf?sequence=1&isAllowed=y>, 132 pages.

Drummond-Borg, et al., "Molecular patterns of X chromosome-linked color vision genes among 134 men of European ancestry," Proceedings of the National Academy of Sciences of the United States of America, Feb. 1989, 86:983-987.

Extended European Search Report in European Application No. 19833133.2, dated Mar. 16, 2022, 9 pages.

Gardner et al, "Three Different Cone Opsin Gene Array Mutational Mechanisms with Genotype-Phenotype Correlation and Functional Investigation of Cone Opsin Variants" Human Mutation (2014) vol. 35(11), pp. 1354-1362.

GeneCards [online], "GeneCard for the OPNIMW gene", retrieved on Apr. 6, 2020, retrieved from <genecards.org/cgi-bin/carddisp_pl?gene=OPNIMW>, 27 pages.

Greenwald et al., "Role of a Dual Splicing and Amino Acid Code in Myopia, Cone Dysfunction and Cone Dystrophy Associated with L/M Opsin Interchange Mutations," Translation Vision Science & Technology, vol. 6, No. 3, dated May 10, 2017, 19 pages.

Gunther et al., "Individual differences in chromatic (red/green) contrast sensitivity are constrained by the relative number of L-versus M-cones in the eye", Vision Research, May 2002, 42(11):1367-1378.

(56) References Cited

OTHER PUBLICATIONS

Hahner et al., "Strategies for SNP genotyping by mass spectrometry", International Congress Series, Jan. 2003, 1239: 11-16.
Halushka et al., "Patterns of single-nucleotide polymorphisms in candidate genes for blood-pressure homeostasis", Nat Genet, 1999, 239-247.
HattersleyDM et al., "What makes a good genetic association study?" The Lancet, Oct. 2005, 366(9493):1315-1323.
Hirschhorn et al. "A comprehensive review of genetic association studies", Genet Med, 2002, 45-61.
Hofer, et al., "Organization of the Human Trichromatic Cone Mosaic" Journal of Neuroscience, Oct. 19, 2005, 25(42):9669-9679.
Kuchenbecker et al, "Topography of the long- to middle-wavelength sensitive cone ratio in the human retina assessed with a wide-field color multifocal electroretinogram", Vis Neurosci, May-Jun. 2008, 25(3):301-6.
Lucentini, "Gene association studies typically wrong: reproducible gene-disease associations are few and far between", The Scientist, 2004, 18(24): p. 20.
McClements, Michelle et al. "Variations in Opsin Coding Sequences Cause X-Linked Cone Dysfunction Syndrome, with Myopia and Dichromacy" Investigative Ophthalmology & Visual Science (2013) vol. 54(2), pp. 1361-1369.
McMahon et al., "The L:M cone ratio in males of African descent with normal color vision", Journal of Vision, 2008, 8(2):1-9.
Michaelides et al., "X-Linked Cone Dysfunction Syndrome with Myopia and Protanopia" Ophthalmology, Aug. 2005, 112(8): 1448-1454.
Michaelides, et al. (2010) "The PROMI mutation p.R373C causes an autosomal dominant bull's eye maculopathy associated with rod, rod-cone, and macular dystrophy," IOVS, 51(9): 4771-4780.
Mizrahi-Meissonnier et al., "Variable Retinal Phenotypes Caused by Mutations in the X-Linked Photopigment Gene Array", Investigative Ophthalmology & Visual Science, Aug. 2010, (51):3884-3892.
Montana.edu [online] "Optical System Design—S15," retrieved on Jan. 7, 2019, retrieved from <http://www.montana.edu/jshaw/documents/18%20EELE582_S15_OTFMTF.pdf >, 18 pages.
Mummidi et al., "Evolution of Human and Non-human Primate CC Chemokine Receptor 5 Gene and mRNA,Potential Roles for Haplotype and mRNA Diversity, Differential Haplotype-Specific Transcriptional Activity, and Altered Transcription Factor Binding to Polymorphic Nucleotides in the Pathogenesis of HIV-1 and Simian Immunodeficiency Virus*210", Journal of Biological Chemistry, 2000, 275(25):18946-18961.
Nathans et al., "Molecular Genetics of Human Blue Cone Monochromacy", Aug. 1989, 45(4920): pp. 831-838.
Nathans et al., "Molecular Genetics of Inherited Variation in Human Color Vision", Apr. 1986, 232(4747): pp. 203-210.
NCBI Database GenBank Accession No. NM 020061. Nov. 1, 2009. National Center for Biotechnology Information, National Library of Medicine, Bethesda, MD, USA, 7 pages.
Neitz et al. "Variety of genotypes in males diagnosed as dichromatic on a conventional clinical anomaloscope", Visual Neuroscience, 2004, 21(3):205-216.
Neitz et al., "Cone mosaic disruption caused by L/M opsin mutations in bornholm eye disease," ARVO Annual Meeting Abstract, Apr. 2011, 2 pages.
Neitz et al., "Polymorphism in the number of genes encoding long-wavelength-sensitive cone pigments among males with normal color vision", Vision Research, Sep. 1995, 35(17): 2395-2407.
Neitz, "A new mass screening test for color-vision deficiencies in children" Color Research & Application, 2001, 26(1): S239-S249.
Oda, et al. (2003) "Analysis of L-cone/M-cone visual pigment gene arrays in females by long-range PCR" Vision Research, vol. 43, pp. 489-495.
Okada et al., "Target Spatial Frequency Determines the Response to Conflicting Defocus - and Convergence-Driven Accommodative Stimuli," 2006, Elsevier, vol. 46, pp. 475-484.
Radhakrishna, et al., "The 'X-linked' severe form of myopia locus at Xq28 (MYP1): Narrowing of the critical region and exclusion of twelve known genes localized in the interval.", ARVO Annual Meeting Abstract, May 2005, 1 page.
Scholl, et al., (2001) "Macular dystrophy with protan genotype and phenotype studied with cone type specific ERGs" Current Eye Research, vol. 22(3) pp. 221-228.
Scholl, et al., (2006) "Progressive cone dystrophy with deutan genotype and phenotype", Graefe's Arch Clin Exp Ophthalmol, vol. 244, pp. 183-191.
Schwartz et al., "X-linked myopia: Bornholm Eye Disease", Clinical Genetics, 1990, 38(4):281-286.
slrlounge.com [online] "Diffraction, Aperture, and Starburst Effects," dated Feb. 9, 2011, [retrieved on Jan. 7, 2019] Retrieved from: <https://www.slrlounge.com/diffraction-aperture-and-starburst-effects/>, 11 pages.
Twelker et al., "Children's Ocular Components and Age, Gender, and Ethnicity", Optometry and Vision Science, Aug. 2009, 86(8):918-935.
Ueyama, Hisao et al. "Unique haplotype in exon 3 of cone opsin mRNA affects splicing of its precursor, leading to congenital color vision defect" Biochemical and Biophysical Research Communications (2012) vol. 424, pp. 152-157.
Verrelli et al., "Signatures of Selection and Gene Conversion Associated with Human Color Vision Variation", The American Journal of Human Genetics, 2004,75(3): 363-375.
Winderickx et al., "Defective colour vision associated with a missense mutation in the human green visual pigment gene", Nat Genet 1992, 251-256.
Winderickx, et al. (1993) "Haplotype diversity in the human red and green opsin genes: evidence for frequent sequence exchange in exon 3," Human Molecular Genetics, 2(9):1413-1421.
Young et al., "X-Linked High Myopia Associated With Cone Dysfunction", Arch Ophthalmol. 2004, 122(6):897-908.
Young, et al., (2001) "Further refinement of the MYP2 locus for autosomal dominant high myopia by linkage disequilibrium analysis", Ophthalmic Genetics, vol. 22, pp. 69-75.
Office Action in Japanese Appln. No. 2021-500874, dated Apr. 10, 2023, 11 pages (with English translation).
Office Action in Japanese Appln. No. 2021-500874, dated Aug. 7, 2023, 6 pages (with English translation).
Office Action in Great British Appln. No. 2101954.2, dated Jan. 26, 2023, 4 pages.
Chamberlain et al., "A 3-year Randomized Clinical Trial of MiSight Lenses for Myopia Control", Optom Vis Sci, 2019, 96(8): 556-567.
Anstice et al., "Effect of dual-focus soft contact lens wear on axial myopia progression in children," American Academy of Opthalmology, Jan. 26, 2011, 1152-1161.
Brennan et al., "Commonly held beliefs about myopia that lack a robust evidence base," Eye & Contact Lens, Jul. 2019, 45(4):215-225.
Cheng et al., "Effect of Bifocal and Prismatic Bifocal Spectacles on Myopia Progression in Children: Three-Year Results of a Randomized Clinical Trial", JAMA Ophthalmology, Mar. 2014, 132(3):258-264.
Cheng et al., "Soft contact lenses with positive spherical aberration for myopia control," Optometry and Vision Science, Apr. 2016, 93(4):353-366.
Gwiazda et al, "A Randomized Clinical Trial of Progressive Addition Lenses versus Single Vision Lenses on the Progression of Myopia in Children", Invest Ophthalmol Vis Sci, Apr. 2003, 44(4):1492-1500.
Jirsa, "Diffraction, Aperture, and Starburst Effects", SLR Lounge, 2010, 9 pages.
Jones et al., "The Prevalence and Impact of High Myopia", Eye & Contact Lens, May 2012, 38(3):188-96.
PCT International Preliminary Report on Patentability in International Appln. No. PCT/US2019/041605, dated Jan. 21, 2021, 10 pages.
PCT International Search Report and Written Opinion in International Application No. PCT/US19/41605, dated Oct. 4, 2019, 12 pages.

(56) References Cited

OTHER PUBLICATIONS

Ruiz-Pomeda et al., "MiSight assessment study spain (MASS). A 2-year randomized clinical trial," Graefe's Archive for Clinical and Experimental Ophthalmology, Feb. 3, 2018, 256:1011-1021.
Sankaridurg et al., "Decrease in rate of myopia progression with a contact lens designed to reduce relative peripheral hyperopia: One-year results," IOVS, Dec. 2011, 52(13):9362-9367.
Shaw, "Optical Transfer Function (OTF) Modulation Transfer Function (MTF)", Modulation Transfer Function in Optical and Electro-Optical Systems, 2001, 18 pages.
Tedja et al., "Genome-wide association meta-analysis highlights light-induced signaling as a driver for refractive error", Nature Genetics, Jun. 2018, 50(6):834-848.
TW Office Action in Taiwanese Application No. 108124790, dated Aug. 24, 2020, 4 pages.
TW Search Report in Taiwanese Application No. 108124790, dated Aug. 20, 2020, 8 pages (with English translation).
Vitale et al, "Increased prevalence of myopia in the United States between 1971-1972 and 1999-2004", Arch Ophthalmol, Dec. 2009, 127(12):1632-1639.
Zhang, "Genetics of Refraction and Myopia", Progress in Molecular Biology and Translational Science, 2015, 134: 269-279.
Lam et al. "Defocus Incorporated Multiple Segments (DIMS) spectacle lenses slow myopia progression: a 2-year randomised clinical trial," Br J Ophthalmol, Mar. 2019, 104(3):363-368.

\* cited by examiner

200
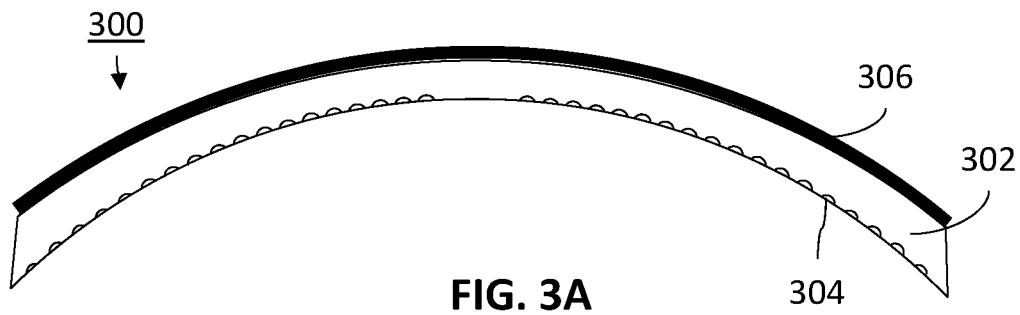
220a      FIG. 2      220b
300
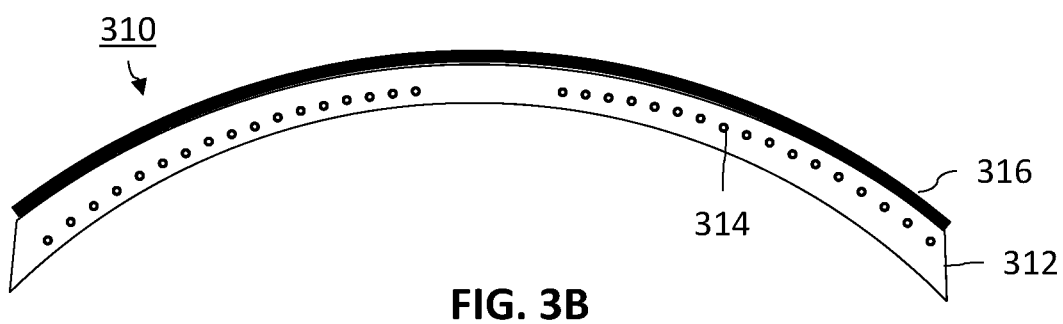
FIG. 3A
310
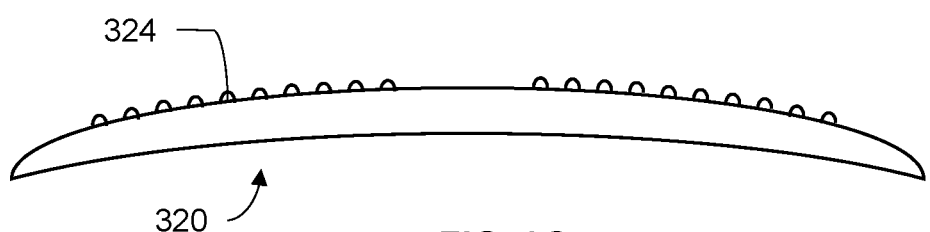
FIG. 3B
324
320
FIG. 3C

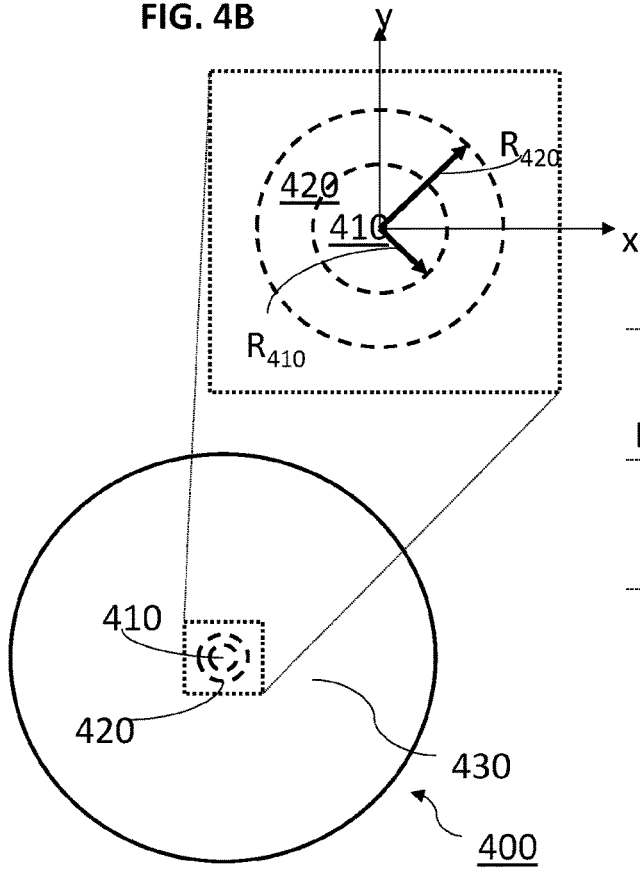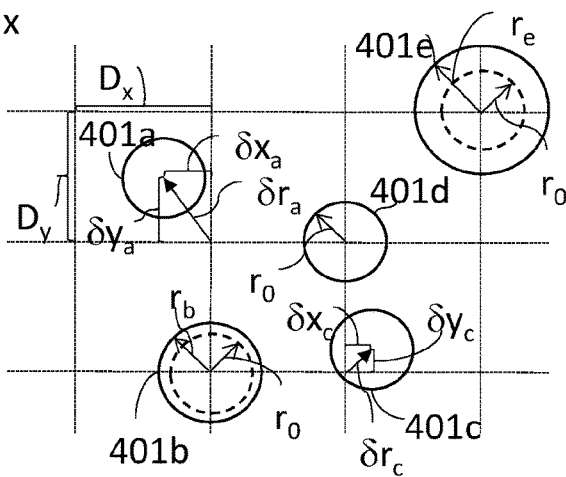
FIG. 4B
FIG. 4A
FIG. 4C

|  | Control | stdev | stderr | MC Spec Lens | stdev | stderr | Diff | % Diff |
|---|---|---|---|---|---|---|---|---|
| N | 85.00 |  |  | 85.00 |  |  |  |  |
| SER mean chg | -1.72 | 0.92 | 0.10 | -1.20 | 0.73 | 0.08 | 0.52 | 30.36% |
| SER % > -1 D | 23.5% |  |  | 40.0% |  |  | 16.5% |  |
| AL mean change | 0.85 | 0.54 | 0.06 | 0.59 | 0.42 | 0.05 | -0.26 | 30.45% |
| SER % < -5 D | 82.4% |  |  | 89.4% |  |  | 7.1% |  |

FIG. 7

|  | Control | stdev | stderr | MC Spec Lens | stdev | stderr | Diff | % Diff |
|---|---|---|---|---|---|---|---|---|
| N | 85.00 |  |  | 85.00 |  |  |  |  |
| SER mean chg | -1.78 | 0.98 | 0.11 | -1.03 | 0.54 | 0.06 | 0.74 | 41.85% |
| SER % > -1 D | 29.4% |  |  | 44.7% |  |  | 15.3% |  |
| AL mean change | 0.87 | 0.49 | 0.05 | 0.52 | 0.38 | 0.04 | -0.35 | 40.47% |
| SER % < -5 D | 82.4% |  |  | 95.3% |  |  | 12.9% |  |

FIG. 10

|  | Control | stdev | stderr | MC Spec Lens | stdev | stderr | Diff | % Diff |
|---|---|---|---|---|---|---|---|---|
| N | 85.00 |  |  | 85.00 |  |  |  |  |
| SER mean chg | -1.66 | 1.02 | 0.11 | -0.82 | 0.48 | 0.05 | 0.84 | 50.45% |
| SER % > -1 D | 32.9% |  |  | 65.9% |  |  | 32.9% |  |
| AL mean change | 0.80 | 0.54 | 0.06 | 0.39 | 0.33 | 0.04 | -0.41 | 51.25% |
| SER % < -5 D | 76.5% |  |  | 97.6% |  |  | 21.2% |  |

FIG. 13

|  | Control | stdev | stderr | MC Spec Lens | stdev | stderr | Diff | % Diff |
|---|---|---|---|---|---|---|---|---|
| N | 85.00 |  |  | 85.00 |  |  |  |  |
| SER mean chg | -1.46 | 0.82 | 0.09 | -0.99 | 0.68 | 0.07 | 0.47 | 32.39% |
| SER % > -1 D | 30.6% |  |  | 54.1% |  |  | 23.5% |  |
| AL mean change | 0.72 | 0.46 | 0.05 | 0.48 | 0.33 | 0.04 | 0.24 | 33.16% |
| SER % < -5 D | 82.4% |  |  | 96.5% |  |  | 14.1% |  |

FIG. 16

|                | Control | stdev | stderr | MC Spec Lens | stdev | stderr | Diff  | % Diff |
|----------------|---------|-------|--------|--------------|-------|--------|-------|--------|
| N              | 85.00   |       |        | 85.00        |       |        |       |        |
| SER mean chg   | -1.52   | 0.82  | 0.09   | -0.91        | 0.59  | 0.06   | 0.61  | 40.03% |
| SER % > -1 D   | 27.1%   |       |        | 61.2%        |       |        | 34.1% |        |
| AL mean change | 0.71    | 0.46  | 0.05   | 0.43         | 0.35  | 0.04   | -0.29 | 40.32% |
| SER % < -5 D   | 81.2%   |       |        | 96.5%        |       |        | 15.3% |        |

FIG. 19

|  | Control | stdev | stderr | MC Spec Lens | stdev | stderr | Diff | % Diff |
|---|---|---|---|---|---|---|---|---|
| N | 85.00 |  |  | 85.00 |  |  |  |  |
| SER mean chg | -1.43 | 1.01 | 0.11 | -0.72 | 0.52 | 0.06 | 0.71 | 49.43% |
| SER % > -1 D | 32.9% |  |  | 69.4% |  |  | 36.5% |  |
| AL mean change | 0.70 | 0.51 | 0.06 | 0.34 | 0.29 | 0.03 | -0.36 | 51.11% |
| SER % < -5 D | 85.9% |  |  | 96.5% |  |  | 10.6% |  |

FIG. 22

Treatment Group Change from Baseline under Various Control Group Outcomes and Treatment Effect Sizes

| | | Change from Baseline - Control Group (diopters) | | | | | | | | |
|---|---|---|---|---|---|---|---|---|---|---|
| | | -0.60 | -0.65 | -0.70 | -0.75 | -0.80 | -0.85 | -0.90 | -0.95 | -1.00 |
| % reduction in progression vs. control | 40% | -0.36 | -0.39 | -0.42 | -0.45 | -0.48 | -0.51 | -0.54 | -0.57 | -0.60 |
| | 41% | -0.35 | -0.38 | -0.41 | -0.44 | -0.47 | -0.50 | -0.53 | -0.56 | -0.59 |
| | 42% | -0.35 | -0.38 | -0.41 | -0.44 | -0.46 | -0.49 | -0.52 | -0.55 | -0.58 |
| | 43% | -0.34 | -0.37 | -0.40 | -0.43 | -0.46 | -0.48 | -0.51 | -0.54 | -0.57 |
| | 44% | -0.34 | -0.36 | -0.39 | -0.42 | -0.45 | -0.48 | -0.50 | -0.53 | -0.56 |
| | 45% | -0.33 | -0.36 | -0.39 | -0.41 | -0.44 | -0.47 | -0.50 | -0.52 | -0.55 |
| | 46% | -0.32 | -0.35 | -0.38 | -0.41 | -0.43 | -0.46 | -0.49 | -0.51 | -0.54 |
| | 47% | -0.32 | -0.34 | -0.37 | -0.40 | -0.42 | -0.45 | -0.48 | -0.50 | -0.53 |
| | 48% | -0.31 | -0.34 | -0.36 | -0.39 | -0.42 | -0.44 | -0.47 | -0.49 | -0.52 |
| | 49% | -0.31 | -0.33 | -0.36 | -0.38 | -0.41 | -0.43 | -0.46 | -0.48 | -0.51 |
| | 50% | -0.30 | -0.33 | -0.35 | -0.38 | -0.40 | -0.43 | -0.45 | -0.48 | -0.50 |
| | 51% | -0.29 | -0.32 | -0.34 | -0.37 | -0.39 | -0.42 | -0.44 | -0.47 | -0.49 |
| | 52% | -0.29 | -0.31 | -0.34 | -0.36 | -0.38 | -0.41 | -0.43 | -0.46 | -0.48 |
| | 53% | -0.28 | -0.31 | -0.33 | -0.35 | -0.38 | -0.40 | -0.42 | -0.45 | -0.47 |
| | 54% | -0.28 | -0.30 | -0.32 | -0.35 | -0.37 | -0.39 | -0.41 | -0.44 | -0.46 |
| | 55% | -0.27 | -0.29 | -0.32 | -0.34 | -0.36 | -0.38 | -0.41 | -0.43 | -0.45 |
| | 56% | -0.26 | -0.29 | -0.31 | -0.33 | -0.35 | -0.37 | -0.40 | -0.42 | -0.44 |
| | 57% | -0.26 | -0.28 | -0.30 | -0.32 | -0.34 | -0.37 | -0.39 | -0.41 | -0.43 |
| | 58% | -0.25 | -0.27 | -0.29 | -0.32 | -0.34 | -0.36 | -0.38 | -0.40 | -0.42 |
| | 59% | -0.25 | -0.27 | -0.29 | -0.31 | -0.33 | -0.35 | -0.37 | -0.39 | -0.41 |
| | 60% | -0.24 | -0.26 | -0.28 | -0.30 | -0.32 | -0.34 | -0.36 | -0.38 | -0.40 |
| | 61% | -0.23 | -0.25 | -0.27 | -0.29 | -0.31 | -0.33 | -0.35 | -0.37 | -0.39 |
| | 62% | -0.23 | -0.25 | -0.27 | -0.29 | -0.30 | -0.32 | -0.34 | -0.36 | -0.38 |
| | 63% | -0.22 | -0.24 | -0.26 | -0.28 | -0.30 | -0.31 | -0.33 | -0.35 | -0.37 |
| | 64% | -0.22 | -0.23 | -0.25 | -0.27 | -0.29 | -0.31 | -0.32 | -0.34 | -0.36 |
| | 65% | -0.21 | -0.23 | -0.25 | -0.26 | -0.28 | -0.30 | -0.32 | -0.33 | -0.35 |
| | 66% | -0.20 | -0.22 | -0.24 | -0.26 | -0.27 | -0.29 | -0.31 | -0.32 | -0.34 |
| | 67% | -0.20 | -0.21 | -0.23 | -0.25 | -0.26 | -0.28 | -0.30 | -0.31 | -0.33 |
| | 68% | -0.19 | -0.21 | -0.22 | -0.24 | -0.26 | -0.27 | -0.29 | -0.30 | -0.32 |
| | 69% | -0.19 | -0.20 | -0.22 | -0.23 | -0.25 | -0.26 | -0.28 | -0.29 | -0.31 |
| | 70% | -0.18 | -0.20 | -0.21 | -0.23 | -0.24 | -0.26 | -0.27 | -0.29 | -0.30 |
| | 71% | -0.17 | -0.19 | -0.20 | -0.22 | -0.23 | -0.25 | -0.26 | -0.28 | -0.29 |
| | 72% | -0.17 | -0.18 | -0.20 | -0.21 | -0.22 | -0.24 | -0.25 | -0.27 | -0.28 |
| | 73% | -0.16 | -0.18 | -0.19 | -0.20 | -0.22 | -0.23 | -0.24 | -0.26 | -0.27 |
| | 74% | -0.16 | -0.17 | -0.18 | -0.20 | -0.21 | -0.22 | -0.23 | -0.25 | -0.26 |
| | 75% | -0.15 | -0.16 | -0.18 | -0.19 | -0.20 | -0.21 | -0.23 | -0.24 | -0.25 |

FIG. 25A

Difference Between Treatment vs. Control Groups under Various Control Group Outcomes and Treatment Effect Sizes

| % reduction in progression vs. control | Change from Baseline - Control Group (diopters) | | | | | | | | |
|---|---|---|---|---|---|---|---|---|---|
| | -0.60 | -0.65 | -0.70 | -0.75 | -0.80 | -0.85 | -0.90 | -0.95 | -1.00 |
| 40% | 0.24 | 0.26 | 0.28 | 0.30 | 0.32 | 0.34 | 0.36 | 0.38 | 0.40 |
| 41% | 0.25 | 0.27 | 0.29 | 0.31 | 0.33 | 0.35 | 0.37 | 0.39 | 0.41 |
| 42% | 0.25 | 0.27 | 0.29 | 0.32 | 0.34 | 0.36 | 0.38 | 0.40 | 0.42 |
| 43% | 0.26 | 0.28 | 0.30 | 0.32 | 0.34 | 0.37 | 0.39 | 0.41 | 0.43 |
| 44% | 0.26 | 0.29 | 0.31 | 0.33 | 0.35 | 0.37 | 0.40 | 0.42 | 0.44 |
| 45% | 0.27 | 0.29 | 0.32 | 0.34 | 0.36 | 0.38 | 0.41 | 0.43 | 0.45 |
| 46% | 0.28 | 0.30 | 0.32 | 0.35 | 0.37 | 0.39 | 0.41 | 0.44 | 0.46 |
| 47% | 0.28 | 0.31 | 0.33 | 0.35 | 0.38 | 0.40 | 0.42 | 0.45 | 0.47 |
| 48% | 0.29 | 0.31 | 0.34 | 0.36 | 0.38 | 0.41 | 0.43 | 0.46 | 0.48 |
| 49% | 0.29 | 0.32 | 0.34 | 0.37 | 0.39 | 0.42 | 0.44 | 0.47 | 0.49 |
| 50% | 0.30 | 0.33 | 0.35 | 0.38 | 0.40 | 0.43 | 0.45 | 0.48 | 0.50 |
| 51% | 0.31 | 0.33 | 0.36 | 0.38 | 0.41 | 0.43 | 0.46 | 0.48 | 0.51 |
| 52% | 0.31 | 0.34 | 0.36 | 0.39 | 0.42 | 0.44 | 0.47 | 0.49 | 0.52 |
| 53% | 0.32 | 0.34 | 0.37 | 0.40 | 0.42 | 0.45 | 0.48 | 0.50 | 0.53 |
| 54% | 0.32 | 0.35 | 0.38 | 0.41 | 0.43 | 0.46 | 0.49 | 0.51 | 0.54 |
| 55% | 0.33 | 0.36 | 0.39 | 0.41 | 0.44 | 0.47 | 0.50 | 0.52 | 0.55 |
| 56% | 0.34 | 0.36 | 0.39 | 0.42 | 0.45 | 0.48 | 0.50 | 0.53 | 0.56 |
| 57% | 0.34 | 0.37 | 0.40 | 0.43 | 0.46 | 0.48 | 0.51 | 0.54 | 0.57 |
| 58% | 0.35 | 0.38 | 0.41 | 0.44 | 0.46 | 0.49 | 0.52 | 0.55 | 0.58 |
| 59% | 0.35 | 0.38 | 0.41 | 0.44 | 0.47 | 0.50 | 0.53 | 0.56 | 0.59 |
| 60% | 0.36 | 0.39 | 0.42 | 0.45 | 0.48 | 0.51 | 0.54 | 0.57 | 0.60 |
| 61% | 0.37 | 0.40 | 0.43 | 0.46 | 0.49 | 0.52 | 0.55 | 0.58 | 0.61 |
| 62% | 0.37 | 0.40 | 0.43 | 0.47 | 0.50 | 0.53 | 0.56 | 0.59 | 0.62 |
| 63% | 0.38 | 0.41 | 0.44 | 0.47 | 0.50 | 0.54 | 0.57 | 0.60 | 0.63 |
| 64% | 0.38 | 0.42 | 0.45 | 0.48 | 0.51 | 0.54 | 0.58 | 0.61 | 0.64 |
| 65% | 0.39 | 0.42 | 0.46 | 0.49 | 0.52 | 0.55 | 0.59 | 0.62 | 0.65 |
| 66% | 0.40 | 0.43 | 0.46 | 0.50 | 0.53 | 0.56 | 0.59 | 0.63 | 0.66 |
| 67% | 0.40 | 0.44 | 0.47 | 0.50 | 0.54 | 0.57 | 0.60 | 0.64 | 0.67 |
| 68% | 0.41 | 0.44 | 0.48 | 0.51 | 0.54 | 0.58 | 0.61 | 0.65 | 0.68 |
| 69% | 0.41 | 0.45 | 0.48 | 0.52 | 0.55 | 0.59 | 0.62 | 0.66 | 0.69 |
| 70% | 0.42 | 0.46 | 0.49 | 0.53 | 0.56 | 0.60 | 0.63 | 0.67 | 0.70 |
| 71% | 0.43 | 0.46 | 0.50 | 0.53 | 0.57 | 0.60 | 0.64 | 0.67 | 0.71 |
| 72% | 0.43 | 0.47 | 0.50 | 0.54 | 0.58 | 0.61 | 0.65 | 0.68 | 0.72 |
| 73% | 0.44 | 0.47 | 0.51 | 0.55 | 0.58 | 0.62 | 0.66 | 0.69 | 0.73 |
| 74% | 0.44 | 0.48 | 0.52 | 0.56 | 0.59 | 0.63 | 0.67 | 0.70 | 0.74 |
| 75% | 0.45 | 0.49 | 0.53 | 0.56 | 0.60 | 0.64 | 0.68 | 0.71 | 0.75 |

FIG. 25B

Treatment Group Change from Baseline under Various Control Group Outcomes and Treatment Effect Sizes

| % reduction in progression vs. control | Change from Baseline - Control Group (diopters) | | | | | | | | |
|---|---|---|---|---|---|---|---|---|---|
| | -1.15 | -1.20 | -1.25 | -1.30 | -1.35 | -1.40 | -1.45 | -1.50 | -1.55 |
| 40% | -0.69 | -0.72 | -0.75 | -0.78 | -0.81 | -0.84 | -0.87 | -0.90 | -0.93 |
| 41% | -0.68 | -0.71 | -0.74 | -0.77 | -0.80 | -0.83 | -0.86 | -0.89 | -0.91 |
| 42% | -0.67 | -0.70 | -0.73 | -0.75 | -0.78 | -0.81 | -0.84 | -0.87 | -0.90 |
| 43% | -0.66 | -0.68 | -0.71 | -0.74 | -0.77 | -0.80 | -0.83 | -0.86 | -0.88 |
| 44% | -0.64 | -0.67 | -0.70 | -0.73 | -0.76 | -0.78 | -0.81 | -0.84 | -0.87 |
| 45% | -0.63 | -0.66 | -0.69 | -0.72 | -0.74 | -0.77 | -0.80 | -0.83 | -0.85 |
| 46% | -0.62 | -0.65 | -0.68 | -0.70 | -0.73 | -0.76 | -0.78 | -0.81 | -0.84 |
| 47% | -0.61 | -0.64 | -0.66 | -0.69 | -0.72 | -0.74 | -0.77 | -0.80 | -0.82 |
| 48% | -0.60 | -0.62 | -0.65 | -0.68 | -0.70 | -0.73 | -0.75 | -0.78 | -0.81 |
| 49% | -0.59 | -0.61 | -0.64 | -0.66 | -0.69 | -0.71 | -0.74 | -0.77 | -0.79 |
| 50% | -0.58 | -0.60 | -0.63 | -0.65 | -0.68 | -0.70 | -0.73 | -0.75 | -0.78 |
| 51% | -0.56 | -0.59 | -0.61 | -0.64 | -0.66 | -0.69 | -0.71 | -0.74 | -0.76 |
| 52% | -0.55 | -0.58 | -0.60 | -0.62 | -0.65 | -0.67 | -0.70 | -0.72 | -0.74 |
| 53% | -0.54 | -0.56 | -0.59 | -0.61 | -0.63 | -0.66 | -0.68 | -0.71 | -0.73 |
| 54% | -0.53 | -0.55 | -0.58 | -0.60 | -0.62 | -0.64 | -0.67 | -0.69 | -0.71 |
| 55% | -0.52 | -0.54 | -0.56 | -0.59 | -0.61 | -0.63 | -0.65 | -0.68 | -0.70 |
| 56% | -0.51 | -0.53 | -0.55 | -0.57 | -0.59 | -0.62 | -0.64 | -0.66 | -0.68 |
| 57% | -0.49 | -0.52 | -0.54 | -0.56 | -0.58 | -0.60 | -0.62 | -0.65 | -0.67 |
| 58% | -0.48 | -0.50 | -0.53 | -0.55 | -0.57 | -0.59 | -0.61 | -0.63 | -0.65 |
| 59% | -0.47 | -0.49 | -0.51 | -0.53 | -0.55 | -0.57 | -0.59 | -0.62 | -0.64 |
| 60% | -0.46 | -0.48 | -0.50 | -0.52 | -0.54 | -0.56 | -0.58 | -0.60 | -0.62 |
| 61% | -0.45 | -0.47 | -0.49 | -0.51 | -0.53 | -0.55 | -0.57 | -0.59 | -0.60 |
| 62% | -0.44 | -0.46 | -0.48 | -0.49 | -0.51 | -0.53 | -0.55 | -0.57 | -0.59 |
| 63% | -0.43 | -0.44 | -0.46 | -0.48 | -0.50 | -0.52 | -0.54 | -0.56 | -0.57 |
| 64% | -0.41 | -0.43 | -0.45 | -0.47 | -0.49 | -0.50 | -0.52 | -0.54 | -0.56 |
| 65% | -0.40 | -0.42 | -0.44 | -0.46 | -0.47 | -0.49 | -0.51 | -0.53 | -0.54 |
| 66% | -0.39 | -0.41 | -0.43 | -0.44 | -0.46 | -0.48 | -0.49 | -0.51 | -0.53 |
| 67% | -0.38 | -0.40 | -0.41 | -0.43 | -0.45 | -0.46 | -0.48 | -0.50 | -0.51 |
| 68% | -0.37 | -0.38 | -0.40 | -0.42 | -0.43 | -0.45 | -0.46 | -0.48 | -0.50 |
| 69% | -0.36 | -0.37 | -0.39 | -0.40 | -0.42 | -0.43 | -0.45 | -0.47 | -0.48 |
| 70% | -0.35 | -0.36 | -0.38 | -0.39 | -0.41 | -0.42 | -0.44 | -0.45 | -0.47 |
| 71% | -0.33 | -0.35 | -0.36 | -0.38 | -0.39 | -0.41 | -0.42 | -0.44 | -0.45 |
| 72% | -0.32 | -0.34 | -0.35 | -0.36 | -0.38 | -0.39 | -0.41 | -0.42 | -0.43 |
| 73% | -0.31 | -0.32 | -0.34 | -0.35 | -0.36 | -0.38 | -0.39 | -0.41 | -0.42 |
| 74% | -0.30 | -0.31 | -0.33 | -0.34 | -0.35 | -0.36 | -0.38 | -0.39 | -0.40 |
| 75% | -0.29 | -0.30 | -0.31 | -0.33 | -0.34 | -0.35 | -0.36 | -0.38 | -0.39 |

FIG. 26A

Difference Between Treatment vs. Control Groups under Various Control Group Outcomes and Treatment Effect Sizes

| | | Change from Baseline - Control Group (diopters) | | | | | | | | |
|---|---|---|---|---|---|---|---|---|---|---|
| | | -1.15 | -1.20 | -1.25 | -1.30 | -1.35 | -1.40 | -1.45 | -1.50 | -1.55 |
| % reduction in progression vs. control | 40% | 0.46 | 0.48 | 0.50 | 0.52 | 0.54 | 0.56 | 0.58 | 0.60 | 0.62 |
| | 41% | 0.47 | 0.49 | 0.51 | 0.53 | 0.55 | 0.57 | 0.59 | 0.62 | 0.64 |
| | 42% | 0.48 | 0.50 | 0.53 | 0.55 | 0.57 | 0.59 | 0.61 | 0.63 | 0.65 |
| | 43% | 0.49 | 0.52 | 0.54 | 0.56 | 0.58 | 0.60 | 0.62 | 0.65 | 0.67 |
| | 44% | 0.51 | 0.53 | 0.55 | 0.57 | 0.59 | 0.62 | 0.64 | 0.66 | 0.68 |
| | 45% | 0.52 | 0.54 | 0.56 | 0.59 | 0.61 | 0.63 | 0.65 | 0.68 | 0.70 |
| | 46% | 0.53 | 0.55 | 0.58 | 0.60 | 0.62 | 0.64 | 0.67 | 0.69 | 0.71 |
| | 47% | 0.54 | 0.56 | 0.59 | 0.61 | 0.63 | 0.66 | 0.68 | 0.71 | 0.73 |
| | 48% | 0.55 | 0.58 | 0.60 | 0.62 | 0.65 | 0.67 | 0.70 | 0.72 | 0.74 |
| | 49% | 0.56 | 0.59 | 0.61 | 0.64 | 0.66 | 0.69 | 0.71 | 0.74 | 0.76 |
| | 50% | 0.58 | 0.60 | 0.63 | 0.65 | 0.68 | 0.70 | 0.73 | 0.75 | 0.78 |
| | 51% | 0.59 | 0.61 | 0.64 | 0.66 | 0.69 | 0.71 | 0.74 | 0.77 | 0.79 |
| | 52% | 0.60 | 0.62 | 0.65 | 0.68 | 0.70 | 0.73 | 0.75 | 0.78 | 0.81 |
| | 53% | 0.61 | 0.64 | 0.66 | 0.69 | 0.72 | 0.74 | 0.77 | 0.80 | 0.82 |
| | 54% | 0.62 | 0.65 | 0.68 | 0.70 | 0.73 | 0.76 | 0.78 | 0.81 | 0.84 |
| | 55% | 0.63 | 0.66 | 0.69 | 0.72 | 0.74 | 0.77 | 0.80 | 0.83 | 0.85 |
| | 56% | 0.64 | 0.67 | 0.70 | 0.73 | 0.76 | 0.78 | 0.81 | 0.84 | 0.87 |
| | 57% | 0.66 | 0.68 | 0.71 | 0.74 | 0.77 | 0.80 | 0.83 | 0.86 | 0.88 |
| | 58% | 0.67 | 0.70 | 0.73 | 0.75 | 0.78 | 0.81 | 0.84 | 0.87 | 0.90 |
| | 59% | 0.68 | 0.71 | 0.74 | 0.77 | 0.80 | 0.83 | 0.86 | 0.89 | 0.91 |
| | 60% | 0.69 | 0.72 | 0.75 | 0.78 | 0.81 | 0.84 | 0.87 | 0.90 | 0.93 |
| | 61% | 0.70 | 0.73 | 0.76 | 0.79 | 0.82 | 0.85 | 0.88 | 0.92 | 0.95 |
| | 62% | 0.71 | 0.74 | 0.78 | 0.81 | 0.84 | 0.87 | 0.90 | 0.93 | 0.96 |
| | 63% | 0.72 | 0.76 | 0.79 | 0.82 | 0.85 | 0.88 | 0.91 | 0.95 | 0.98 |
| | 64% | 0.74 | 0.77 | 0.80 | 0.83 | 0.86 | 0.90 | 0.93 | 0.96 | 0.99 |
| | 65% | 0.75 | 0.78 | 0.81 | 0.85 | 0.88 | 0.91 | 0.94 | 0.98 | 1.01 |
| | 66% | 0.76 | 0.79 | 0.83 | 0.86 | 0.89 | 0.92 | 0.96 | 0.99 | 1.02 |
| | 67% | 0.77 | 0.80 | 0.84 | 0.87 | 0.90 | 0.94 | 0.97 | 1.01 | 1.04 |
| | 68% | 0.78 | 0.82 | 0.85 | 0.88 | 0.92 | 0.95 | 0.99 | 1.02 | 1.05 |
| | 69% | 0.79 | 0.83 | 0.86 | 0.90 | 0.93 | 0.97 | 1.00 | 1.04 | 1.07 |
| | 70% | 0.81 | 0.84 | 0.88 | 0.91 | 0.95 | 0.98 | 1.02 | 1.05 | 1.09 |
| | 71% | 0.82 | 0.85 | 0.89 | 0.92 | 0.96 | 0.99 | 1.03 | 1.07 | 1.10 |
| | 72% | 0.83 | 0.86 | 0.90 | 0.94 | 0.97 | 1.01 | 1.04 | 1.08 | 1.12 |
| | 73% | 0.84 | 0.88 | 0.91 | 0.95 | 0.99 | 1.02 | 1.06 | 1.10 | 1.13 |
| | 74% | 0.85 | 0.89 | 0.93 | 0.96 | 1.00 | 1.04 | 1.07 | 1.11 | 1.15 |
| | 75% | 0.86 | 0.90 | 0.94 | 0.98 | 1.01 | 1.05 | 1.09 | 1.13 | 1.16 |

FIG. 26B

Treatment Group Change from Baseline under Various Control Group Outcomes and Treatment Effect Sizes

| | Change from Baseline - Control Group (diopters) | | | | | | | | |
|---|---|---|---|---|---|---|---|---|---|
| % reduction in progression vs. control | -1.70 | -1.75 | -1.80 | -1.85 | -1.90 | -1.95 | -2.00 | -2.05 | -2.10 |
| 40% | -1.02 | -1.05 | -1.08 | -1.11 | -1.14 | -1.17 | -1.20 | -1.23 | -1.26 |
| 41% | -1.00 | -1.03 | -1.06 | -1.09 | -1.12 | -1.15 | -1.18 | -1.21 | -1.24 |
| 42% | -0.99 | -1.02 | -1.04 | -1.07 | -1.10 | -1.13 | -1.16 | -1.19 | -1.22 |
| 43% | -0.97 | -1.00 | -1.03 | -1.05 | -1.08 | -1.11 | -1.14 | -1.17 | -1.20 |
| 44% | -0.95 | -0.98 | -1.01 | -1.04 | -1.06 | -1.09 | -1.12 | -1.15 | -1.18 |
| 45% | -0.94 | -0.96 | -0.99 | -1.02 | -1.05 | -1.07 | -1.10 | -1.13 | -1.16 |
| 46% | -0.92 | -0.95 | -0.97 | -1.00 | -1.03 | -1.05 | -1.08 | -1.11 | -1.13 |
| 47% | -0.90 | -0.93 | -0.95 | -0.98 | -1.01 | -1.03 | -1.06 | -1.09 | -1.11 |
| 48% | -0.88 | -0.91 | -0.94 | -0.96 | -0.99 | -1.01 | -1.04 | -1.07 | -1.09 |
| 49% | -0.87 | -0.89 | -0.92 | -0.94 | -0.97 | -0.99 | -1.02 | -1.05 | -1.07 |
| 50% | -0.85 | -0.88 | -0.90 | -0.93 | -0.95 | -0.98 | -1.00 | -1.03 | -1.05 |
| 51% | -0.83 | -0.86 | -0.88 | -0.91 | -0.93 | -0.96 | -0.98 | -1.00 | -1.03 |
| 52% | -0.82 | -0.84 | -0.86 | -0.89 | -0.91 | -0.94 | -0.96 | -0.98 | -1.01 |
| 53% | -0.80 | -0.82 | -0.85 | -0.87 | -0.89 | -0.92 | -0.94 | -0.96 | -0.99 |
| 54% | -0.78 | -0.81 | -0.83 | -0.85 | -0.87 | -0.90 | -0.92 | -0.94 | -0.97 |
| 55% | -0.77 | -0.79 | -0.81 | -0.83 | -0.86 | -0.88 | -0.90 | -0.92 | -0.95 |
| 56% | -0.75 | -0.77 | -0.79 | -0.81 | -0.84 | -0.86 | -0.88 | -0.90 | -0.92 |
| 57% | -0.73 | -0.75 | -0.77 | -0.80 | -0.82 | -0.84 | -0.86 | -0.88 | -0.90 |
| 58% | -0.71 | -0.74 | -0.76 | -0.78 | -0.80 | -0.82 | -0.84 | -0.86 | -0.88 |
| 59% | -0.70 | -0.72 | -0.74 | -0.76 | -0.78 | -0.80 | -0.82 | -0.84 | -0.86 |
| 60% | -0.68 | -0.70 | -0.72 | -0.74 | -0.76 | -0.78 | -0.80 | -0.82 | -0.84 |
| 61% | -0.66 | -0.68 | -0.70 | -0.72 | -0.74 | -0.76 | -0.78 | -0.80 | -0.82 |
| 62% | -0.65 | -0.67 | -0.68 | -0.70 | -0.72 | -0.74 | -0.76 | -0.78 | -0.80 |
| 63% | -0.63 | -0.65 | -0.67 | -0.68 | -0.70 | -0.72 | -0.74 | -0.76 | -0.78 |
| 64% | -0.61 | -0.63 | -0.65 | -0.67 | -0.68 | -0.70 | -0.72 | -0.74 | -0.76 |
| 65% | -0.60 | -0.61 | -0.63 | -0.65 | -0.67 | -0.68 | -0.70 | -0.72 | -0.73 |
| 66% | -0.58 | -0.60 | -0.61 | -0.63 | -0.65 | -0.66 | -0.68 | -0.70 | -0.71 |
| 67% | -0.56 | -0.58 | -0.59 | -0.61 | -0.63 | -0.64 | -0.66 | -0.68 | -0.69 |
| 68% | -0.54 | -0.56 | -0.58 | -0.59 | -0.61 | -0.62 | -0.64 | -0.66 | -0.67 |
| 69% | -0.53 | -0.54 | -0.56 | -0.57 | -0.59 | -0.60 | -0.62 | -0.64 | -0.65 |
| 70% | -0.51 | -0.52 | -0.54 | -0.55 | -0.57 | -0.59 | -0.60 | -0.61 | -0.63 |
| 71% | -0.49 | -0.51 | -0.52 | -0.54 | -0.55 | -0.57 | -0.58 | -0.59 | -0.61 |
| 72% | -0.48 | -0.49 | -0.50 | -0.52 | -0.53 | -0.55 | -0.56 | -0.57 | -0.59 |
| 73% | -0.46 | -0.47 | -0.49 | -0.50 | -0.51 | -0.53 | -0.54 | -0.55 | -0.57 |
| 74% | -0.44 | -0.45 | -0.47 | -0.48 | -0.49 | -0.51 | -0.52 | -0.53 | -0.55 |
| 75% | -0.42 | -0.44 | -0.45 | -0.46 | -0.47 | -0.49 | -0.50 | -0.51 | -0.52 |

FIG. 27A

Difference Between Treatment vs. Control Groups under Various Control Group Outcomes and Treatment Effect Sizes

| | | Change from Baseline - Control Group (diopters) | | | | | | | | |
|---|---|---|---|---|---|---|---|---|---|---|
| | | -1.70 | -1.75 | -1.80 | -1.85 | -1.90 | -1.95 | -2.00 | -2.05 | -2.10 |
| % reduction in progression vs. control | 40% | 0.68 | 0.70 | 0.72 | 0.74 | 0.76 | 0.78 | 0.80 | 0.82 | 0.84 |
| | 41% | 0.70 | 0.72 | 0.74 | 0.76 | 0.78 | 0.80 | 0.82 | 0.84 | 0.86 |
| | 42% | 0.71 | 0.74 | 0.76 | 0.78 | 0.80 | 0.82 | 0.84 | 0.86 | 0.88 |
| | 43% | 0.73 | 0.75 | 0.77 | 0.80 | 0.82 | 0.84 | 0.86 | 0.88 | 0.90 |
| | 44% | 0.75 | 0.77 | 0.79 | 0.81 | 0.84 | 0.86 | 0.88 | 0.90 | 0.92 |
| | 45% | 0.77 | 0.79 | 0.81 | 0.83 | 0.86 | 0.88 | 0.90 | 0.92 | 0.95 |
| | 46% | 0.78 | 0.81 | 0.83 | 0.85 | 0.87 | 0.90 | 0.92 | 0.94 | 0.97 |
| | 47% | 0.80 | 0.82 | 0.85 | 0.87 | 0.89 | 0.92 | 0.94 | 0.96 | 0.99 |
| | 48% | 0.82 | 0.84 | 0.86 | 0.89 | 0.91 | 0.94 | 0.96 | 0.98 | 1.01 |
| | 49% | 0.83 | 0.86 | 0.88 | 0.91 | 0.93 | 0.96 | 0.98 | 1.00 | 1.03 |
| | 50% | 0.85 | 0.88 | 0.90 | 0.93 | 0.95 | 0.98 | 1.00 | 1.03 | 1.05 |
| | 51% | 0.87 | 0.89 | 0.92 | 0.94 | 0.97 | 0.99 | 1.02 | 1.05 | 1.07 |
| | 52% | 0.88 | 0.91 | 0.94 | 0.96 | 0.99 | 1.01 | 1.04 | 1.07 | 1.09 |
| | 53% | 0.90 | 0.93 | 0.95 | 0.98 | 1.01 | 1.03 | 1.06 | 1.09 | 1.11 |
| | 54% | 0.92 | 0.95 | 0.97 | 1.00 | 1.03 | 1.05 | 1.08 | 1.11 | 1.13 |
| | 55% | 0.94 | 0.96 | 0.99 | 1.02 | 1.05 | 1.07 | 1.10 | 1.13 | 1.16 |
| | 56% | 0.95 | 0.98 | 1.01 | 1.04 | 1.06 | 1.09 | 1.12 | 1.15 | 1.18 |
| | 57% | 0.97 | 1.00 | 1.03 | 1.05 | 1.08 | 1.11 | 1.14 | 1.17 | 1.20 |
| | 58% | 0.99 | 1.02 | 1.04 | 1.07 | 1.10 | 1.13 | 1.16 | 1.19 | 1.22 |
| | 59% | 1.00 | 1.03 | 1.06 | 1.09 | 1.12 | 1.15 | 1.18 | 1.21 | 1.24 |
| | 60% | 1.02 | 1.05 | 1.08 | 1.11 | 1.14 | 1.17 | 1.20 | 1.23 | 1.26 |
| | 61% | 1.04 | 1.07 | 1.10 | 1.13 | 1.16 | 1.19 | 1.22 | 1.25 | 1.28 |
| | 62% | 1.05 | 1.09 | 1.12 | 1.15 | 1.18 | 1.21 | 1.24 | 1.27 | 1.30 |
| | 63% | 1.07 | 1.10 | 1.13 | 1.17 | 1.20 | 1.23 | 1.26 | 1.29 | 1.32 |
| | 64% | 1.09 | 1.12 | 1.15 | 1.18 | 1.22 | 1.25 | 1.28 | 1.31 | 1.34 |
| | 65% | 1.11 | 1.14 | 1.17 | 1.20 | 1.24 | 1.27 | 1.30 | 1.33 | 1.37 |
| | 66% | 1.12 | 1.16 | 1.19 | 1.22 | 1.25 | 1.29 | 1.32 | 1.35 | 1.39 |
| | 67% | 1.14 | 1.17 | 1.21 | 1.24 | 1.27 | 1.31 | 1.34 | 1.37 | 1.41 |
| | 68% | 1.16 | 1.19 | 1.22 | 1.26 | 1.29 | 1.33 | 1.36 | 1.39 | 1.43 |
| | 69% | 1.17 | 1.21 | 1.24 | 1.28 | 1.31 | 1.35 | 1.38 | 1.41 | 1.45 |
| | 70% | 1.19 | 1.23 | 1.26 | 1.30 | 1.33 | 1.37 | 1.40 | 1.44 | 1.47 |
| | 71% | 1.21 | 1.24 | 1.28 | 1.31 | 1.35 | 1.38 | 1.42 | 1.46 | 1.49 |
| | 72% | 1.22 | 1.26 | 1.30 | 1.33 | 1.37 | 1.40 | 1.44 | 1.48 | 1.51 |
| | 73% | 1.24 | 1.28 | 1.31 | 1.35 | 1.39 | 1.42 | 1.46 | 1.50 | 1.53 |
| | 74% | 1.26 | 1.30 | 1.33 | 1.37 | 1.41 | 1.44 | 1.48 | 1.52 | 1.55 |
| | 75% | 1.28 | 1.31 | 1.35 | 1.39 | 1.43 | 1.46 | 1.50 | 1.54 | 1.58 |

FIG. 27B

Treatment Group Change from Baseline under Various Control Group Outcomes and Treatment Effect Sizes

| % reduction in progression vs. control | Change from Baseline - Control Group (mm) | | | | | | | | | | |
|---|---|---|---|---|---|---|---|---|---|---|---|
| | 0.250 | 0.275 | 0.300 | 0.325 | 0.350 | 0.375 | 0.400 | 0.425 | 0.450 | 0.475 | 0.500 |
| 40% | 0.15 | 0.17 | 0.18 | 0.20 | 0.21 | 0.23 | 0.24 | 0.26 | 0.27 | 0.29 | 0.30 |
| 41% | 0.15 | 0.16 | 0.18 | 0.19 | 0.21 | 0.22 | 0.24 | 0.25 | 0.27 | 0.28 | 0.30 |
| 42% | 0.15 | 0.16 | 0.17 | 0.19 | 0.20 | 0.22 | 0.23 | 0.25 | 0.26 | 0.28 | 0.29 |
| 43% | 0.14 | 0.16 | 0.17 | 0.19 | 0.20 | 0.21 | 0.23 | 0.24 | 0.26 | 0.27 | 0.29 |
| 44% | 0.14 | 0.15 | 0.17 | 0.18 | 0.20 | 0.21 | 0.22 | 0.24 | 0.25 | 0.27 | 0.28 |
| 45% | 0.14 | 0.15 | 0.17 | 0.18 | 0.19 | 0.21 | 0.22 | 0.23 | 0.25 | 0.26 | 0.28 |
| 46% | 0.14 | 0.15 | 0.16 | 0.18 | 0.19 | 0.20 | 0.22 | 0.23 | 0.24 | 0.26 | 0.27 |
| 47% | 0.13 | 0.15 | 0.16 | 0.17 | 0.19 | 0.20 | 0.21 | 0.23 | 0.24 | 0.25 | 0.27 |
| 48% | 0.13 | 0.14 | 0.16 | 0.17 | 0.18 | 0.20 | 0.21 | 0.22 | 0.23 | 0.25 | 0.26 |
| 49% | 0.13 | 0.14 | 0.15 | 0.17 | 0.18 | 0.19 | 0.20 | 0.22 | 0.23 | 0.24 | 0.26 |
| 50% | 0.13 | 0.14 | 0.15 | 0.16 | 0.18 | 0.19 | 0.20 | 0.21 | 0.23 | 0.24 | 0.25 |
| 51% | 0.12 | 0.13 | 0.15 | 0.16 | 0.17 | 0.18 | 0.20 | 0.21 | 0.22 | 0.23 | 0.25 |
| 52% | 0.12 | 0.13 | 0.14 | 0.16 | 0.17 | 0.18 | 0.19 | 0.20 | 0.22 | 0.23 | 0.24 |
| 53% | 0.12 | 0.13 | 0.14 | 0.15 | 0.16 | 0.18 | 0.19 | 0.20 | 0.21 | 0.22 | 0.24 |
| 54% | 0.12 | 0.13 | 0.14 | 0.15 | 0.16 | 0.17 | 0.18 | 0.20 | 0.21 | 0.22 | 0.23 |
| 55% | 0.11 | 0.12 | 0.14 | 0.15 | 0.16 | 0.17 | 0.18 | 0.19 | 0.20 | 0.21 | 0.23 |
| 56% | 0.11 | 0.12 | 0.13 | 0.14 | 0.15 | 0.17 | 0.18 | 0.19 | 0.20 | 0.21 | 0.22 |
| 57% | 0.11 | 0.12 | 0.13 | 0.14 | 0.15 | 0.16 | 0.17 | 0.18 | 0.19 | 0.20 | 0.22 |
| 58% | 0.11 | 0.12 | 0.13 | 0.14 | 0.15 | 0.16 | 0.17 | 0.18 | 0.19 | 0.20 | 0.21 |
| 59% | 0.10 | 0.11 | 0.12 | 0.13 | 0.14 | 0.15 | 0.16 | 0.17 | 0.18 | 0.19 | 0.21 |
| 60% | 0.10 | 0.11 | 0.12 | 0.13 | 0.14 | 0.15 | 0.16 | 0.17 | 0.18 | 0.19 | 0.20 |
| 61% | 0.10 | 0.11 | 0.12 | 0.13 | 0.14 | 0.15 | 0.16 | 0.17 | 0.18 | 0.19 | 0.20 |
| 62% | 0.09 | 0.10 | 0.11 | 0.12 | 0.13 | 0.14 | 0.15 | 0.16 | 0.17 | 0.18 | 0.19 |
| 63% | 0.09 | 0.10 | 0.11 | 0.12 | 0.13 | 0.14 | 0.15 | 0.16 | 0.17 | 0.18 | 0.19 |
| 64% | 0.09 | 0.10 | 0.11 | 0.12 | 0.13 | 0.14 | 0.14 | 0.15 | 0.16 | 0.17 | 0.18 |
| 65% | 0.09 | 0.10 | 0.11 | 0.11 | 0.12 | 0.13 | 0.14 | 0.15 | 0.16 | 0.17 | 0.18 |
| 66% | 0.08 | 0.09 | 0.10 | 0.11 | 0.12 | 0.13 | 0.14 | 0.14 | 0.15 | 0.16 | 0.17 |
| 67% | 0.08 | 0.09 | 0.10 | 0.11 | 0.12 | 0.12 | 0.13 | 0.14 | 0.15 | 0.16 | 0.17 |
| 68% | 0.08 | 0.09 | 0.10 | 0.10 | 0.11 | 0.12 | 0.13 | 0.14 | 0.14 | 0.15 | 0.16 |
| 69% | 0.08 | 0.09 | 0.09 | 0.10 | 0.11 | 0.12 | 0.12 | 0.13 | 0.14 | 0.15 | 0.16 |
| 70% | 0.07 | 0.08 | 0.09 | 0.10 | 0.11 | 0.11 | 0.12 | 0.13 | 0.14 | 0.14 | 0.15 |
| 71% | 0.07 | 0.08 | 0.09 | 0.09 | 0.10 | 0.11 | 0.12 | 0.12 | 0.13 | 0.14 | 0.15 |
| 72% | 0.07 | 0.08 | 0.08 | 0.09 | 0.10 | 0.11 | 0.11 | 0.12 | 0.13 | 0.13 | 0.14 |
| 73% | 0.07 | 0.07 | 0.08 | 0.09 | 0.09 | 0.10 | 0.11 | 0.11 | 0.12 | 0.13 | 0.14 |
| 74% | 0.06 | 0.07 | 0.08 | 0.08 | 0.09 | 0.10 | 0.10 | 0.11 | 0.12 | 0.12 | 0.13 |
| 75% | 0.06 | 0.07 | 0.07 | 0.08 | 0.09 | 0.09 | 0.10 | 0.11 | 0.11 | 0.12 | 0.13 |

FIG. 28A

Difference Between Treatment vs. Control Groups under Various Control Group Outcomes and Treatment Effect Sizes

|  | Change from Baseline - Control Group (mm) | | | | | | | | | | |
|---|---|---|---|---|---|---|---|---|---|---|---|
| % reduction in progression vs. control | | 0.250 | 0.275 | 0.300 | 0.325 | 0.350 | 0.375 | 0.400 | 0.425 | 0.450 | 0.475 | 0.500 |
| | 40% | -0.10 | -0.11 | -0.12 | -0.13 | -0.14 | -0.15 | -0.16 | -0.17 | -0.18 | -0.19 | -0.20 |
| | 41% | -0.10 | -0.11 | -0.12 | -0.13 | -0.14 | -0.15 | -0.16 | -0.17 | -0.18 | -0.19 | -0.21 |
| | 42% | -0.11 | -0.12 | -0.13 | -0.14 | -0.15 | -0.16 | -0.17 | -0.18 | -0.19 | -0.20 | -0.21 |
| | 43% | -0.11 | -0.12 | -0.13 | -0.14 | -0.15 | -0.16 | -0.17 | -0.18 | -0.19 | -0.20 | -0.22 |
| | 44% | -0.11 | -0.12 | -0.13 | -0.14 | -0.15 | -0.17 | -0.18 | -0.19 | -0.20 | -0.21 | -0.22 |
| | 45% | -0.11 | -0.12 | -0.14 | -0.15 | -0.16 | -0.17 | -0.18 | -0.19 | -0.20 | -0.21 | -0.23 |
| | 46% | -0.12 | -0.13 | -0.14 | -0.15 | -0.16 | -0.17 | -0.18 | -0.20 | -0.21 | -0.22 | -0.23 |
| | 47% | -0.12 | -0.13 | -0.14 | -0.15 | -0.16 | -0.18 | -0.19 | -0.20 | -0.21 | -0.22 | -0.24 |
| | 48% | -0.12 | -0.13 | -0.14 | -0.16 | -0.17 | -0.18 | -0.19 | -0.20 | -0.22 | -0.23 | -0.24 |
| | 49% | -0.12 | -0.13 | -0.15 | -0.16 | -0.17 | -0.18 | -0.20 | -0.21 | -0.22 | -0.23 | -0.25 |
| | 50% | -0.13 | -0.14 | -0.15 | -0.16 | -0.18 | -0.19 | -0.20 | -0.21 | -0.23 | -0.24 | -0.25 |
| | 51% | -0.13 | -0.14 | -0.15 | -0.17 | -0.18 | -0.19 | -0.20 | -0.22 | -0.23 | -0.24 | -0.26 |
| | 52% | -0.13 | -0.14 | -0.16 | -0.17 | -0.18 | -0.20 | -0.21 | -0.22 | -0.23 | -0.25 | -0.26 |
| | 53% | -0.13 | -0.15 | -0.16 | -0.17 | -0.19 | -0.20 | -0.21 | -0.23 | -0.24 | -0.25 | -0.27 |
| | 54% | -0.14 | -0.15 | -0.16 | -0.18 | -0.19 | -0.20 | -0.22 | -0.23 | -0.24 | -0.26 | -0.27 |
| | 55% | -0.14 | -0.15 | -0.17 | -0.18 | -0.19 | -0.21 | -0.22 | -0.23 | -0.25 | -0.26 | -0.28 |
| | 56% | -0.14 | -0.15 | -0.17 | -0.18 | -0.20 | -0.21 | -0.22 | -0.24 | -0.25 | -0.27 | -0.28 |
| | 57% | -0.14 | -0.16 | -0.17 | -0.19 | -0.20 | -0.21 | -0.23 | -0.24 | -0.26 | -0.27 | -0.29 |
| | 58% | -0.15 | -0.16 | -0.17 | -0.19 | -0.20 | -0.22 | -0.23 | -0.25 | -0.26 | -0.28 | -0.29 |
| | 59% | -0.15 | -0.16 | -0.18 | -0.19 | -0.21 | -0.22 | -0.24 | -0.25 | -0.27 | -0.28 | -0.30 |
| | 60% | -0.15 | -0.17 | -0.18 | -0.20 | -0.21 | -0.23 | -0.24 | -0.26 | -0.27 | -0.29 | -0.30 |
| | 61% | -0.15 | -0.17 | -0.18 | -0.20 | -0.21 | -0.23 | -0.24 | -0.26 | -0.27 | -0.29 | -0.31 |
| | 62% | -0.16 | -0.17 | -0.19 | -0.20 | -0.22 | -0.23 | -0.25 | -0.26 | -0.28 | -0.29 | -0.31 |
| | 63% | -0.16 | -0.17 | -0.19 | -0.20 | -0.22 | -0.24 | -0.25 | -0.27 | -0.28 | -0.30 | -0.32 |
| | 64% | -0.16 | -0.18 | -0.19 | -0.21 | -0.22 | -0.24 | -0.26 | -0.27 | -0.29 | -0.30 | -0.32 |
| | 65% | -0.16 | -0.18 | -0.20 | -0.21 | -0.23 | -0.24 | -0.26 | -0.28 | -0.29 | -0.31 | -0.33 |
| | 66% | -0.17 | -0.18 | -0.20 | -0.21 | -0.23 | -0.25 | -0.26 | -0.28 | -0.30 | -0.31 | -0.33 |
| | 67% | -0.17 | -0.18 | -0.20 | -0.22 | -0.23 | -0.25 | -0.27 | -0.28 | -0.30 | -0.32 | -0.34 |
| | 68% | -0.17 | -0.19 | -0.20 | -0.22 | -0.24 | -0.26 | -0.27 | -0.29 | -0.31 | -0.32 | -0.34 |
| | 69% | -0.17 | -0.19 | -0.21 | -0.22 | -0.24 | -0.26 | -0.28 | -0.29 | -0.31 | -0.33 | -0.35 |
| | 70% | -0.18 | -0.19 | -0.21 | -0.23 | -0.25 | -0.26 | -0.28 | -0.30 | -0.32 | -0.33 | -0.35 |
| | 71% | -0.18 | -0.20 | -0.21 | -0.23 | -0.25 | -0.27 | -0.28 | -0.30 | -0.32 | -0.34 | -0.36 |
| | 72% | -0.18 | -0.20 | -0.22 | -0.23 | -0.25 | -0.27 | -0.29 | -0.31 | -0.32 | -0.34 | -0.36 |
| | 73% | -0.18 | -0.20 | -0.22 | -0.24 | -0.26 | -0.27 | -0.29 | -0.31 | -0.33 | -0.35 | -0.37 |
| | 74% | -0.19 | -0.20 | -0.22 | -0.24 | -0.26 | -0.28 | -0.30 | -0.31 | -0.33 | -0.35 | -0.37 |
| | 75% | -0.19 | -0.21 | -0.23 | -0.24 | -0.26 | -0.28 | -0.30 | -0.32 | -0.34 | -0.36 | -0.38 |

FIG. 28B

Treatment Group Change from Baseline under Various Control Group Outcomes and Treatment Effect Sizes

| | | Change from Baseline - Control Group (mm) | | | | | | | | | | |
|---|---|---|---|---|---|---|---|---|---|---|---|---|
| | | 0.500 | 0.525 | 0.550 | 0.575 | 0.600 | 0.625 | 0.650 | 0.675 | 0.700 | 0.725 | 0.750 |
| % reduction in progression vs. control | 40% | 0.30 | 0.32 | 0.33 | 0.35 | 0.36 | 0.38 | 0.39 | 0.41 | 0.42 | 0.44 | 0.45 |
| | 41% | 0.30 | 0.31 | 0.32 | 0.34 | 0.35 | 0.37 | 0.38 | 0.40 | 0.41 | 0.43 | 0.44 |
| | 42% | 0.29 | 0.30 | 0.32 | 0.33 | 0.35 | 0.36 | 0.38 | 0.39 | 0.41 | 0.42 | 0.44 |
| | 43% | 0.29 | 0.30 | 0.31 | 0.33 | 0.34 | 0.36 | 0.37 | 0.38 | 0.40 | 0.41 | 0.43 |
| | 44% | 0.28 | 0.29 | 0.31 | 0.32 | 0.34 | 0.35 | 0.36 | 0.38 | 0.39 | 0.41 | 0.42 |
| | 45% | 0.28 | 0.29 | 0.30 | 0.32 | 0.33 | 0.34 | 0.36 | 0.37 | 0.39 | 0.40 | 0.41 |
| | 46% | 0.27 | 0.28 | 0.30 | 0.31 | 0.32 | 0.34 | 0.35 | 0.36 | 0.38 | 0.39 | 0.41 |
| | 47% | 0.27 | 0.28 | 0.29 | 0.30 | 0.32 | 0.33 | 0.34 | 0.36 | 0.37 | 0.38 | 0.40 |
| | 48% | 0.26 | 0.27 | 0.29 | 0.30 | 0.31 | 0.33 | 0.34 | 0.35 | 0.36 | 0.38 | 0.39 |
| | 49% | 0.26 | 0.27 | 0.28 | 0.29 | 0.31 | 0.32 | 0.33 | 0.34 | 0.36 | 0.37 | 0.38 |
| | 50% | 0.25 | 0.26 | 0.28 | 0.29 | 0.30 | 0.31 | 0.33 | 0.34 | 0.35 | 0.36 | 0.38 |
| | 51% | 0.25 | 0.26 | 0.27 | 0.28 | 0.29 | 0.31 | 0.32 | 0.33 | 0.34 | 0.36 | 0.37 |
| | 52% | 0.24 | 0.25 | 0.26 | 0.28 | 0.29 | 0.30 | 0.31 | 0.32 | 0.34 | 0.35 | 0.36 |
| | 53% | 0.24 | 0.25 | 0.26 | 0.27 | 0.28 | 0.29 | 0.31 | 0.32 | 0.33 | 0.34 | 0.35 |
| | 54% | 0.23 | 0.24 | 0.25 | 0.26 | 0.28 | 0.29 | 0.30 | 0.31 | 0.32 | 0.33 | 0.35 |
| | 55% | 0.23 | 0.24 | 0.25 | 0.26 | 0.27 | 0.28 | 0.29 | 0.30 | 0.32 | 0.33 | 0.34 |
| | 56% | 0.22 | 0.23 | 0.24 | 0.25 | 0.26 | 0.28 | 0.29 | 0.30 | 0.31 | 0.32 | 0.33 |
| | 57% | 0.22 | 0.23 | 0.24 | 0.25 | 0.26 | 0.27 | 0.28 | 0.29 | 0.30 | 0.31 | 0.32 |
| | 58% | 0.21 | 0.22 | 0.23 | 0.24 | 0.25 | 0.26 | 0.27 | 0.28 | 0.29 | 0.30 | 0.32 |
| | 59% | 0.21 | 0.22 | 0.23 | 0.24 | 0.25 | 0.26 | 0.27 | 0.28 | 0.29 | 0.30 | 0.31 |
| | 60% | 0.20 | 0.21 | 0.22 | 0.23 | 0.24 | 0.25 | 0.26 | 0.27 | 0.28 | 0.29 | 0.30 |
| | 61% | 0.20 | 0.20 | 0.21 | 0.22 | 0.23 | 0.24 | 0.25 | 0.26 | 0.27 | 0.28 | 0.29 |
| | 62% | 0.19 | 0.20 | 0.21 | 0.22 | 0.23 | 0.24 | 0.25 | 0.26 | 0.27 | 0.28 | 0.29 |
| | 63% | 0.19 | 0.19 | 0.20 | 0.21 | 0.22 | 0.23 | 0.24 | 0.25 | 0.26 | 0.27 | 0.28 |
| | 64% | 0.18 | 0.19 | 0.20 | 0.21 | 0.22 | 0.23 | 0.23 | 0.24 | 0.25 | 0.26 | 0.27 |
| | 65% | 0.18 | 0.18 | 0.19 | 0.20 | 0.21 | 0.22 | 0.23 | 0.24 | 0.25 | 0.25 | 0.26 |
| | 66% | 0.17 | 0.18 | 0.19 | 0.20 | 0.20 | 0.21 | 0.22 | 0.23 | 0.24 | 0.25 | 0.26 |
| | 67% | 0.17 | 0.17 | 0.18 | 0.19 | 0.20 | 0.21 | 0.21 | 0.22 | 0.23 | 0.24 | 0.25 |
| | 68% | 0.16 | 0.17 | 0.18 | 0.18 | 0.19 | 0.20 | 0.21 | 0.22 | 0.22 | 0.23 | 0.24 |
| | 69% | 0.16 | 0.16 | 0.17 | 0.18 | 0.19 | 0.19 | 0.20 | 0.21 | 0.22 | 0.22 | 0.23 |
| | 70% | 0.15 | 0.16 | 0.17 | 0.17 | 0.18 | 0.19 | 0.20 | 0.20 | 0.21 | 0.22 | 0.23 |
| | 71% | 0.15 | 0.15 | 0.16 | 0.17 | 0.17 | 0.18 | 0.19 | 0.20 | 0.20 | 0.21 | 0.22 |
| | 72% | 0.14 | 0.15 | 0.15 | 0.16 | 0.17 | 0.18 | 0.18 | 0.19 | 0.20 | 0.20 | 0.21 |
| | 73% | 0.14 | 0.14 | 0.15 | 0.16 | 0.16 | 0.17 | 0.18 | 0.18 | 0.19 | 0.20 | 0.20 |
| | 74% | 0.13 | 0.14 | 0.14 | 0.15 | 0.16 | 0.16 | 0.17 | 0.18 | 0.18 | 0.19 | 0.20 |
| | 75% | 0.13 | 0.13 | 0.14 | 0.14 | 0.15 | 0.16 | 0.16 | 0.17 | 0.18 | 0.18 | 0.19 |

FIG. 29A

Difference Between Treatment vs. Control Groups under Various Control Group Outcomes and Treatment Effect Sizes

| | | Change from Baseline - Control Group (mm) | | | | | | | | | | |
|---|---|---|---|---|---|---|---|---|---|---|---|---|
| | | 0.500 | 0.525 | 0.550 | 0.575 | 0.600 | 0.625 | 0.650 | 0.675 | 0.700 | 0.725 | 0.750 |
| % reduction in progression vs. control | 40% | -0.20 | -0.21 | -0.22 | -0.23 | -0.24 | -0.25 | -0.26 | -0.27 | -0.28 | -0.29 | -0.30 |
| | 41% | -0.21 | -0.22 | -0.23 | -0.24 | -0.25 | -0.26 | -0.27 | -0.28 | -0.29 | -0.30 | -0.31 |
| | 42% | -0.21 | -0.22 | -0.23 | -0.24 | -0.25 | -0.26 | -0.27 | -0.28 | -0.29 | -0.30 | -0.32 |
| | 43% | -0.22 | -0.23 | -0.24 | -0.25 | -0.26 | -0.27 | -0.28 | -0.29 | -0.30 | -0.31 | -0.32 |
| | 44% | -0.22 | -0.23 | -0.24 | -0.25 | -0.26 | -0.28 | -0.29 | -0.30 | -0.31 | -0.32 | -0.33 |
| | 45% | -0.23 | -0.24 | -0.25 | -0.26 | -0.27 | -0.28 | -0.29 | -0.30 | -0.32 | -0.33 | -0.34 |
| | 46% | -0.23 | -0.24 | -0.25 | -0.26 | -0.28 | -0.29 | -0.30 | -0.31 | -0.32 | -0.33 | -0.35 |
| | 47% | -0.24 | -0.25 | -0.26 | -0.27 | -0.28 | -0.29 | -0.31 | -0.32 | -0.33 | -0.34 | -0.35 |
| | 48% | -0.24 | -0.25 | -0.26 | -0.28 | -0.29 | -0.30 | -0.31 | -0.32 | -0.34 | -0.35 | -0.36 |
| | 49% | -0.25 | -0.26 | -0.27 | -0.28 | -0.29 | -0.31 | -0.32 | -0.33 | -0.34 | -0.36 | -0.37 |
| | 50% | -0.25 | -0.26 | -0.28 | -0.29 | -0.30 | -0.31 | -0.33 | -0.34 | -0.35 | -0.36 | -0.38 |
| | 51% | -0.26 | -0.27 | -0.28 | -0.29 | -0.31 | -0.32 | -0.33 | -0.34 | -0.36 | -0.37 | -0.38 |
| | 52% | -0.26 | -0.27 | -0.29 | -0.30 | -0.31 | -0.33 | -0.34 | -0.35 | -0.36 | -0.38 | -0.39 |
| | 53% | -0.27 | -0.28 | -0.29 | -0.30 | -0.32 | -0.33 | -0.34 | -0.36 | -0.37 | -0.38 | -0.40 |
| | 54% | -0.27 | -0.28 | -0.30 | -0.31 | -0.32 | -0.34 | -0.35 | -0.36 | -0.38 | -0.39 | -0.41 |
| | 55% | -0.28 | -0.29 | -0.30 | -0.32 | -0.33 | -0.34 | -0.36 | -0.37 | -0.39 | -0.40 | -0.41 |
| | 56% | -0.28 | -0.29 | -0.31 | -0.32 | -0.34 | -0.35 | -0.36 | -0.38 | -0.39 | -0.41 | -0.42 |
| | 57% | -0.29 | -0.30 | -0.31 | -0.33 | -0.34 | -0.36 | -0.37 | -0.38 | -0.40 | -0.41 | -0.43 |
| | 58% | -0.29 | -0.30 | -0.32 | -0.33 | -0.35 | -0.36 | -0.38 | -0.39 | -0.41 | -0.42 | -0.44 |
| | 59% | -0.30 | -0.31 | -0.32 | -0.34 | -0.35 | -0.37 | -0.38 | -0.40 | -0.41 | -0.43 | -0.44 |
| | 60% | -0.30 | -0.32 | -0.33 | -0.35 | -0.36 | -0.38 | -0.39 | -0.41 | -0.42 | -0.44 | -0.45 |
| | 61% | -0.31 | -0.32 | -0.34 | -0.35 | -0.37 | -0.38 | -0.40 | -0.41 | -0.43 | -0.44 | -0.46 |
| | 62% | -0.31 | -0.33 | -0.34 | -0.36 | -0.37 | -0.39 | -0.40 | -0.42 | -0.43 | -0.45 | -0.47 |
| | 63% | -0.32 | -0.33 | -0.35 | -0.36 | -0.38 | -0.39 | -0.41 | -0.43 | -0.44 | -0.46 | -0.47 |
| | 64% | -0.32 | -0.34 | -0.35 | -0.37 | -0.38 | -0.40 | -0.42 | -0.43 | -0.45 | -0.46 | -0.48 |
| | 65% | -0.33 | -0.34 | -0.36 | -0.37 | -0.39 | -0.41 | -0.42 | -0.44 | -0.46 | -0.47 | -0.49 |
| | 66% | -0.33 | -0.35 | -0.36 | -0.38 | -0.40 | -0.41 | -0.43 | -0.45 | -0.46 | -0.48 | -0.50 |
| | 67% | -0.34 | -0.35 | -0.37 | -0.39 | -0.40 | -0.42 | -0.44 | -0.45 | -0.47 | -0.49 | -0.50 |
| | 68% | -0.34 | -0.36 | -0.37 | -0.39 | -0.41 | -0.43 | -0.44 | -0.46 | -0.48 | -0.49 | -0.51 |
| | 69% | -0.35 | -0.36 | -0.38 | -0.40 | -0.41 | -0.43 | -0.45 | -0.47 | -0.48 | -0.50 | -0.52 |
| | 70% | -0.35 | -0.37 | -0.39 | -0.40 | -0.42 | -0.44 | -0.46 | -0.47 | -0.49 | -0.51 | -0.53 |
| | 71% | -0.36 | -0.37 | -0.39 | -0.41 | -0.43 | -0.44 | -0.46 | -0.48 | -0.50 | -0.51 | -0.53 |
| | 72% | -0.36 | -0.38 | -0.40 | -0.41 | -0.43 | -0.45 | -0.47 | -0.49 | -0.50 | -0.52 | -0.54 |
| | 73% | -0.37 | -0.38 | -0.40 | -0.42 | -0.44 | -0.46 | -0.47 | -0.49 | -0.51 | -0.53 | -0.55 |
| | 74% | -0.37 | -0.39 | -0.41 | -0.43 | -0.44 | -0.46 | -0.48 | -0.50 | -0.52 | -0.54 | -0.56 |
| | 75% | -0.38 | -0.39 | -0.41 | -0.43 | -0.45 | -0.47 | -0.49 | -0.51 | -0.53 | -0.54 | -0.56 |

FIG. 29B

Treatment Group Change from Baseline under Various Control Group Outcomes and Treatment Effect Sizes

| | | Change from Baseline - Control Group (mm) | | | | | | | | | | |
|---|---|---|---|---|---|---|---|---|---|---|---|---|
| | | 0.800 | 0.825 | 0.850 | 0.875 | 0.900 | 0.925 | 0.950 | 0.975 | 1.000 | 1.025 | 1.050 |
| % reduction in progression vs. control | 40% | 0.48 | 0.50 | 0.51 | 0.53 | 0.54 | 0.56 | 0.57 | 0.59 | 0.60 | 0.62 | 0.63 |
| | 41% | 0.47 | 0.49 | 0.50 | 0.52 | 0.53 | 0.55 | 0.56 | 0.58 | 0.59 | 0.60 | 0.62 |
| | 42% | 0.46 | 0.48 | 0.49 | 0.51 | 0.52 | 0.54 | 0.55 | 0.57 | 0.58 | 0.59 | 0.61 |
| | 43% | 0.46 | 0.47 | 0.48 | 0.50 | 0.51 | 0.53 | 0.54 | 0.56 | 0.57 | 0.58 | 0.60 |
| | 44% | 0.45 | 0.46 | 0.48 | 0.49 | 0.50 | 0.52 | 0.53 | 0.55 | 0.56 | 0.57 | 0.59 |
| | 45% | 0.44 | 0.45 | 0.47 | 0.48 | 0.50 | 0.51 | 0.52 | 0.54 | 0.55 | 0.56 | 0.58 |
| | 46% | 0.43 | 0.45 | 0.46 | 0.47 | 0.49 | 0.50 | 0.51 | 0.53 | 0.54 | 0.55 | 0.57 |
| | 47% | 0.42 | 0.44 | 0.45 | 0.46 | 0.48 | 0.49 | 0.50 | 0.52 | 0.53 | 0.54 | 0.56 |
| | 48% | 0.42 | 0.43 | 0.44 | 0.46 | 0.47 | 0.48 | 0.49 | 0.51 | 0.52 | 0.53 | 0.55 |
| | 49% | 0.41 | 0.42 | 0.43 | 0.45 | 0.46 | 0.47 | 0.48 | 0.50 | 0.51 | 0.52 | 0.54 |
| | 50% | 0.40 | 0.41 | 0.43 | 0.44 | 0.45 | 0.46 | 0.48 | 0.49 | 0.50 | 0.51 | 0.53 |
| | 51% | 0.39 | 0.40 | 0.42 | 0.43 | 0.44 | 0.45 | 0.47 | 0.48 | 0.49 | 0.50 | 0.51 |
| | 52% | 0.38 | 0.40 | 0.41 | 0.42 | 0.43 | 0.44 | 0.46 | 0.47 | 0.48 | 0.49 | 0.50 |
| | 53% | 0.38 | 0.39 | 0.40 | 0.41 | 0.42 | 0.43 | 0.45 | 0.46 | 0.47 | 0.48 | 0.49 |
| | 54% | 0.37 | 0.38 | 0.39 | 0.40 | 0.41 | 0.43 | 0.44 | 0.45 | 0.46 | 0.47 | 0.48 |
| | 55% | 0.36 | 0.37 | 0.38 | 0.39 | 0.41 | 0.42 | 0.43 | 0.44 | 0.45 | 0.46 | 0.47 |
| | 56% | 0.35 | 0.36 | 0.37 | 0.39 | 0.40 | 0.41 | 0.42 | 0.43 | 0.44 | 0.45 | 0.46 |
| | 57% | 0.34 | 0.35 | 0.37 | 0.38 | 0.39 | 0.40 | 0.41 | 0.42 | 0.43 | 0.44 | 0.45 |
| | 58% | 0.34 | 0.35 | 0.36 | 0.37 | 0.38 | 0.39 | 0.40 | 0.41 | 0.42 | 0.43 | 0.44 |
| | 59% | 0.33 | 0.34 | 0.35 | 0.36 | 0.37 | 0.38 | 0.39 | 0.40 | 0.41 | 0.42 | 0.43 |
| | 60% | 0.32 | 0.33 | 0.34 | 0.35 | 0.36 | 0.37 | 0.38 | 0.39 | 0.40 | 0.41 | 0.42 |
| | 61% | 0.31 | 0.32 | 0.33 | 0.34 | 0.35 | 0.36 | 0.37 | 0.38 | 0.39 | 0.40 | 0.41 |
| | 62% | 0.30 | 0.31 | 0.32 | 0.33 | 0.34 | 0.35 | 0.36 | 0.37 | 0.38 | 0.39 | 0.40 |
| | 63% | 0.30 | 0.31 | 0.31 | 0.32 | 0.33 | 0.34 | 0.35 | 0.36 | 0.37 | 0.38 | 0.39 |
| | 64% | 0.29 | 0.30 | 0.31 | 0.32 | 0.32 | 0.33 | 0.34 | 0.35 | 0.36 | 0.37 | 0.38 |
| | 65% | 0.28 | 0.29 | 0.30 | 0.31 | 0.32 | 0.32 | 0.33 | 0.34 | 0.35 | 0.36 | 0.37 |
| | 66% | 0.27 | 0.28 | 0.29 | 0.30 | 0.31 | 0.31 | 0.32 | 0.33 | 0.34 | 0.35 | 0.36 |
| | 67% | 0.26 | 0.27 | 0.28 | 0.29 | 0.30 | 0.31 | 0.31 | 0.32 | 0.33 | 0.34 | 0.35 |
| | 68% | 0.26 | 0.26 | 0.27 | 0.28 | 0.29 | 0.30 | 0.30 | 0.31 | 0.32 | 0.33 | 0.34 |
| | 69% | 0.25 | 0.26 | 0.26 | 0.27 | 0.28 | 0.29 | 0.29 | 0.30 | 0.31 | 0.32 | 0.33 |
| | 70% | 0.24 | 0.25 | 0.26 | 0.26 | 0.27 | 0.28 | 0.29 | 0.29 | 0.30 | 0.31 | 0.32 |
| | 71% | 0.23 | 0.24 | 0.25 | 0.25 | 0.26 | 0.27 | 0.28 | 0.28 | 0.29 | 0.30 | 0.30 |
| | 72% | 0.22 | 0.23 | 0.24 | 0.25 | 0.25 | 0.26 | 0.27 | 0.27 | 0.28 | 0.29 | 0.29 |
| | 73% | 0.22 | 0.22 | 0.23 | 0.24 | 0.24 | 0.25 | 0.26 | 0.26 | 0.27 | 0.28 | 0.28 |
| | 74% | 0.21 | 0.21 | 0.22 | 0.23 | 0.23 | 0.24 | 0.25 | 0.25 | 0.26 | 0.27 | 0.27 |
| | 75% | 0.20 | 0.21 | 0.21 | 0.22 | 0.23 | 0.23 | 0.24 | 0.24 | 0.25 | 0.26 | 0.26 |

FIG. 30A

Difference Between Treatment vs. Control Groups under Various Control Group Outcomes and Treatment Effect Sizes

| % reduction in progression vs. control | Change from Baseline - Control Group (mm) | | | | | | | | | | |
|---|---|---|---|---|---|---|---|---|---|---|---|
| | | 0.800 | 0.825 | 0.850 | 0.875 | 0.900 | 0.925 | 0.950 | 0.975 | 1.000 | 1.025 | 1.050 |
| 40% | -0.32 | -0.33 | -0.34 | -0.35 | -0.36 | -0.37 | -0.38 | -0.39 | -0.40 | -0.41 | -0.42 |
| 41% | -0.33 | -0.34 | -0.35 | -0.36 | -0.37 | -0.38 | -0.39 | -0.40 | -0.41 | -0.42 | -0.43 |
| 42% | -0.34 | -0.35 | -0.36 | -0.37 | -0.38 | -0.39 | -0.40 | -0.41 | -0.42 | -0.43 | -0.44 |
| 43% | -0.34 | -0.35 | -0.37 | -0.38 | -0.39 | -0.40 | -0.41 | -0.42 | -0.43 | -0.44 | -0.45 |
| 44% | -0.35 | -0.36 | -0.37 | -0.39 | -0.40 | -0.41 | -0.42 | -0.43 | -0.44 | -0.45 | -0.46 |
| 45% | -0.36 | -0.37 | -0.38 | -0.39 | -0.41 | -0.42 | -0.43 | -0.44 | -0.45 | -0.46 | -0.47 |
| 46% | -0.37 | -0.38 | -0.39 | -0.40 | -0.41 | -0.43 | -0.44 | -0.45 | -0.46 | -0.47 | -0.48 |
| 47% | -0.38 | -0.39 | -0.40 | -0.41 | -0.42 | -0.43 | -0.45 | -0.46 | -0.47 | -0.48 | -0.49 |
| 48% | -0.38 | -0.40 | -0.41 | -0.42 | -0.43 | -0.44 | -0.46 | -0.47 | -0.48 | -0.49 | -0.50 |
| 49% | -0.39 | -0.40 | -0.42 | -0.43 | -0.44 | -0.45 | -0.47 | -0.48 | -0.49 | -0.50 | -0.51 |
| 50% | -0.40 | -0.41 | -0.43 | -0.44 | -0.45 | -0.46 | -0.48 | -0.49 | -0.50 | -0.51 | -0.53 |
| 51% | -0.41 | -0.42 | -0.43 | -0.45 | -0.46 | -0.47 | -0.48 | -0.50 | -0.51 | -0.52 | -0.54 |
| 52% | -0.42 | -0.43 | -0.44 | -0.46 | -0.47 | -0.48 | -0.49 | -0.51 | -0.52 | -0.53 | -0.55 |
| 53% | -0.42 | -0.44 | -0.45 | -0.46 | -0.48 | -0.49 | -0.50 | -0.52 | -0.53 | -0.54 | -0.56 |
| 54% | -0.43 | -0.45 | -0.46 | -0.47 | -0.49 | -0.50 | -0.51 | -0.53 | -0.54 | -0.55 | -0.57 |
| 55% | -0.44 | -0.45 | -0.47 | -0.48 | -0.50 | -0.51 | -0.52 | -0.54 | -0.55 | -0.56 | -0.58 |
| 56% | -0.45 | -0.46 | -0.48 | -0.49 | -0.50 | -0.52 | -0.53 | -0.55 | -0.56 | -0.57 | -0.59 |
| 57% | -0.46 | -0.47 | -0.48 | -0.50 | -0.51 | -0.53 | -0.54 | -0.56 | -0.57 | -0.58 | -0.60 |
| 58% | -0.46 | -0.48 | -0.49 | -0.51 | -0.52 | -0.54 | -0.55 | -0.57 | -0.58 | -0.59 | -0.61 |
| 59% | -0.47 | -0.49 | -0.50 | -0.52 | -0.53 | -0.55 | -0.56 | -0.58 | -0.59 | -0.60 | -0.62 |
| 60% | -0.48 | -0.50 | -0.51 | -0.53 | -0.54 | -0.56 | -0.57 | -0.59 | -0.60 | -0.62 | -0.63 |
| 61% | -0.49 | -0.50 | -0.52 | -0.53 | -0.55 | -0.56 | -0.58 | -0.59 | -0.61 | -0.63 | -0.64 |
| 62% | -0.50 | -0.51 | -0.53 | -0.54 | -0.56 | -0.57 | -0.59 | -0.60 | -0.62 | -0.64 | -0.65 |
| 63% | -0.50 | -0.52 | -0.54 | -0.55 | -0.57 | -0.58 | -0.60 | -0.61 | -0.63 | -0.65 | -0.66 |
| 64% | -0.51 | -0.53 | -0.54 | -0.56 | -0.58 | -0.59 | -0.61 | -0.62 | -0.64 | -0.66 | -0.67 |
| 65% | -0.52 | -0.54 | -0.55 | -0.57 | -0.59 | -0.60 | -0.62 | -0.63 | -0.65 | -0.67 | -0.68 |
| 66% | -0.53 | -0.54 | -0.56 | -0.58 | -0.59 | -0.61 | -0.63 | -0.64 | -0.66 | -0.68 | -0.69 |
| 67% | -0.54 | -0.55 | -0.57 | -0.59 | -0.60 | -0.62 | -0.64 | -0.65 | -0.67 | -0.69 | -0.70 |
| 68% | -0.54 | -0.56 | -0.58 | -0.60 | -0.61 | -0.63 | -0.65 | -0.66 | -0.68 | -0.70 | -0.71 |
| 69% | -0.55 | -0.57 | -0.59 | -0.60 | -0.62 | -0.64 | -0.66 | -0.67 | -0.69 | -0.71 | -0.72 |
| 70% | -0.56 | -0.58 | -0.60 | -0.61 | -0.63 | -0.65 | -0.67 | -0.68 | -0.70 | -0.72 | -0.74 |
| 71% | -0.57 | -0.59 | -0.60 | -0.62 | -0.64 | -0.66 | -0.67 | -0.69 | -0.71 | -0.73 | -0.75 |
| 72% | -0.58 | -0.59 | -0.61 | -0.63 | -0.65 | -0.67 | -0.68 | -0.70 | -0.72 | -0.74 | -0.76 |
| 73% | -0.58 | -0.60 | -0.62 | -0.64 | -0.66 | -0.68 | -0.69 | -0.71 | -0.73 | -0.75 | -0.77 |
| 74% | -0.59 | -0.61 | -0.63 | -0.65 | -0.67 | -0.68 | -0.70 | -0.72 | -0.74 | -0.76 | -0.78 |
| 75% | -0.60 | -0.62 | -0.64 | -0.66 | -0.68 | -0.69 | -0.71 | -0.73 | -0.75 | -0.77 | -0.79 |

FIG. 30B

METHODS AND DEVICES FOR REDUCING MYOPIA IN CHILDREN

CROSS-REFERENCE TO RELATED APPLICATIONS

This application is a national stage application filed under 35 U.S.C. 371, of PCT application serial number PCT/US2019/041605, filed Jul. 12, 2019, which claims benefit of priority to U.S. Provisional Application No. 62/697,348, entitled "METHODS AND DEVICES FOR REDUCING MYOPIA IN CHILDREN" and filed Jul. 12, 2018 and to U.S. Provisional Application No. 62/808,214, entitled "METHODS AND DEVICES FOR REDUCING MYOPIA IN CHILDREN" and filed Feb. 20, 2019. The entirety of each of the foregoing applications is hereby incorporated by reference.

BACKGROUND

1. Technical Field

This document relates to methods and devices for treating a human having myopia. For example, a human having myopia can be treated by wearing myopia control spectacle lenses.

2. Background Information

Myopia is a major problem worldwide with the prevalence in the US estimated to have increased to over 40% by 2004 (see, e.g., Vitale et al, 2009 *Arch Ophthalmol.* 127: 1632-9). It is well established that patients with myopia have an elevated risk of developing sight-threatening conditions (see, e.g., Jones et el., 2012 *Eye Contact Lens.* 38:188-96), and currently it is believed that there are no known therapies in the United States approved to reduce or control the progression of myopia.

SUMMARY

This document describes methods and devices for treating a human child having, or suspected of having, myopia. For example, a child is diagnosed with myopia and then treated with a device to control his/her myopia by reducing the progression of said myopia. It is believed that use of such lenses can slow (e.g., stop) eye-lengthening growth that is associated with progression of myopia. For example, a child having, or suspected of having, myopia can wear at least one (e.g., one or two) myopia control spectacle lens to treat the child. In one embodiment, a myopia control spectacle lens also can correct for refractive error. In one embodiment, a myopia control spectacle lens can contain light scattering features (e.g., light scattering dots on a lens surface and/or light scattering inclusions in the bulk of the lens). In another embodiment, a myopia control spectacle lens also can contain one or more defocus elements (e.g., microlenses). A myopia control spectacle lens can contain a clear center, free of said scattering features or defocus elements. Treating children having, or suspected of having, myopia by having the children wear spectacles with myopia control lenses provides a safe, efficient, and non-invasive method for reducing the progression of juvenile myopia.

The disclosed methods include protocols for identifying subjects suitable for such treatment, evaluating the subjects, prescribing appropriate devices for the subject, and monitoring and assessing their treatment.

In general, one aspect of this document features methods for reducing progression of myopia in a human child having, or suspected of having, myopia. The methods can include, or consist essentially of, identifying a human child having, or suspected of having, myopia; and treating the human child with spectacles containing at least one myopia control spectacle lens, where the myopia control spectacle lens reduces myopia progression in the human child by 0.4 D or more after three years of treatment compared to a control group. The myopia control spectacle lens can provide normal visual acuity to the human child when viewed through a central region of the lens and reduced visual acuity when viewed through a peripheral region of the lens. The reduced visual acuity can be provided by a dot pattern in the peripheral region of the lens. The progression of myopia in the human child's corresponding eye can be reduced by 0.3 D or more after two years of treatment compared to a control group. The progression of myopia in the human child's corresponding eye can be reduced by 0.15 diopters (D) or more (e.g., 0.2 D or more) after one year of treatment compared to a control group. Treatment of the human child can include treating both of the human child's eyes with corresponding myopia control spectacle lenses. The control group can be treated using spectacles containing single vision lenses. At the time of the identifying, the human child can be younger than 12 years old (e.g., younger than 11 years old, or younger than 8 years old). At the time of the identifying, the human child can be 6 to 10 years old. The human child can be Asian. The human child can be not Asian. The myopia control spectacle lens can contain (i) a clear center, and (ii) a surrounding annular region, with both (i) and (ii) substantially centered on a lens axis, the clear aperture corresponding to the central region and the annular region corresponding to the peripheral region and containing one or more features that reduce the visual acuity for the corresponding eye. The one or more features can include a plurality of spaced apart scattering centers sized and shaped to scatter incident light. The scattering centers can be formed on a surface of the myopia control spectacle lens. The scattering centers can be formed in a bulk of the myopia control spectacle lens. The scattering centers can have a diameter of 0.2 mm or less. The scattering centers can have a diameter in a range from 0.1 mm to 0.17 mm (e.g., a diameter in a range from 0.12 mm to 0.15 mm). In the annular region, the scattering centers can have an average density in a range from 2 to 5 per mm$^2$ (e.g., an average density of 3.5 to 3.65 per mm$^2$ or an average density of 4.1 to 4.25 per mm$^2$). The scattering centers can be arranged in a pattern that includes a random variation in spacing between adjacent dots and/or a random variation in dot size. The scattering centers can be positioned relative to a regular array of lattice sites, where each scattering center is displaced in at least one dimension from a corresponding one of the lattice sites by an amount equal to or less than a jitter amplitude, the jitter amplitude being a fraction of the distance between adjacent lattice sites. The jitter amplitude can be 0.5 or less. The scattering centers can have a dimension that varies randomly from a nominal value, the random variation being equal to or less than a jitter amplitude. The jitter amplitude can be 0.5 times the nominal value or less. The scattering centers can have a volume that varies randomly from a nominal volume, $V_N$, the random variation being equal to or less than a jitter amplitude. The jitter amplitude times the nominal volume can be $0.5 \times V_N$ or less. The annular region can correspond to an area of 20% or more of the lens surface (e.g., 30% or more, 40% or more, 50% or more, 60% or more, 70% or more, 80% or more, e.g., up to 90%). The average jitter amplitude of all the dots on a lens can be 0.05 or more (e.g., 0.1 or more, 0.15 or more, 0.2 or more, 0.25 or more, 0.3 or more, 0.35 or more, such as 0.4 or less). At least 10% of the dots on the lens can be jittered (e.g., 20% or more, 30% or more, 40% or more, 50% or more 60% or more, 70% or more, 80% or more, 90% or more, such as 100% of the dots). The myopia control spectacle lens can contain regions having an optical power different from an optical power of the central region. The regions can contain island-shaped lenses. The central region can have a diameter in a range from 2 mm to 8 mm. The central region can be aligned to be in front of the human's pupil when in distance gaze. The myopia control spectacle lens can reduce an image contrast of an object viewed through the peripheral region by at least 20% compared to an image contrast of the object viewed through the central region. The myopia control spectacle lens can have optical power to correct the human's on-axis vision to 20/20 or better through the central region, and, can correct the human's vision to 20/25 or better when viewed through the peripheral region. The child, prior to said treatment, can have a spherical equivalent refractive (SER) error between −0.75 D and −4.50 D in at least one eye. The reduction in myopia progression can be measured based on a change in axial length growth in the child's eye compared to the control group. The myopia control spectacles can reduce myopia progression by at least 0.20 mm compared to the control group. The myopia control spectacles can reduce myopia progression by at least 0.20 mm as measured by axial length change from baseline. The reduction in myopia progression can be measured based on a change in spherical equivalent refraction compared to the control group. The myopia control spectacles can reduce myopia progression by at least 0.46 D compared to the control group. The myopia control spectacles can reduce myopia progression by at least 0.46 D as measured by autorefraction change from baseline.

The myopia control spectacles can reduce myopia progression in a child's eye, such that it grows less than 0.7 mm, 0.6 mm, 0.5 mm, 0.4 mm, 0.3 mm, 0.2 mm, or 0.1 mm compared to that child's axial length at baseline. Alternatively, the myopia control spectacles can reduce myopia progression in a treated group compared to a control group, such that the difference between groups is at least 0.1 mm, 0.2 mm, 0.3 mm, 0.4 mm, 0.5 mm, 0.6 mm, 0.7 mm, or 0.8 mm. These values can be measured at any convenient time, such as 6, 12, 18, 24, 30, or 36 months from beginning to wear the spectacles.

The treatment can include wearing the myopia control spectacles for at least 6 hours per day. The treatment can include using the myopia control spectacles for at least 12 months. The reduction in myopia progression can be 0.56 D or more over 24 months as measured by autorefraction change from baseline, difference between means. The reduction in myopia progression can be 0.21 D or more over 36 months as measured by autorefraction change from baseline, difference between means. The reduction in myopia progression can be 0.32 mm or more over 24 months as measured by axial length change from baseline, difference between means. The reduction in myopia progression can be more than 0.20 mm over 36 months as measured by axial length change from baseline, difference between means. The myopia control spectacle lens can be made from polycarbonate or Trivex®. The child can have a genetic predisposition for myopia progression. The myopia control spectacle lens can reduce myopia progression, as measured by axial length change or SER change, by 30% or more compared to a control group. The child can be less than 8 years old when initiating therapy with the myopia control spectacles, and the reduction in myopia progression can be greater than 0.20 D after 3 years. The child can be less than 8 years old when initiating therapy with the myopia control spectacles, and the reduction in myopia progression can be greater than 15% after 3 years.

In another aspect, this document features spectacles for reducing progression of myopia in a human child. The spectacles can contain at least one myopia control spectacle lens having a single vision region and a myopia control region, where the myopia control spectacle lens can reduce myopia progression in the human child by 0.4 D or more after three years of treatment compared to a control group. The myopia control spectacle lens can contain (i) a clear center, and (ii) a surrounding annular portion, where both (i) and (ii) are substantially centered on a lens axis, the clear aperture corresponding to the single vision region and the annular region corresponding to the myopia control region and containing one or more features that reduce the visual acuity for the corresponding eye. The one or more features can include a plurality of spaced apart scattering centers sized and shaped to scatter incident light. The scattering centers can be formed on a surface of the myopia control spectacle lens. The scattering centers can be formed in a bulk of the myopia control spectacle lens. The scattering centers can have a diameter of 0.2 mm or less. In the annular region, the scattering centers can have a density in a range from 2 to 5 per $mm^2$. The scattering centers can be arranged in a pattern that includes a random variation in spacing between adjacent dots and/or a random variation in dot size. The scattering centers can be positioned relative to a regular array of lattice sites, where each scattering center is displaced in at least one dimension from a corresponding one of the lattice sites by an amount equal to or less than a jitter amplitude, the jitter amplitude being a fraction of the distance between adjacent lattice sites. The jitter amplitude can be 0.5 or less. The scattering centers can have a dimension that varies randomly from a nominal value, the random variation being equal to or less than a jitter amplitude. The jitter amplitude can be 0.5 times the nominal value or less. The scattering centers can have a volume that varies randomly from a nominal volume, the random variation being equal to or less than a jitter amplitude. The annular region can correspond to an area of 20% or less more of the lens surface (e.g., 30% or more, 40% or more, 50% or more, 60% or more, 70% or more, 80% or more, e.g., up to 90%). The myopia control spectacle lens can contain regions having an optical power different from an optical power of the central region. The regions can contain island-shaped lenses. The central region can have a diameter in a range from 2 mm to 8 mm. The central region can be aligned to be in front of the human's pupil when in distance gaze. The myopia control spectacle lens can reduce an image contrast of an object viewed through the peripheral region by at least 20% compared to an image contrast of the object viewed through the central region. The myopia control spectacle lens can have an optical power to correct the human's on-axis vision to 20/20 or better through the central region, and, can correct the human's vision to 20/25 or better when viewed through the peripheral region.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 2 illustrates contrast reduction experienced using exemplary ophthalmic lenses for treating myopia.

FIG. 3A shows a cross-sectional view of an exemplary lens material removed from a surface of the lens.

FIG. 3B shows a cross-sectional view of an exemplary lens with scattering inclusions between opposing surfaces of the lens.

FIG. 3C shows a cross-sectional view of an exemplary lens with dots formed on the front surface of the lens.

FIGS. 4A and 4B show a lens blank with a dot pattern that has a transition zone between a clear aperture and the dot pattern.

FIG. 4C shows dots with a random displacement from uniform spacing.

FIG. 7 is an output summary of a table of 30% reduction in myopia progression in a fast progressor group treated with a myopia control spectacle lens relative to patients treated with a control lens.

FIG. 8A is a plot showing a 30% reduction in SER in patients in a fast progressor group treated with a myopia control spectacle lens relative to patients treated with a control lens. FIG. 8B is a plot showing a 30% reduction in axial length in patients in a fast progressor group treated with either a myopia control spectacle lens or a control lens.

FIG. 10 is an output summary of a table of 40% reduction in myopia progression in a fast progressor group treated with a myopia control spectacle lens relative to patients treated with a control lens.

FIG. 11A is a plot showing a 40% reduction in SER in patients in a fast progressor group treated with either a myopia control spectacle lens relative to patients treated with a control lens. FIG. 11B is a plot showing a 40% reduction in axial length in patents in a fast progressor group treated with either a myopia control spectacle lens relative to patients treated with a control lens.

FIG. 13 is an output summary of a table of 50% reduction in myopia progression in a fast progressor group treated with a myopia control spectacle lens relative to patients treated with a control lens.

FIG. 14A is a plot showing a 50% reduction in SER in patients in a fast progressor group treated with either a myopia control spectacle lens relative to patients treated with a control lens. FIG. 14B is a plot showing a 50% reduction in axial length in patients in a fast progressor group treated with either a myopia control spectacle lens relative to patients treated with a control lens.

FIG. 16 is an output summary of a table of 30% reduction in myopia progression in a COMET-like population treated with a myopia control spectacle lens relative to patients treated with a control lens.

FIG. 17A is a plot showing a 30% reduction in SER in patients in a COMET-like population treated with either a myopia control spectacle lens relative to patients treated with a control lens. FIG. 17B is a plot showing a 30% reduction in axial length in patients in a COMET-like population treated with either a myopia control spectacle lens relative to patients treated with a control lens.

FIG. 19 is an output summary of a table of 40% reduction in myopia progression in a COMET-like population treated with a myopia control spectacle lens relative to patients treated with a control lens.

FIG. 20A is a plot showing a 40% reduction in SER in patients in a COMET-like population treated with either a myopia control spectacle lens relative to patients treated with a control lens. FIG. 20B is a plot showing a 40% reduction in axial length in patients in a COMET-like population treated with either a myopia control spectacle lens relative to patients treated with a control lens.

FIG. 22 is an output summary of a table of 50% reduction in myopia progression in a COMET-like population treated with a myopia control spectacle lens relative to patients treated with a control lens.

FIG. 23A is a plot showing a 50% reduction in SER in patients in a COMET-like population treated with either a myopia control spectacle lens relative to patients treated with a control lens. FIG. 23B is a plot showing a 50% reduction in axial length in patients in a COMET-like population treated with either a myopia control spectacle lens relative to patients treated with a control lens.

FIG. 25A is a table showing change in SER (in D) for a treatment group compared to baseline. In this figure, example control outcomes are shown in the first row, and reduction in myopia from 40-75% compared to those control outcomes, are shown for comparison.

FIG. 25B is a table showing the difference in SER change from baseline between two groups, one treated group and one control group. In this figure, example control group outcomes are shown in the first row, and the difference between groups is shown for a reduction in myopia from 40-75%.

FIG. 26A is a table showing change in SER (in D) for a treatment group compared to baseline. In this figure, example control outcomes are shown in the first row, and reduction in myopia from 40-75% compared to those control outcomes, are shown for comparison.

FIG. 26B is a table showing the difference in SER change from baseline between two groups, one treated group and one control group. In this figure, example control group outcomes are shown in the first row, and the difference between groups is shown for a reduction in myopia from 40-75%.

FIG. 27A is a table showing change in SER (in D) for a treatment group compared to baseline. In this figure, example control outcomes are shown in the first row, and reduction in myopia from 40-75% compared to those control outcomes, are shown for comparison.

FIG. 27B is a table showing the difference in SER change from baseline between two groups, one treated group and one control group. In this figure, example control group outcomes are shown in the first row, and the difference between groups is shown for a reduction in myopia from 40-75%.

FIG. 28A is a table showing change in axial length (in mm) for a treatment group compared to baseline. In this figure, example control outcomes are shown in the first row, and reduction in myopia from 40-75% compared to those control outcomes, are shown for comparison.

FIG. 28B is a table showing the difference in axial length change from baseline between two groups, one treated group and one control group. In this figure, example control group outcomes are shown in the first row, and the difference between groups is shown for a reduction in myopia from 40-75%.

FIG. 29A is a table showing change in axial length (in mm) for a treatment group compared to baseline. In this figure, example control outcomes are shown in the first row, and reduction in myopia from 40-75% compared to those control outcomes, are shown for comparison.

FIG. 29B is a table showing the difference in axial length change from baseline between two groups, one treated group and one control group. In this figure, example control group outcomes are shown in the first row, and the difference between groups is shown for a reduction in myopia from 40-75%.

FIG. 30A is a table showing change in axial length (in mm) for a treatment group compared to baseline. In this figure, example control outcomes are shown in the first row, and reduction in myopia from 40-75% compared to those control outcomes, are shown for comparison.

FIG. 30B is a table showing the difference in axial length change from baseline between two groups, one treated group and one control group. In this figure, example control group outcomes are shown in the first row, and the difference between groups is shown for a reduction in myopia from 40-75%.

DETAILED DESCRIPTION

Figure 1B:
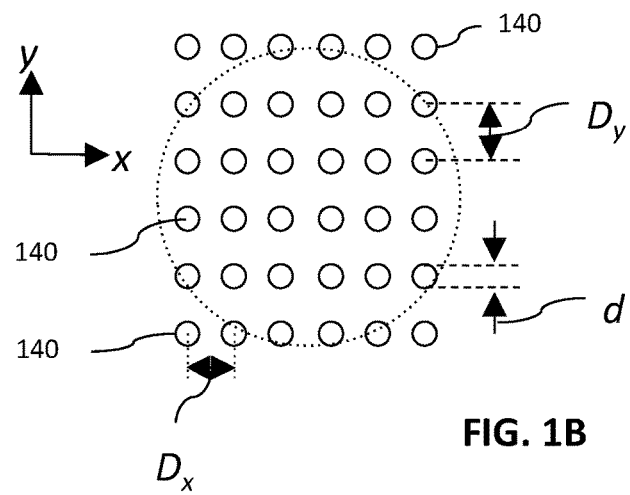
FIG. 1B shows a dot pattern on the ophthalmic lenses shown in FIG. 1A.

This document describes methods and devices for treating a human child having, or suspected of having, myopia. For example, one or more myopia control spectacle lenses can be worn by a child having, or suspected of having, myopia to treat the child. In some cases, methods for treating a human having, or suspected of having, myopia can include identifying such an individual, fitting the individual for one or more myopia control spectacle lenses, having the individual wear the one or more myopia control spectacle lenses for an appropriate period of time, and, after that period of time, assessing the individual for any change in myopia progression. The fitting, wearing, and assessing can be repeated over the course of treatment. In this application, unless specifically stated otherwise, the terms "lenses" and "ophthalmic lenses" are used to mean spectacle lenses, such as spectacle lenses that would be used to control myopia progression. The term "myopia control spectacle lenses" refers to any spectacle lenses that can be used to control myopia or reduce myopia progression, including peripheral diffusion lenses (also called dot lenses) or lenses containing optical defocusing power.

For example, in some cases devices for treating a child having, or suspected of having, myopia can include one or more (e.g., one or two) peripheral diffusion spectacle lenses having one or more scattering centers, or "dots." In one embodiment, the lenses contain a clear aperture that is aligned to the pupil of the child when the eyes are gazing at a distance. The one or more scattering centers can include any appropriate number (e.g., a plurality) of dots in a pattern (e.g., a pattern including any appropriate dot size(s) and any appropriate dot spacing) effective to scatter light (e.g., incident light). For example, a peripheral diffusion lens can have a dot pattern on a surface of a lens such that the peripheral diffusion lens is effective to scatter incident light. In some cases, after a human has worn one or more peripheral diffusion lenses (e.g., one or more first peripheral diffusion lenses) for an appropriate period of time and, after that period of time, has been assessed for any change in refractive error, that human can be selected for continued wear of one or more peripheral diffusion lenses (e.g., one or more second peripheral diffusion lenses). The human can be fitted for one or more second peripheral diffusion lenses based, at least in part, on any change in visual acuity. One or more peripheral diffusion lenses (e.g., one or more second peripheral diffusion lenses) for continued wear can include the same peripheral diffusion lenses or different peripheral diffusion lenses. The methods described herein (e.g., determining a visual acuity in at least one eye of a human identified as having myopia or as being likely to develop myopia can be determined, fitting that human for one or more peripheral diffusion lenses, having the human wear the one or more peripheral diffusion lenses for an appropriate period of time, and assessing the human for any change in visual acuity) can be repeated any appropriate number of times (e.g., 1, 2, 3, 4, 5, 6 or more times). In some cases, treating a human having, or suspected of having, myopia as described herein can be effective to correct the myopia (e.g., as measured by a reduction in axial length and/or an increase in SER error) in at least one eye (e.g., one eye or both eyes) of that human. In some cases, treating a human having, or suspected of having, myopia as described herein can be effective to reduce or eliminate progression of the myopia (e.g., as measured by a reduction or absence of axial lengthening and/or a reduction or absence of a decrease in spherical equivalent refractive (SER) error) in at least one eye (e.g., one eye or both eyes) of that human.

For example, in some cases devices for treating a child having, or suspected of having, myopia can include one or more (e.g., one or two) defocus lenses. Defocus lenses include regions of the lens that provide "plus" power in order to move the focal plane from behind the retina to even with, or in front of, the retina (i.e., inside the eye). Such defocus regions may be applied to various regions of the spectacle lens. For example they may be in the bottom half or bottom third of the lens (e.g., a progressive or bifocal), in the periphery of the lens, or in concentric rings around the center of the lens. Alternatively, defocus regions may comprise one or more defocusing centers in the periphery of the lens, where each defocus center forms a "lenslet" providing plus power to that region. Defocus spectacle lenses are known in the art to reduce myopia progression, but have shown limited reduction in myopia progression of 0.2 D over 3 years (see, e.g., Gwiazda et al, 2003 *Invest Ophthalmol Vis Sci* 44:1492-500), 0.29 D over 12 months (see, e.g., Sankaridurg et al. Spectacle Lenses Designed to Reduce Progression of Myopia: 12-Month Results. *Optom Vis Sci*. 2010; 87(9): 631-641.), or 0.55 D over 2 years (see, e.g., Lam et al. Defocus Incorporated Multiple Segments (DIMS) spectacle lenses slow myopia progression: a 2-year randomised clinical trial. *Br J Ophthalmol* 2019; 0:1-6.).

Identifying Subjects for Treatment

In general, any appropriate child having, or suspected of having, myopia can be treated as described herein (e.g., by having the child wear one or more (e.g., one or two) myopia control spectacle lenses). For example, any appropriate human identified as having, or as being likely to develop, myopia can be fitted for one or more myopia control spectacle lenses (e.g., based, at least in part, on the humans' visual acuity), can wear the one or more myopia control spectacle lenses for an appropriate period of time, and, after that period of time, can be assessed for any change in visual acuity.

In some cases, a human can be of any race, ethnicity, and/or nationality. Examples of races that can be treated using the methods and devices described herein include, without limitation, White (e.g., person having origins in any of the original peoples of Europe, the Middle East, or North Africa), Asian (e.g., a person having origins in any of the original peoples of the Far East, Southeast Asia, or the Indian subcontinent including, e.g., for example, Cambodia, China, India, Japan, Korea, Malaysia, Pakistan, the Philippine Islands, Thailand, and Vietnam), Black or African American (e.g., person having origins in any of the Black racial groups of Africa), and American Indian or Alaska Native (e.g., a person having origins in any of the original peoples of North and South America (including Central America) and who maintains tribal affiliation or community attachment), or Native Hawaiian or other Pacific Islander (e.g., a person having origins in any of the original peoples of Hawaii, Guam, Samoa, or other Pacific Islands). Here, "races" are defined as per the 1997 Office of Management and Budget standards on race and ethnicity, which permits the reporting of more than one race. Ethnicity determines whether a person is of Hispanic origin or not. For example, a White child having, or suspected of having, myopia can be treated as described herein. For example, an Asian child having, or suspected of having, myopia can be treated as described herein. For example, a child having, or suspected of having, myopia that is not Asian (e.g., White, Black or African American, American Indian or Alaska Native, or Native Hawaiian or Other Pacific Islander) can be treated as described herein.

Appropriate humans for treatment are children, or juveniles. For example, a juvenile can be no more than 18 years old. In this application, the term "human" and "child" are used interchangeably, and all descriptions directed to a human are intended to be applications to a child. In a preferred embodiment, children are less than the age when they are generally eligible to wear contact lenses. This may be less than age 13, less than age 12, less than age 11, less than age 10, less than age 9, or less than age 8. The children may be from 5-10 years old or from 6-9 years old. For example, the children may be from 6-10 years old. In some cases, a juvenile having, or suspected of having, myopia can be treated as described herein. For example, a human from about 5 years old to about 9 years old having, or suspected of having, myopia can be treated as described herein.

In some cases, a human treated as described herein (e.g., by having the human wear one or more (e.g., one or two) myopia control spectacle lenses) can be, or can be suspected of being, a fast progressor (e.g., an individual whose myopia progresses by more than 0.5 D per year, 0.75 D per year, or 1.00 D per year).

In some cases, a human treated as described herein (e.g., by having the human wear one or more (e.g., one or two) myopia control spectacle lenses) can be, or can be suspected of being, a COMET-like human (see, e.g., Gwiazda et al, 2003 *Invest Ophthalmol Vis Sci* 44:1492-500).

A human having, or suspected of having, myopia and treated as described herein (e.g., by having the human wear one or more (e.g., one or two) myopia control spectacle lenses) can have any refractive error that would be considered myopic. Refractive error could be ≤−0.25 D, ≤−0.50 D, ≤−0.75 D, ≤−1.0 D, or less. Refractive error can be determined using any appropriate methods and/or instruments. Examples of methods and/or instruments that can be used to determine refractive in at least one eye of a human include, without limitation, a phoropter (e.g., using manifest refraction). In some cases, a human having, or suspected of having, myopia can have a refractive error of from about −0.75 D to about −4.50 D. For example, a human having, or suspected of having, myopia can have a refractive error of about −4.50 D.

A human having, or suspected of having, myopia and treated as described herein (e.g., by having the human wear one or more (e.g., one or two) myopia control spectacle lenses) can have any appropriate axial length (e.g., prior to a treatment described herein). Axial length can be measured using any appropriate methods and/or machines. Examples of methods and/or machines that can be used to evaluate axial length include, without limitation, interferometry, such as with an IOLMaster® or Lenstar (ocular biometer) interferometer. In some cases, a human having, or suspected of having, myopia can have an axial length of from about 20 millimeters (mm) to about 30 mm. For example, a human having, or suspected of having, myopia, prior to a treatment described herein, can have an axial length of about 22 mm to about 26 mm in at least one eye (e.g., one eye or both eyes). A human having, or suspected of having, myopia and treated as described herein (e.g., by having the human wear one or more (e.g., one or two) myopia control spectacle lenses) can have any appropriate spherical equivalent refraction (SER) (e.g., prior to a treatment described herein). In some cases, SER error can be measured when a human having, or suspected of having, myopia is in a cycloplegic state. SER error can be evaluated using any appropriate methods and/or machines. Examples of methods and/or machines that can be used to evaluate SER error include, without limitation, auto-refractors (e.g., an open field autorefractor such as a Grand Seiko WR-5100K, Shin-Nippon, or equivalent). SER can be evaluated at any appropriate time. In some cases, a human having, or suspected of having, myopia can have a SER of from about −0.25 diopters (D) to about −10.0 D. For example, a human having, or suspected of having, myopia, prior to a treatment described herein, can have a SER error of about −0.75 D to about −4.50 D in at least one eye (e.g., one eye or both eyes). For example, a human having, or suspected of having, myopia, prior to a treatment described herein, can have a difference in SER error between the two eyes of the human of about 1.50 D.

A human having, or suspected of having, myopia and treated as described herein (e.g., by having the human wear one or more (e.g., one or two) myopia control spectacle lenses) can have, or be suspected of having, any type of myopia. A myopia can have any appropriate opsin gene haplotype (e.g., a myopic opsin gene haplotype). Examples of myopias include, without limitation, simple myopia, degenerative myopia, pseudomyopia, nocturnal myopia, nearwork-induced transient myopia (NITM), instrument myopia, induced myopia, genetic myopia, myopia with astigmatism, and childhood myopia. Myopia also includes syndromic myopia, where humans may have high myopia together with other visual symptoms, such as nystagmus and reduced cone ERG One example of syndromic myopia is Bornholm Eye Disease (BED). A myopia can be caused by any appropriate type of mechanism. For example, a myopia can be an axial myopia or a refractive myopia (e.g., a curvature myopia or an index myopia).

A human having, or suspected of having, myopia and treated as described herein (e.g., by having the human wear one or more (e.g., one or two) myopia control spectacle lenses) can be fitted for one or more myopia control spectacle lenses based, at least in part, on the humans' visual acuity. In some cases, methods of treating a human having, or suspected of having, myopia as described herein also can include identifying (e.g., diagnosing) the human as having a myopia. A human can be identified as having a myopia using any appropriate methods. In some cases, methods of treating a human having, or suspected of having, myopia as described herein also can include determining a refractive error in at least one eye (e.g., one eye or both eyes) of that human. For example, a human can be identified as having a refractive error indicative of a myopia and can be treated by having that human wear one or more myopia control spectacle lenses. In some cases, methods of treating a human having, or suspected of having, myopia as described herein also can include determining the axial length in at least one eye (e.g., one eye or both eyes) of that human. For example, a human can be identified as having an axial length indicative of a myopia and can be treated by having that human wear one or more myopia control spectacle lenses. In some cases, methods of treating a human having, or suspected of having, myopia as described herein also can include determining the presence of one or more genetic influencers in that human. For example, a human can be identified as having one or more genetic influencers indicative of a myopia and can be treated by having that human wear one or more myopia control spectacle lenses. The presence of one or more genetic influencers can be determined using any appropriate method. In some cases, identifying a human as having one or more genetic influencers indicative of a myopia can include obtaining results from one or more questionnaires. Examples of genetic influencers indicative of a myopia can include, without limitation, family history of myopia, number of parents with myopia, number of hours spent outdoors, and color vision disorders. In some cases, methods of treating a human having, or suspected of having, myopia as described herein also can include determining a genetic haplotype (e.g., an opsin gene haplotype) of that human. For example, a human can be identified as having a genetic haplotype indicative of a myopia and can be treated by having that human wear one or more myopia control spectacle lenses. A genetic haplotype indicative of a myopia can be any appropriate genetic haplotype. In some cases, a genetic haplotype indicative of a myopia, or likelihood of developing a myopia, can be an opsin gene haplotype as described in, e.g., for example, WO 2012/097213 or WO 2016/138512. In some cases, a genetic variant (e.g., a SNP or a haplotype) indicative of a myopia, or likelihood of developing a myopia, can be as described elsewhere (see, e.g., Zhang, 2015 *Progress in Molecular Biology and Translational Science* 134: 269-279; and Tedja et al., 2018 *Nat Genet.* 50:834-848). In some cases, methods of treating a human having, or suspected of having, myopia as described herein also can include determining the presence of opsin gene exon skipping (e.g., an amount of opsin gene exon skipping) in that human. For example, a human can be identified as having an amount of opsin gene exon skipping indicative of a myopia and can be treated by having that human wear one or more myopia control spectacle lenses. An amount of opsin gene exon skipping indicative of a myopia can be any appropriate amount of opsin gene exon skipping. In some cases, an amount of opsin gene exon skipping indicative of a myopia, or likelihood of developing a myopia, can be an amount of opsin gene exon skipping as described in, e.g., for example, WO 2016/138512. In some cases, methods of treating a human having, or suspected of having, myopia as described herein also can include determining the L:M cone ratio in that human. For example, a human can be identified as having a L:M cone ratio indicative of a myopia and can be treated by having that human wear one or more myopia control spectacle lenses. A L:M cone ratio indicative of a myopia can be any appropriate L:M cone ratio. In some cases, a L:M cone ratio indicative of a myopia, or likelihood of developing a myopia, can be a L:M cone ratio as described in, e.g., for example, WO 2012/097213.

Treatment with Myopia Control Spectacle Lenses

In general, a human can be fitted, based, at least in part, on that human's refractive error and/or degree of myopia or anticipated myopia, e.g., for any appropriate one or more (e.g., one or two) myopia control spectacle lenses (e.g., peripheral diffusion lenses or defocus lenses). In some cases, a human can be fitted for one myopia control spectacle lens. In some cases, a human can be fitted for two myopia control spectacle lenses. For example, when treating a human having, or suspected of having, myopia as described herein, the human can wear one or more myopia control spectacle lenses described herein.

In some cases, a peripheral region of the ophthalmic lens (e.g., having one or more scattering centers) can have optical properties different from the optical properties of a central region of the ophthalmic lens (e.g., an aperture). For example, a myopia control spectacle lens can include one or more features that allow a user (e.g., a human) reduced visual acuity for the same eye through a peripheral region of the ophthalmic lens (e.g., having one or more scattering centers) and normal visual acuity (e.g., 20/20 or better) for an eye through a central region of the ophthalmic lens (e.g., an aperture). In some cases, a myopia control spectacle lens can include one or more scattering centers in an annular region surrounding a central region (e.g., an aperture) with both the annular region and the central region being substantially centered on a lens axis. The central region can have a diameter in a range from 2 mm to 8 mm (e.g., about 3 mm or more, about 4 mm or more, about 5 mm, about 7 mm or less, about 6 mm or less). For example, when a myopia control spectacle lens includes one or more scattering centers and a clear aperture, the myopia control spectacle lens can result in a reduction in contrast in a retinal image (e.g., to reduce eye growth associated with myopia progression). For example, when a myopia control spectacle lens includes one or more scattering centers and a clear aperture, the myopia control spectacle lens can allow a user (e.g., a human) to view on-axis objects through the clear aperture (e.g., to experience maximal visual acuity when viewing on-axis objects) and to view objects in the periphery of the user's visual field through the one or more scattering centers (e.g., with reduced contrast and acuity). For example, when a myopia control spectacle lens allows a user to view on-axis objects with maximal visual acuity and to view objects in the periphery of the user's visual field with reduced contrast and acuity, the image contrast can be reduced by at least about 20% (e.g., at least about 25%, at least about 30%, at least about 35%, at least about 40%, at least about 45%, at least about 50%, at least about 55%, or at least about 60%) as compared to an image contrast of an on-axis object.

In cases wherein a myopia control spectacle lens is a peripheral diffusion lens, the peripheral diffusion lens can include any appropriate dot pattern. In some cases, peripheral diffusion lens can include a plurality of (e.g., one or more, one hundred or more, one thousand or more, 10,000 or more, 100,000 or more) of dots can be present in a pattern (e.g., a pattern including any appropriate dot size(s) and any appropriate dot spacing) effective to scatter light (e.g., incident light). For example, a peripheral diffusion lens can have a dot pattern on a surface of a lens such that the peripheral diffusion lens is effective to scatter incident light. In some cases, a dot pattern can include any appropriate combination of dot size, dot spacing, and/or dot density as described herein.

Figure 1A:
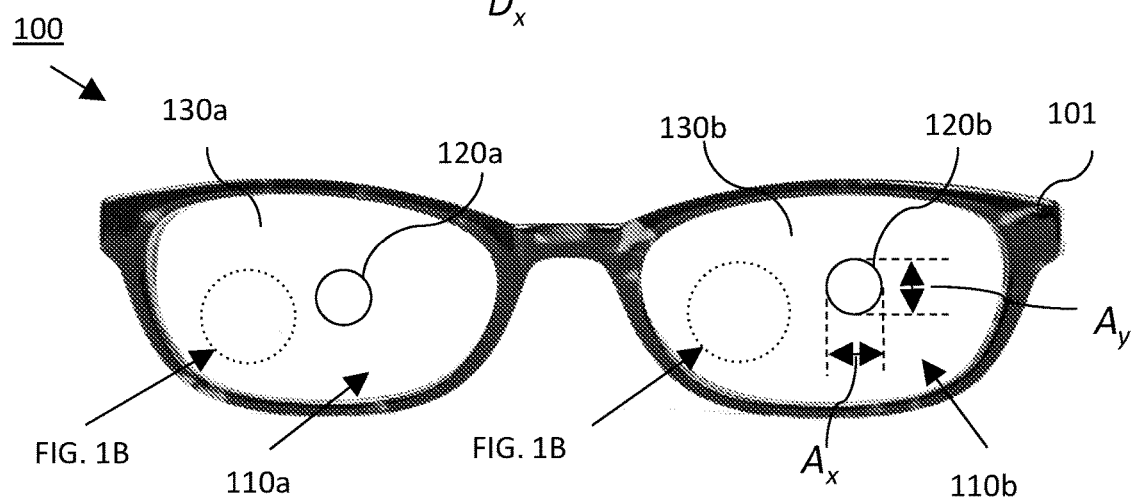
FIG. 1A shows a pair of eyeglasses containing ophthalmic lenses for treating myopia.
Figure 5A:
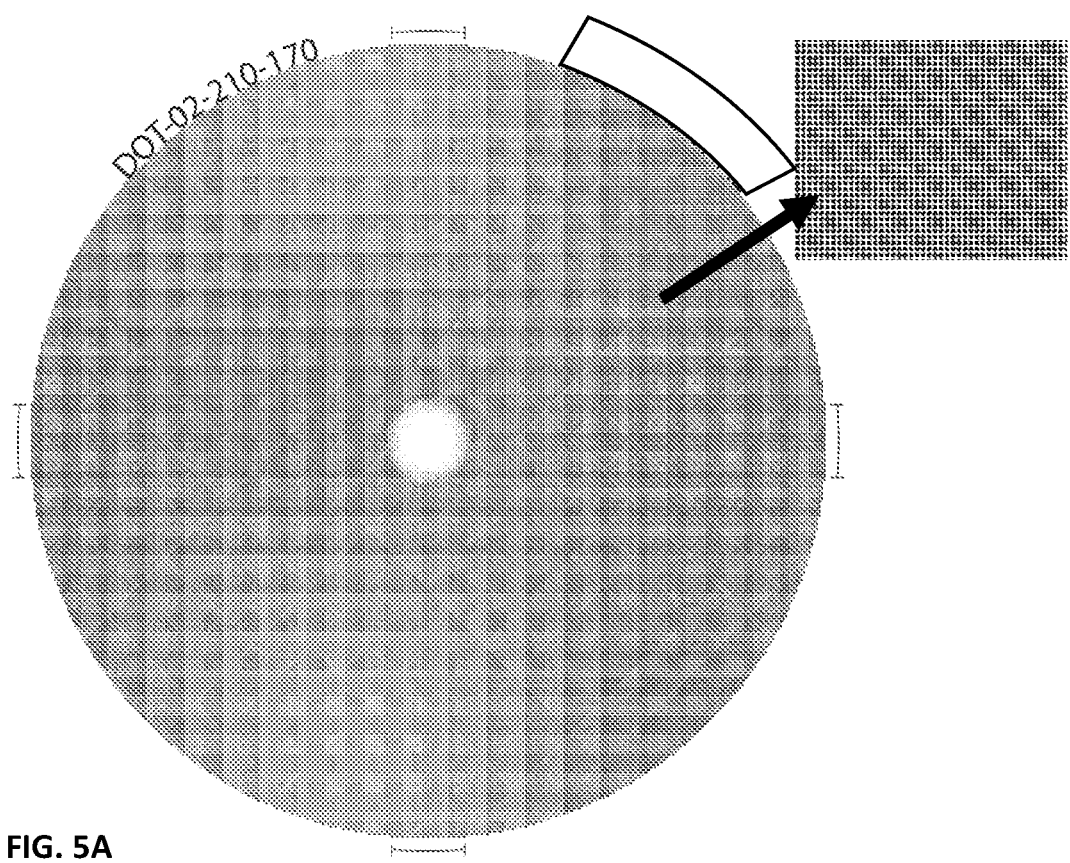
FIG. 5A shows an exemplary dot pattern with a transition zone and uniformly spaced dots.
Figure 5B:
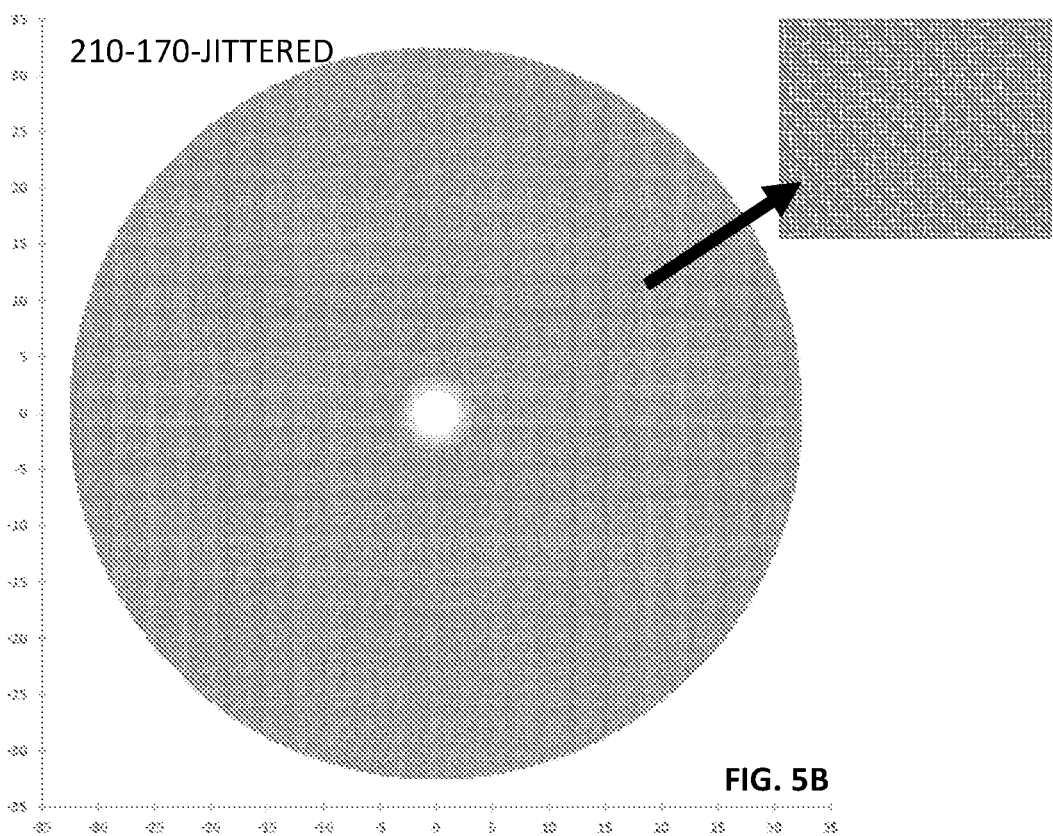
FIG. 5B shows an exemplary dot pattern with a transition zone and dots with a random displacement from uniform spacing.
Figure 5C:
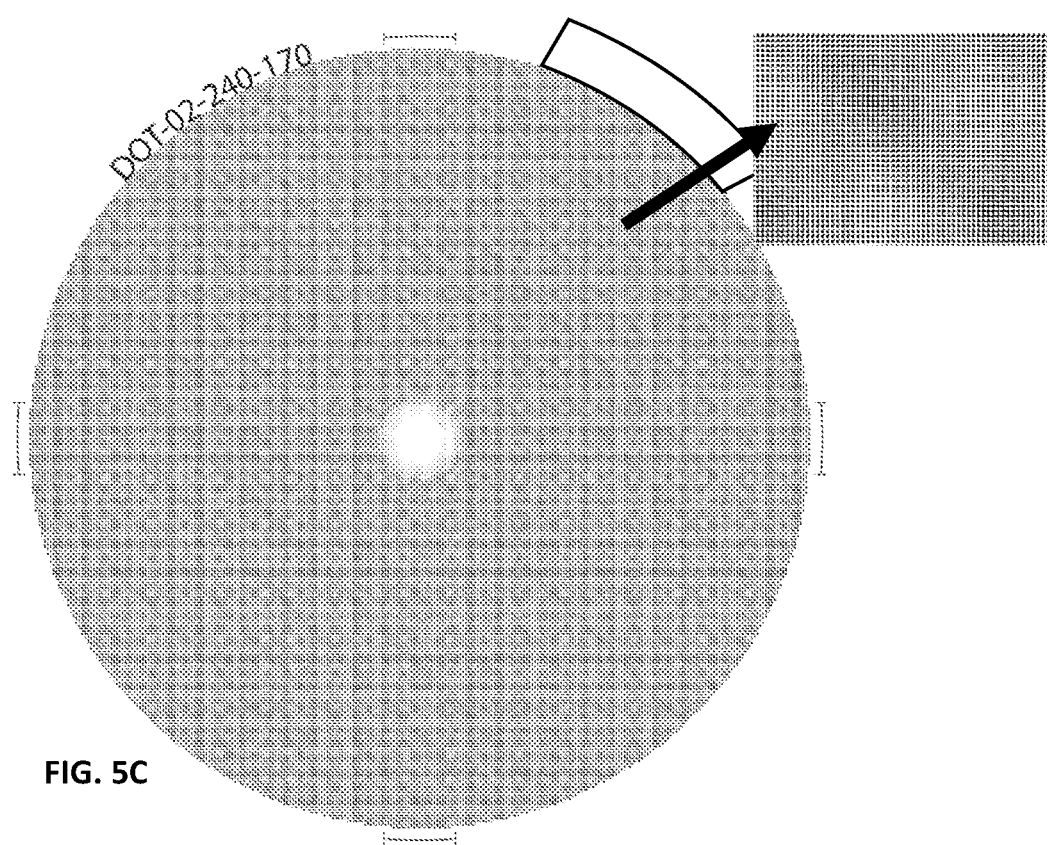
FIG. 5C shows another exemplary dot pattern with a transition zone and uniformly spaced dots.
Figure 5D:
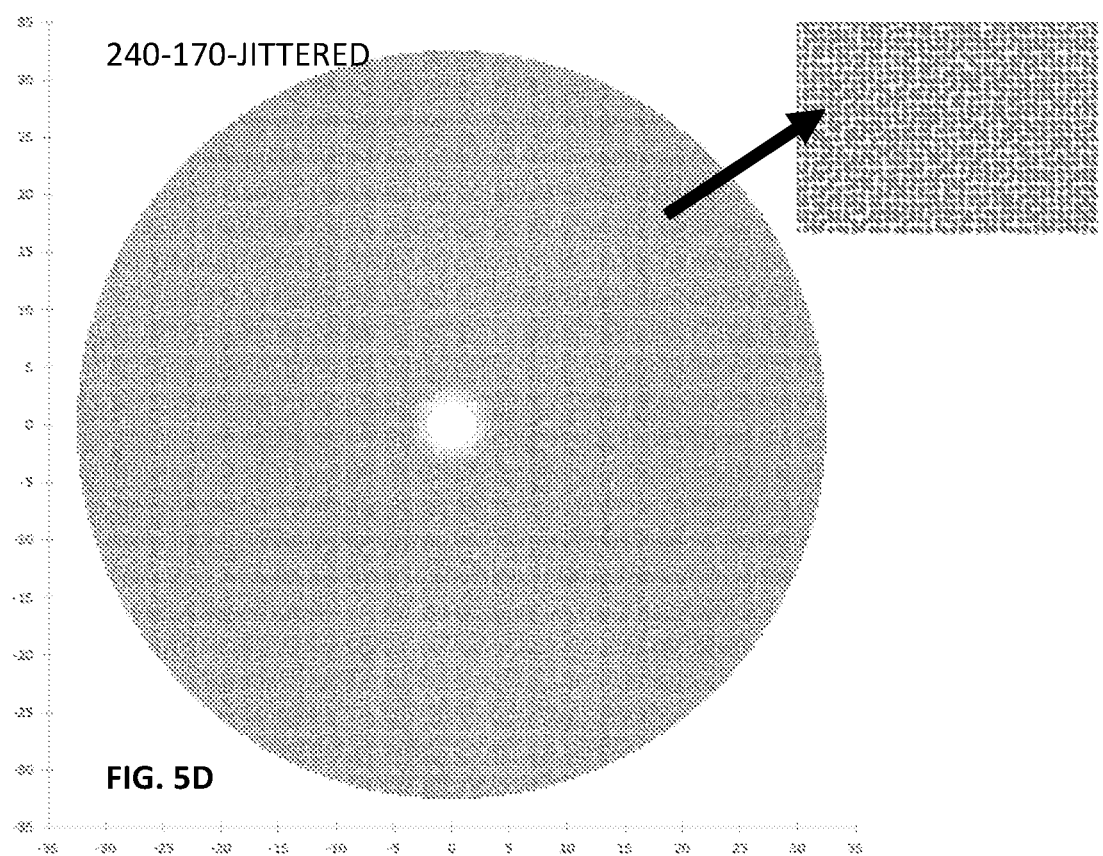
FIG. 5D shows another exemplary dot pattern with a transition zone and dots with a random displacement from uniform spacing.
Figure 5E:
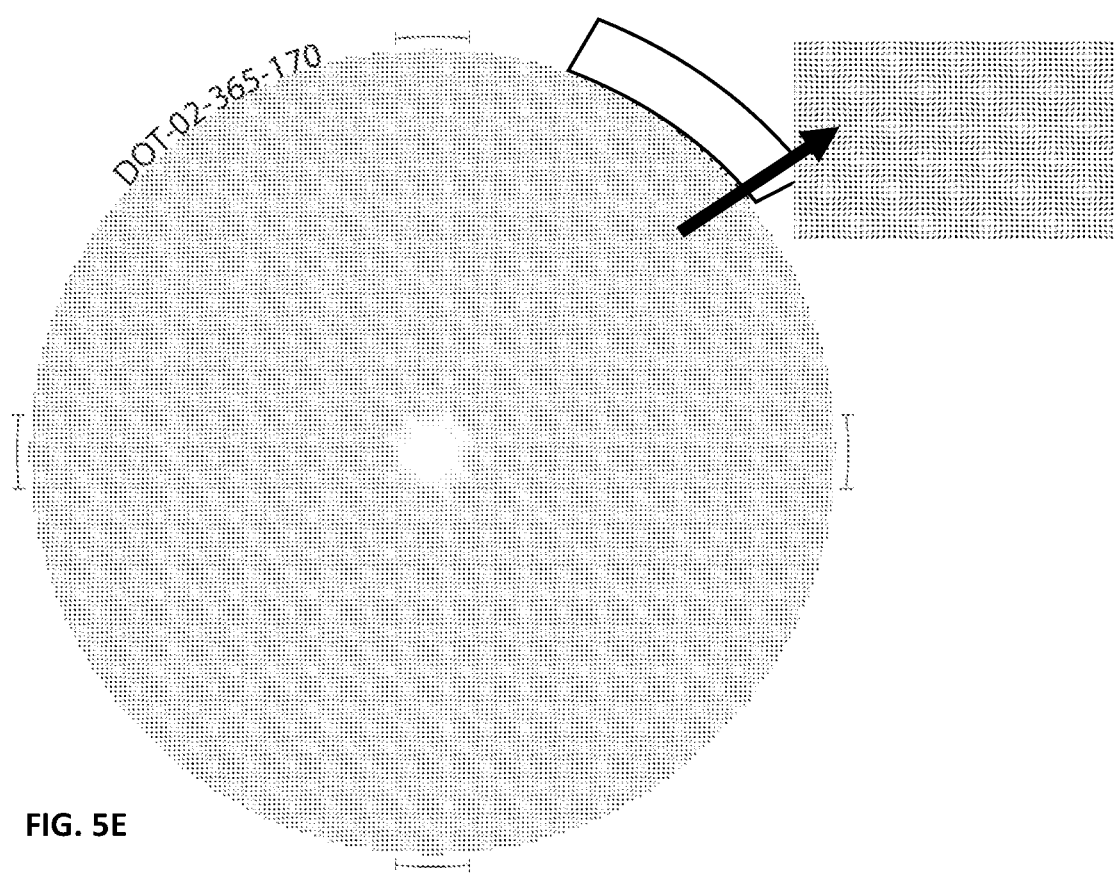
FIG. 5E shows a further exemplary dot pattern with a transition zone and uniformly spaced dots.
Figure 5F:
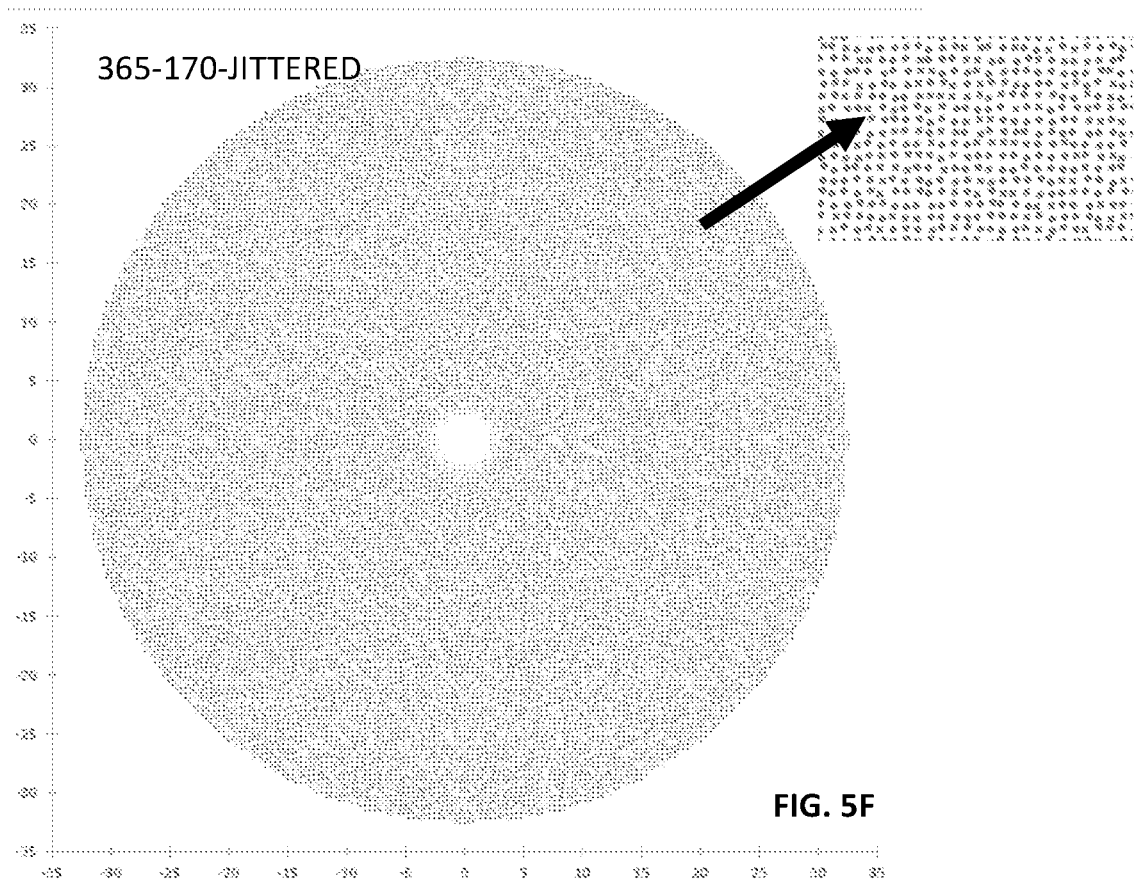
FIG. 5F shows a further exemplary dot pattern with a transition zone and dots with a random displacement from uniform spacing.

For example, referring to FIG. 1A, myopia-reducing eyeglasses 100 are disclosed which allow treatment of both eyes simultaneously without substantially compromising clear vision. Moreover, the eyeglasses are sufficiently robust and inconspicuous as to allow a wearer to engage in the same day-to-day activities without the eyeglasses failing and without feeling self-conscious about their appearance, which is especially desirable because the eyeglasses are typically used to arrest eye-lengthening in children.

Myopia-reducing eyeglasses 100 are composed of a pair of frames 101 and ophthalmic lenses 110a and 110b mounted in the frames. Generally, the ophthalmic lenses can be plano lenses, single vision lenses (e.g., with positive or negative power) or multifocal lenses (e.g., bifocals or progressive lenses). Ophthalmic lenses 110a and 110b each have a clear aperture 120a and 120b, respectively, surrounded by reduced-contrast areas 130a and 130b, respectively. Clear apertures 120a and 120b are positioned to coincide with the wearer's on-axis viewing position, while reduced contrast areas 130a and 130b correspond to the wearer's peripheral vision. Referring also to FIG. 1B, reduced contrast areas 130a and 130b are composed of an array of dots 140, which reduce the contrast of an object in the wearer's peripheral vision by scattering light passing through those areas to the wearer's eye. In general, dots 140 can be provided by forming protrusions and/or recesses on one or both surfaces of each lens in areas 130a and 130b, and/or by forming scattering inclusions in the lens material itself in these areas.

The size and shape of the clear aperture may vary. Generally, the clear aperture provides the wearer with a viewing cone for which their visual acuity may be optimally corrected (e.g., to 20/15 or 20/20). In some embodiments, the aperture has a maximum dimension (in the x-y plane) in a range from about 0.2 mm (e.g., about 0.3 mm or more, about 0.4 mm or more, about 0.5 mm or more, about 0.6 mm or more, about 0.7 mm or more, about 0.8 mm or more, about 0.9 mm or more) to about 1.5 cm (e.g., about 1.4 cm or less, about 1.3 cm or less, about 1.2 cm or less, about 1.1 cm or less, about 1 cm or less). Where the aperture is circular, e.g., as depicted in FIG. 1A, this dimension corresponds to the circle's diameter (i.e., $A_x=A_y$), however non-circular (e.g., elliptical, polygonal, $A_x \neq A_y$) apertures are also possible.

The clear aperture can subtend a solid angle of about 30 degrees or less (e.g., about 25 degrees or less, about 20 degrees or less, about 15 degrees or less, about 12 degrees or less, about 10 degrees or less, about 9 degrees or less, about 8 degrees or less, about 7 degrees or less, about 6 degrees or less, about 5 degrees or less, about 4 degrees or less, about 3 degrees or less) in the viewer's visual field. The solid angles subtended in the horizontal and vertical viewing planes may be the same or different.

In general, the dot patterns in reduced-contrast areas 130a and 130b can be selected based on a variety of design parameters to provide a desired degree of light scattering on the user's retina. Generally, these design parameters include the dot density, their size and shape, and their refractive index, e.g., for example, and are discussed in more detail below. Ideally, the dot patterns are selected to provide high visual acuity on the fovea and reduced image contrast on other parts of the retina with sufficiently low discomfort to the wearer to allow for extended, continuous wear. For instance, it can be desirable for children to be comfortable wearing the eyeglasses for most, if not all, of a day.

It is believed that reduced imaged contrast on the fovea of the user's eye may be more disturbing to the user's daily activities than reducing image contrast on other parts of the user's retina. Accordingly, the dot pattern can be tailored to reduce (e.g., minimize) light scattered into the user's fovea, while relatively more of the light on other parts of the retina is scattered light. The amount of scattered light on the fovea can be affected by the size of clear apertures 120a and 120b, respectively, but also by the nature of the dots, especially those closest to the clear apertures. In some embodiments, e.g., for example, the dots closest to the clear apertures can be designed for less efficiently light scattering than those further away.

In certain embodiments, dots can be designed to deliver reduced narrow angle scattering and increased wide angle scattering to create even light distribution on retina/low contrast signal, while preserving acuity through geometry of scattering centers. For example, the dots can be designed to generate significant wide forward angle scattering (e.g., such as more than 10%, 20% or more, 30% or more, 40% or more, 50% or more, deflected by more than 2.5 deg.). Narrow angle forward scattering, i.e., within 2.5 deg., can be kept relatively low (e.g., 50% or less, 40% or less, 30% or less, 20% or less).

In general, a variety of different metrics can be used to evaluate the performance of dot patterns in order to optimize them for use in myopia reducing eye-glasses. For example, dot patterns can be optimized empirically, e.g., based on physical measurements of lenses with different dot patterns. For example, light scattering can be characterized based on haze measurements, such as international test standards for haze (e.g., ASTM D1003 and BS EN ISO 13468). Conventional haze meters can be used, e.g., a BYK-Gardner haze meter (such as the Haze-Gard Plus instrument) that measures how much light is totally transmitted through a lens, the amount of light transmitted undisturbed (e.g., within 0.5 deg.), how much is deflected more than 2.5 deg., and clarity (amount within 2.5 deg.). Other equipment can also be used to characterize light scattering for purposes of empirically optimizing scattering patterns. For example, equipment which measures light diffusion by measuring light in annular ring around 2.5 deg. can be used (e.g., equipment from Hornell).

Alternatively, or additionally, dot patterns can be optimized by computer modelling software (e.g., Zemax or Code V).

In some embodiments, dot patterns can be designed based on optimization of a point spread function, which is a representation of an image of the scattering center on the retina. For example, the size, shape, and spacing of the scattering centers can be varied to evenly spread illumination of retina such that the retina outside of fovea is homogeneously blanketed with scattered light to reduce (e.g., minimize) contrast at this region of the retina.

Alternatively, or additionally, dot patterns can be designed based on optimization of a modulation transfer function, which refers to the spatial frequency response of the human visual system. For instance, the size, shape, and spacing of the scattering centers can be varied to smoothen attenuation of a range of spatial frequencies. Design parameters of the dot pattern can be varied in order to increase or decrease certain spatial frequencies as desired. Generally, the spatial frequencies of interest for vision are 18 cycles per deg. on the fine side, and 1.5 cycles per deg. on the course side. Dot patterns can be designed to provide increased signal at certain subsets of spatial frequencies within this range.

The aforementioned metrics can be used to evaluate dot patterns based on the size and/or shape of the dots, both of which can be varied as desired. For example, the dots can be substantially round (e.g., spherical), elongate (e.g., ellipsoidal), or irregularly-shaped. Generally, the protuberances should have a dimension (e.g., diameter, as depicted in FIG. 1B) that is sufficient large to scatter visible light, yet sufficiently small so as not to be resolved by the wearer during normal use. For example, the dots can have a dimension (as measured in the x-y plane) in a range from about 0.001 mm or more (e.g., about 0.005 mm or more, about 0.01 mm or more, about 0.015 mm or more, about 0.02 mm or more, about 0.025 mm or more, about 0.03 mm or more, about 0.035 mm or more, about 0.04 mm or more, about 0.045 mm or more, about 0.05 mm or more, about 0.055 mm or more, about 0.06 mm or more, about 0.07 mm or more, about 0.08 mm or more, about 0.09 mm or more, about 0.1 mm) to about 1 mm or less (e.g., about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm).

Note that for smaller dots, e.g., having a dimension that is comparable to the wavelength of light (e.g., 0.001 mm to about 0.05 mm), the light scattering may be considered Raleigh or Mie scattering. For larger protuberances, e.g., about 0.1 mm or more, light scattering may be due to geometric scattering.

In general, the dimension of the dots may be the same across each lens or may vary. For example, the dimension may increase or decrease as a function of the location of the protuberance, e.g., as measured from the clear aperture and/or as a function of distance from an edge of the lens. In some embodiments, the protuberance dimensions vary monotonically as the distance from the center of the lens increases (e.g., monotonically increase or monotonically decrease). In some cases, monotonic increase/decrease in dimension includes varying the diameter of the protuberances linearly as a function of the distance from the center of the lens.

The dots shown in FIG. 1B are arranged on a square grid, spaced apart by a uniform amount in each direction. This is shown by $D_y$ in the y-direction and $D_x$ in the x-direction. In general, the dots are spaced so that, collectively, they provide sufficient contrast reduction in the viewer's periphery for myopia reduction. Typically, smaller dot spacing will result in greater contrast reduction (provided adjacent dots do not overlap or merge). In general, $D_x$ and $D_y$ are in a range from about 0.05 mm (e.g., about 0.1 mm or more, about 0.15 mm or more, about 0.2 mm or more, about 0.25 mm or more, about 0.3 mm or more, about 0.35 mm or more, about 0.4 mm or more, about 0.45 mm or more, about 0.5 mm or more, about 0.55 mm or more, about 0.6 mm or more, about 0.65 mm or more, about 0.7 mm or more, about 0.75 mm or more) to about 2 mm (e.g., about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1 mm or less, about 0.9 mm or less, about 0.8 mm or less). As an example, dot spacing can be 0.55 mm, 0.365 mm, or 0.240 mm.

While the dots shown in FIG. 1B are arranged with equal spacing in the x- and y-directions, more generally spacing in each direction may be different. Furthermore, protuberances may be arrayed in grids that are not square. For example, hexagonal grids may be used. Non-regular arrays are also possible, e.g., random or semi-random dot placement may be used. In the case of a random pattern dimensions given would be the average separation of the dots in x- and y-directions.

In general, the coverage of a lens by dots can vary as desired. Here, coverage refers to the proportion of the lens's total area, as projected onto the x-y plane that corresponds to a dot. Typically, a lower dot coverage will yield lower scattering than higher dot coverage (assuming individual dots are discrete, i.e., they do not merger to form larger dots). Dot coverage can vary from 10% or more to about 75%. For example, dot coverage can be 15% or more, 20% or more, 25% or more, 30% or more, 35% of more, 40% or more, 45% or more, such as 50% or 55%). Dot coverage can be selected according to a comfort level of a user, e.g., to provide a level of peripheral vision sufficiently comfortable that the wearer will voluntarily wear the eyeglasses for extended periods (e.g., all day).

While the dots are depicted as have circular footprints in FIG. 1B, more generally the dots can have other shapes. For example, the dots can be elongated in one direction (e.g., in the x-direction or y-direction), such as in the case of elliptical dots. In some embodiments, the dots are random on shape.

It is believed that light from a scene that is incident on the lenses in reduced contrast areas 130a and 130b between the dots contributes to an image of the scene on the user's retina, while light from the scene incident on the dots does not. Moreover, the light incident on the dots is still transmitted to the retina, so has the effect of reducing image contrast without substantially reducing light intensity at the retina. Accordingly, it is believed that the amount of contrast reduction in the user's peripheral field of view is correlated to (e.g., is approximately proportional to) the proportion of the surface area of the reduced-contrast areas covered by the dots. Generally, dots occupy at least 10% (e.g., 20% or more, 30% or more, 40% or more, 50% or more, such as 90% or less, 80% or less, 70% or less, 60% or less) of the area (as measured in the x-y plane) of reduced contrast area 130a and 130b.

In general, the dot pattern reduces the contrast of images of objects in the wearer's peripheral vision without significantly degrading the viewer's visual acuity in this region. Here, peripheral vision refers to the field of vision outside of the field of the clear aperture. Image contrast in these regions can be reduced by 40% or more (e.g., 45% or more, 50% or more, 60% or more, 70% or, more, 80% or more) relative to an image contrast viewed using the clear aperture of the lens as determined. Contrast reduction may be set according to the needs of each individual case. It is believed that a typical contrast reduction would be in a range from about 50% to 55%. Contrast reductions of lower than 50% may be used for very mild cases, while subjects who are more predisposed might need a higher than 55% contrast reduction. Peripheral visual acuity can be corrected to 20/30 or better (e.g., 20/25 or better, 20/20 or better) as determined by subjective refraction, while still achieving meaningful contrast reduction.

Contrast, here, refers to the difference in luminance between two objects within the same field of view. Accordingly, contrast reduction refers to a change in this difference.

Contrast and contrast reduction may be measured in a variety of ways. In some embodiments, contrast can be measured based on a brightness difference between different portions of a standard pattern, such as a checkerboard of black and white squares, obtained through the clear aperture and dot pattern of the lens under controlled conditions.

Alternatively, or additionally, contrast reduction may be determined based on the optical transfer function (OTF) of the lens (see, e.g., http://www.montana.edu/jshaw/documents/18%20EELE582_S15_OTFMTF.pdf). For an OTF, contrast is specified for transmission of stimuli in which light and dark regions are sinusoidally modulated at different "spatial frequencies." These stimuli look like alternating light and dark bars with the spacing between bars varying over a range. For all optical systems the transmission of contrast is lowest for the sinusoidally varying stimuli having the highest spatial frequencies. The relationship describing the transmission of contrast for all spatial frequencies is the OTF. The OTF can be obtained by taking the Fourier transform of the point spread function. The point spread function can be obtained by imaging a point source of light through the lens on to a detector array and determining how light from a point is distributed across the detector.

In the event of conflicting measurements, the OTF is technique is preferred.

In some embodiments, contrast may be estimated based on the ratio of the area of the lens covered by dots compared to the area of the clear aperture. In this approximation, it is assumed that all the light that hits the dots becomes uniformly dispersed across the entire retinal area, which reduce the amount of light available in lighter areas of an image and this adds light to darker areas. Accordingly, contrast reduction may be calculated based on light transmission measurements made through the clear aperture and dot pattern of a lens.

Generally, ophthalmic lenses 110a and 110b can be clear or tinted. That is, the lenses may be optically transparent to all visible wavelengths, appearing clear and/or colorless, or may include a spectral filter, appearing colored. For example, ophthalmic lenses may include a filter that reduces the amount of red light transmitted to the wearer. It is believed that excessive stimulation of L cones in some person's eye (especially in children), may result in non-optimal eye lengthening and myopia. Accordingly, spectrally filtering red light using the ophthalmic lenses may further reduce myopia in a wearer.

Spectral filtering may be provided by applying a film to a surface of the lenses. Films may be applied by physically depositing material onto a lens surface, coating a layer of material on the surface, or laminating a preformed film onto the surface. Suitable materials include absorptive filter materials (e.g., dyes) or multilayer films, providing interference filtering. In some embodiments, spectral filtering may be provided by including a filtering material in the lens material itself and/or including a filtering material in the material used to form the protuberance.

Referring to FIG. 2, the effect of spectral filtering and contrast reduction from the dot pattern is shown by viewing black text on a white background using eyeglasses 210. The white background to the text takes on a green appearance due to the filtering of red wavelengths from by the eyeglasses. Image contrast is unaffected at clear apertures 220a and 220b, but is reduced elsewhere in the viewer's visual frame.

As noted above, in general, the dots can be provided as protuberances and/or recesses on one or both surfaces of each lens, and/or as scattering inclusions in the lens material itself. In some embodiments, the dots can be formed by arrays of protuberances on a surface (e.g., the back surface or the front surface) of each of lenses 110a and 110b.

The protuberances can be formed from an optically transparent material having a similar refractive index to the underlying lens, which is 1.58 for polycarbonate. For example, in embodiments where the lenses are formed from polycarbonate, the protuberances can be formed from a polymer having a similar refractive index to the PC, such as from light-activated polyurethane or epoxy based plastics. In addition to PC, the lenses themselves can also be made from allyl diglycol carbonate plastic, a urethane-based monomer or other impact resistant monomers. Alternatively, lenses could be made from one of the more-dense high-refractive index plastics with an index of refraction greater than 1.58. In some embodiments, the lenses are made from optically transparent materials with lower index of refraction (e.g., CR39 is at 1.50, Trivex is at 1.53). In some embodiments, the lenses are made from photochromatic lens materials that darken when exposed to UV-light.

Surface dot patterns can also be formed by generating recesses in one or both surfaces of a lens. For example, referring to FIG. 3A, a lens 300 includes a dot pattern formed from recesses 304 formed on a surface of the lens body 302. In this example, a negatively powered meniscus lens is depicted. More generally, positive power or unpowered lenses can be used too. Recesses 304 can have dimensions and/or spacing similar to those of the protuberances described above. Recesses 304 can be formed using a variety of techniques, such as etching (e.g., physical etching or chemical etching) or ablating material from the lens surface (e.g., using laser radiation or a molecular or ion beam). In some embodiments, recesses are formed when molding the lens. The recesses can, in some cases, each correspond to of a region of the lens surface where sufficient material is removed to roughen the surface so that the lens surface scatters, rather than refracts, incident light.

Lens 300 also includes an optical coating 306 on the surface of lens body 302 opposite recesses 304. Optical coating 306 can perform one or more functions, such as antireflection, spectral filtering (e.g., UV filtering), and or a protective hardcoat.

In some embodiments, contrast reduction is produced by other diffusing structures, such as a roughened surface. Holographic diffusers or ground glass diffusers may be used. In some embodiments, a diffuser may be provided by a film that is laminated onto a surface of the lens.

Referring to FIG. 3B, a cross-sectional view of another lens 310 is shown. This lens includes a lens body 312 that includes embedded scattering centers 314. Lens 310 also includes an optical coating 316 on one of the lens body's surfaces. Optical coatings on both surfaces are also possible. Scattering centers are generally formed from a material that has a refractive index mismatch from the bulk lens material. For example, transparent beads of appropriate size can be dispersed in the lens material when the lens is molded, where the refractive index of the bead material and bulk lens material differ. The clear aperture is formed from bulk lens material only.

In some embodiments, embedded scattering centers 314 can be formed using a process that selectively induces a refractive index change in the lens bulk material. For example, exposure to a laser beam can cause a local change in the refractive index of bulk lens material, e.g., through a photochemical and/or photothermal interaction. Exemplary laser exposure methods that can be used to localize the dot pattern as described in more detail below.

FIG. 3C shows a further example of a lens 320 that features a dot pattern on the front surface of the lens formed by protuberances 324.

Generally, the refractive index mismatch between the lens material and the dot material affects the amount of light scattered at each protuberance, e.g., as calculated using a point spread function. Typically, the larger the refractive index mismatch between the materials, the more incident light will be scattered. Accordingly, refractive index mismatch can be used as a design parameter with which to optimize the scattering properties of the dots.

In some embodiments, the protuberance material is selected to have a refractive index that is within 0.1 (e.g., within 0.09 or less, 0.08 or less, 0.07 or less, 0.06 or less, 0.05 or less, 0.04 or less, 0.03 or less, 0.02 or less, 0.01 or less, 0.005 or less, 0.002 or less, 0.001 or less) of the refractive index of the lens material (e.g., as measured at one or more wavelengths in the visible light range).

In certain embodiments, larger refractive index mismatches (e.g., more than 0.1) are possible. For example, the protuberance material can be selected to have a refractive index that differs from the refractive index of the lens material by 0.15 or more (e.g., 0.2 or more, 0.25 or more, 0.3 or more, 0.35 or more, such as up to about 0.4).

In general, the refractive index of each dot can be the same or different. For example, where the dots are each formed from the same material, each one can have the same refractive index. Alternatively, in some embodiments, the refractive index can vary from dot-to-dot or between different groups of dots. For example, in certain implementations, the refractive index mismatch between the dots and the lens bulk material can increase as the radial distance from the lens axis increases in order to increasing the amount of light scattering from each dot as the radial distance from the lens axis increases.

In some instances, dots can be formed from materials that absorb at least some light incident thereon, such as dyes. The materials can be selected to absorb broadband visible light, or absorb light only at certain wavelengths (e.g., absorb a short wavelength component or long wavelength component). It is believed that light absorptive materials can help reduce glare and/or provide another design parameter for shaping the point spread function of the dots. In some embodiments, exposure to radiation can change the lens material from transparent to absorptive at certain wavelengths. For instance, the exposing radiation can burn the lens material in order to form light absorbing centers in the lens material or on its surface.

As noted previously, in general, the size, spacing, and arrangement of the dot pattern can vary. In some embodiments, the dot pattern features a gradient in, e.g., dot size and/or spacing. Dot patterns can feature a gradient in scattering efficiency of the dots (e.g., due to a gradient in the refractive index mismatch and/or shape of each dot). Graded dot patterns can reduce the conspicuity of the pattern. For example, a graded transition from the clear portions of the lens to the scattering portion can be less conspicuous than a sharp transition.

In some embodiments, a lens can feature different zones in which the dot pattern varies from zone-to-zone. For example, referring to FIGS. 4A and 4B, a lens 400 includes a clear aperture 410, a transition zone 420, and a scattering zone 430. Clear aperture 410 has a radius R410 and transition zone 420 is an annular region surrounding the clear aperture having an inner radius $R_{410}$ and an outer radius $R_{420}$. The remainder of the lens area forms scattering zone 430.

Transition zone 420 features a dot pattern that scatters incident light less than the dot pattern in scattering zone 430, providing a transition in the scattering properties of the lens from the clear aperture to the scattering zone. Such a transition may be advantageous in that it reduces scattering into the fovea compared to scattering that would be provided if the scattering zone extended to the clear aperture. A further advantage is that the transition zone may reduce the visibility of the dot pattern to the user, providing a more comfortable wearing experience. This can be particularly important for children, where the likelihood that a child will regularly wear eyeglasses featuring such lenses for extended periods depends on the child's comfort level.

Generally, the dot pattern in transition zone 420 can vary. In some embodiments, the transition zone features a uniform dot pattern in which the dots have the same shape and size and are uniformly spaced. Alternatively, in certain embodiments, the dot pattern in the transition zone can feature varying dot density, spacing, and/or size. For example, the dot pattern can be selected to provide the weakest scattering closest to the clear aperture, with monotonically increasing scattering at increasing radial distances from $R_{410}$ to $R_{420}$. For example, in some embodiments, the dot density increases monotonically (e.g., linearly) from $R_{410}$ to $R_{420}$. By way of example, the dot diameter can increase linearly from a first value (e.g., 0.05 mm) to a second value (e.g., 0.17 mm) as the radial distance from the lens axis increases from $R_{410}$ to $R_{420}$. Alternatively, or in addition, the dot spacing can decrease monotonically (e.g., linearly) from $R_{410}$ to $R_{420}$.

Typically, $R_{410}$ is in a range from about 1 mm to about 3 mm (e.g., 1.0 mm to 1.1 mm, 1.1 mm to 1.2 mm, 1.2 mm to 1.3 mm, 1.3 mm to 1.4 mm, 1.4 mm to 1.5 mm, 1.5 mm to 1.6 mm, 1.6 mm to 1.7 mm, 1.7 mm to 1.8 mm, 1.8 mm to 1.9 mm, 1.9 mm to 2.0 mm, 2.0 mm to 2.1 mm, 2.1 mm to 2.2 mm, 2.2 mm to 2.3 mm, 2.3 mm to 2.4 mm, 2.4 mm to 2.5 mm, 2.5 mm to 2.6 mm, 2.6 mm to 2.7 mm, 2.7 mm to 2.8 mm, 2.8 mm to 2.9 mm, 2.9 mm to 3.0 mm).

$R_{420}$ can be in a range from about 2 mm to about 6 mm (e.g., 2.0 mm to 2.2 mm, 2.2 mm to 2.4 mm, 2.4 mm to 2.6 mm, 2.6 mm to 2.8 mm, 2.8 mm to 3.0 mm, 3.0 mm to 3.2 mm, 3.2 mm to 3.4 mm, 3.4 mm to 3.6 mm, 3.6 mm to 3.8 mm, 3.8 mm to 4.0 mm, 4.0 mm to 4.2 mm, 4.2 mm to 4.4 mm, 4.4 mm to 4.6 mm, 4.6 mm to 4.8 mm, 4.8 mm to 5.0 mm, 5.0 mm to 5.2 mm, 5.2 mm to 5.4 mm, 5.4 mm to 5.6 mm, 5.6 mm to 5.8 mm, 5.8 mm to 6.0 mm).

In some embodiments, the dot pattern includes randomly displacing dots with respect to a regular array. Introducing random displacements can reduce optical effects associated with regularly spaced scattering centers, such as starburst-like glare. See, e.g., https://www.slrlounge.com/diffraction-aperture-and-starburst-effects/ which illustrates the starburst effect as it relates to photography. Accordingly, including random displacements in dot patterns can provide the user with a more comfortable experience compared with similar dot patterns in which the scattering centers are uniformly spaced. Alternatively, or additionally, randomization of the dot pattern can reduce the optical effects (e.g., diffractive or interference effects) that manifest in reflected light, reducing the noticeability of the dot patterns to observers.

Random displacements are illustrated in FIG. 4C, which shows dots 401a-401e positioned with respect to an array lattice in which adjacent lattice sites are spaced a distance $D_x$ from each other in the x-direction and a distance $D_y$ from each other in the y-direction. As illustrated, $D_x = D_y$, however, more generally, the vertical and horizontal lattice spacing can be different.

For each dot, $\delta x = A_x \cdot D_x \cdot RN[0,1]$ and $\delta y = A_y \cdot D_y \cdot RN[0,1]$ where $A_x$ and $A_y$ are jitter amplitudes between 0 and 1 in the x- and y-directions, respectively, which may be the same or different. $RN[0,1]$ is a random number between 0 and 1.

Dot size can also vary randomly, which can reduce optical effects associated with an array of uniformly sized dots, such as glare. For example, as illustrated in FIG. 4C, the radial dimension of each dot can vary from a nominal dot radius, $r_0$. As illustrated, dot 401d has nominal dot radius $r_0$, while dots 401b and 401e have radii $r_b$ and $r_e$, respectively that are both larger than $r_0$ and $r_b \neq r_e$. Dot radius can be set according to a formula $r_i = r_0 + \Delta r$, where $\Delta r = A_r \cdot r_0 \cdot RN[0,1]$, in which i refers to the i-th dot and $A_r$ is the dot radius jitter amplitude which is set to a value between 0 and 1.

More generally, while the example above refers to dot radius of a nominally circular dot, jitter can be applied to other dot-size parameters depending on the application. For example, jitter can be applied to dot volume or other dot dimensions (e.g., x-dimension, y-dimension).

In some embodiments, dot patterns can include both random jitter in dot placement and random jitter in dot size.

The average jitter amplitude of all the dots on a lens can be 0.05 or more (e.g., 0.1 or more, 0.15 or more, 0.2 or more, 0.25 or more, 0.3 or more, 0.35 or more, such as 0.4 or less). Generally, some or all of the dots can be jittered. For example, at least 10% of the dots on the lens can be jittered (e.g., 20% or more, 30% or more, 40% or more, 50% or more 60% or more, 70% or more, 80% or more, 90% or more, such as 100% of the dots).

Exemplary dot patterns featuring a transition zone are shown in FIGS. 5A-5F. The patterns in FIGS. 5A, 5C, and 5E feature uniformly spaced dots in the scattering zone. The patterns in FIGS. 5B, 5D, and 5F feature dots that are randomly displaced from uniform spacing. The units for both the horizontal and vertical axes are mm. Each of FIGS. 5A-5F includes an inset showing a magnified view of the corresponding dot pattern. The parameters characterizing the dot patterns are provided in the table below.

| FIG. | Dot Pattern | Clear Aperture radius | Transition Zone radius | Scattering Zone Dot lattice spacing | Scattering Zone Dot dimension | Scattering Zone Jitter amplitude |
|---|---|---|---|---|---|---|
| 5A | DOT-02-210-170 | 2 mm | 3.5 mm | 0.21 mm | 0.17 mm | 0 |
| 5B | 210-170-JITTERED | 2 mm | 3.5 mm | 0.21 mm | 0.17 mm | 0.1 |
| 5C | DOT-02-240-170 | 2 mm | 3.5 mm | 0.24 mm | 0.17 mm | 0 |
| 5D | 240-170-JITTERED | 2 mm | 3.5 mm | 0.24 mm | 0.17 mm | 0.15 |
| 5E | DOT-02-365-170 | 2 mm | 3.5 mm | 0.365 mm | 0.17 mm | 0 |
| 5F | 365-170-JITTERED | 2 mm | 3.5 mm | 0.365 mm | 0.17 mm | 0.2 |

In some embodiments, the dot pattern features a gradient in, e.g., dot size and/or spacing. Dot patterns can feature a gradient in scattering efficiency of the dots (e.g., due to a gradient in the refractive index mismatch and/or shape of each dot). Graded dot patterns can reduce the conspicuity of the pattern. For example, a graded transition from the clear portions of the lens to the scattering portion can be less conspicuous than a sharp transition.

Figure 6A:
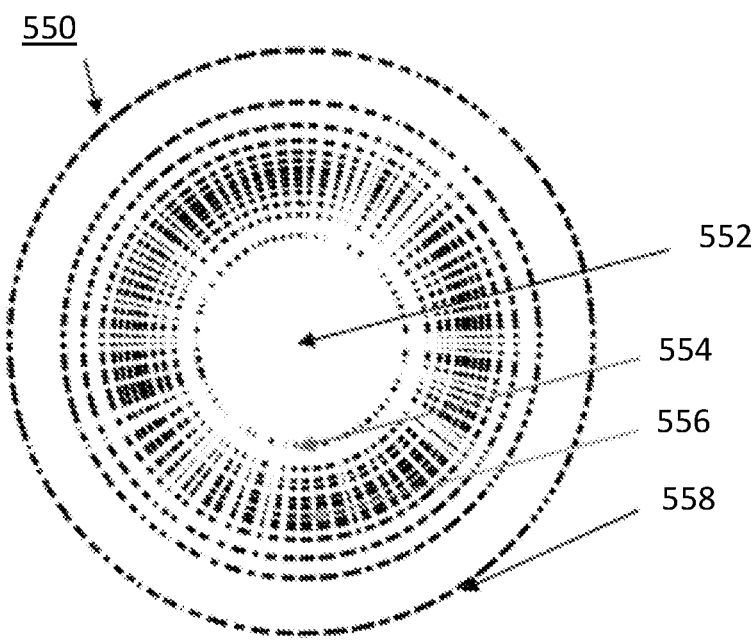
FIG. 6A shows an exemplary lens having a graded dot pattern with different spacing between adjacent dots.
Figure 6B:
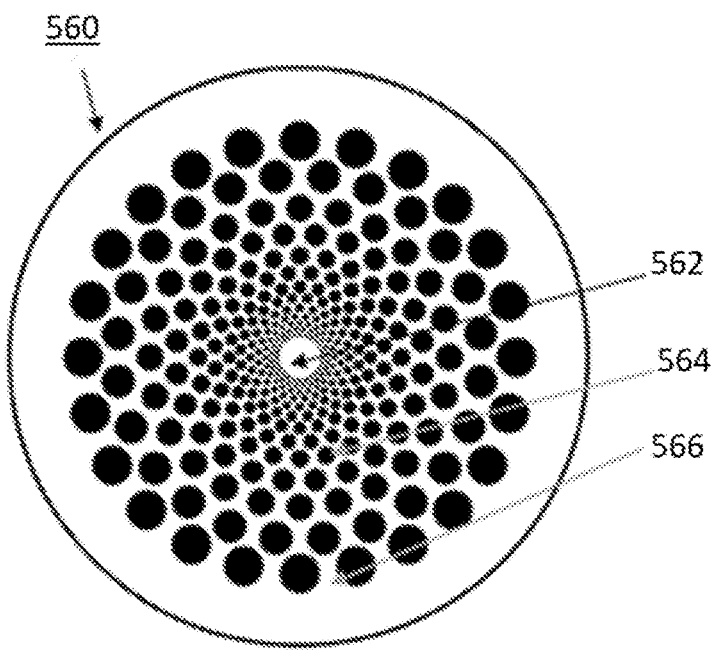
FIG. 6B shows an exemplary lens having a graded dot pattern with varying dot size.

Referring to FIGS. 6A and 6B, exemplary graded dot patterns are shown.

Specifically, FIG. 6A shows a graded dot pattern 600 with different spacing between adjacent dots. Clear aperture 610 transitions into low-density region 620. In region 620, distance between adjacent dots is relatively large, thus rendering a low density of dots in region 620. Low-density region 620 then transitions into high-density region 530, where the spacing between adjacent dots is small, thus rendering a high density of dots. High-density region 630 then transitions into low-density region 640, where the spacing between adjacent dots is again increased. As a result, due to the graded transition from clear aperture 610 to the outer edge of the lens, the graded dot pattern can be less conspicuous compared to a transition to a higher density, uniform dot pattern.

Dot density can be controlled not only by the spacing between adjacent dots, but also by dot size. Referring to FIG. 6B, e.g., for example, a dot pattern 650 features dots close to clear aperture 660 that have smaller size compared to dots closer to an edge 680 of the dot pattern.

In another example, a lens can have a graded dot pattern with both varying dot size and dot-to-dot distance.

The shape and/or composition of dots can also vary radially, yielding a graded pattern. For bulk scatter centers, e.g., for example, a graded pattern can be provided by forming scatter centers with a lower refractive index mismatch compared to the lens bulk material closer to the edges of the dot pattern compared to scatter centers in the center of the dot pattern.

In general, dots can be formed on lenses in a variety of ways. For example, dots can be formed using inkjet printing techniques, such as those disclosed in PCT/US2017/044635, filed Jul. 31, 2017, entitled "OPHTHALMIC LENSES FOR TREATING MYOPIA," the entire contents of which is incorporated herein by reference.

In some embodiments, dots are formed on one or both surfaces of a lens by exposing a lens surface to laser radiation. The laser radiation locally ablates the lens material at the surface, leaving a small depression, small bumps and/or roughened patch. By selectively exposing the lens surface to laser radiation, a dot pattern can be formed on the surface. For example, the laser's beam can be moved relative to the surface while the beam is pulsed. Relative motion between the beam and the lens surface can be caused by moving the beam while leaving the surface fixed, moving the surface while leaving the beam fixed, or moving both the beam and the surface.

While various examples of myopia control spectacle lenses that feature dot patterns are described above, other embodiments are also possible. For example, in general, a dot pattern can include dots having any appropriate size (e.g., a dimension such as a maximum dimension or a volume). In some cases, dots in a dot pattern can be approximately the same size. In some cases, dots in a dot pattern can have varying sizes. In some cases, a dot pattern can include dots having a diameter of less than about 0.20 mm. In some cases, a dot pattern can include dots having a diameter of from about 0.10 mm to about 0.20 mm (e.g., from about 0.10 mm to about 0.17 mm, from about 0.10 mm to about 0.15 mm, from about 0.10 mm to about 0.14 mm, from about 0.10 mm to about 0.13 mm, from about 0.10 mm to about 0.12 mm, from about 0.10 mm to about 0.11 mm, from about 0.11 mm to about 0.20 mm, from about 0.12 mm to about 0.20 mm, from about 0.13 mm to about 0.20 mm, from about 0.14 mm to about 0.20 mm, from about 0.15 mm to about 0.20 mm, from about 0.16 mm to about 0.20 mm, from about 0.18 mm to about 0.20 mm, from about 0.11 mm to about 0.17 mm, from about 0.12 mm to about 0.15 mm, from about 0.13 mm to about 0.14 mm, or from about 0.12 mm to about 0.16 mm). For example, a dot pattern can include dots having a diameter of about 0.14 mm.

A dot pattern can include any appropriate dot spacing. In some cases, dot spacing in a dot pattern can be even. In some cases, dot spacing in a dot pattern can be variable. In some cases, dots in a dot pattern can have a dot spacing of (e.g., be spaced apart by) from about 0.2 mm to about 0.4 mm (e.g., from about 0.2 mm to about 0.38 mm, from about 0.2 mm to about 0.375 mm, from about 0.2 mm to about 0.35 mm, from about 0.2 mm to about 0.325 mm, from about 0.2 mm to about 0.3 mm, from about 0.2 mm to about 0.28 mm, from about 0.2 mm to about 0.24 mm, from about 0.25 mm to about 0.4 mm, from about 0.27 mm to about 0.4 mm, from about 0.29 mm to about 0.4 mm, from about 0.325 mm to about 0.4 mm, from about 0.35 mm to about 0.4 mm, from about 0.375 mm to about 0.4 mm, from about 0.225 mm to about 0.375 mm, from about 0.25 mm to about 0.35 mm, from about 0.275 mm to about 0.325 mm, from about 0.225 mm to about 0.25 mm, from about 0.25 mm to about 0.275 mm, from about 0.275 mm to about 0.3 mm, from about 0.3 mm to about 0.325 mm, from about 0.325 mm to about 0.35 mm, or from about 0.35 mm to about 0.375 mm). For example, dots in a dot pattern can have a dot spacing of about 0.24 mm.

A dot pattern can include any appropriate dot density. In some cases, dot density in a dot pattern can be even. In some cases, dot density in a dot pattern can be variable. In some cases, dots in a dot pattern can have a dot density of from about 2 dots per mm$^2$ (dots/mm$^2$) to about 5 dots/mm$^2$ (e.g., from about 2 to about 4.75, from about 2 to about 4.5, from about 2 to about 4.25, from about 2 to about 4, from about 2 to about 3.75, from about 2 to about 3.5, from about 2 to about 3.25, from about 2 to about 3, from about 2 to about 2.75, from about 2 to about 2.5, from about 2 to about 2.25, from about 2.25 to about 5, from about 2.5 to about 5, from about 2.75 to about 5, from about 3 to about 5, from about 3.25 to about 5, from about 3.5 to about 5, from about 3.75 to about 5, from about 4 to about 5, from about 4.25 to about 5, from about 4.5 to about 5, from about 4.75 to about 5, from about 2.25 to about 4.75, from about 2.5 to about 4.5, from about 2.75 to about 4.25, from about 3 to about 4, from about 3.25 to about 3.75, from about 2.5 to about 3.5, from about 3.5 to about 4.5, from about 3.5 to about 4, or from about 4 to about 4.5 dots/mm$^2$). For example, dots in a dot pattern can have an average dot density of from about 3.5 to about 3.65 dots/mm$^2$ (e.g., about 3.52, about 3.55, about 3.57, about 3.60, or about 3.62 dots/mm$^2$). For example, dots in a dot pattern can have an average dot density of from about 4.1 to about 4.25 dots/mm$^2$ (e.g., about 4.12, about 4.15, about 4.17, about 4.2, or about 4.22 dots/mm$^2$).

A dot pattern can include any appropriate combination of dot size, dot spacing, and/or dot density as described herein. In some cases, dot size, dot spacing, and/or dot density in a dot pattern can be even. In some cases, dot size, dot spacing, and/or dot density in a dot pattern can be variable. For example, a plurality of dots can be attached in a dot pattern that includes random variation in dot size and/or random variation in spacing between adjacent dots. In some cases, a plurality of dots in a dot pattern can be positioned relative to a regular array of lattice sites. For example, each dot in a dot pattern positioned relative to a regular array of lattice sites can be displaced in at least one dimension (e.g., x- and/or y-) from a corresponding one of the lattice sites by an amount equal to or less than a jitter amplitude. In some cases, the jitter amplitude can be a fraction of the distance between adjacent lattice sites. For example, a jitter amplitude can be less than about 0.5 (e.g., 0.4, 0.35, 0.3, 0.25, 0.2, 0.18, 0.15, 0.12, 0.1, 0.8, 0.05 or less). For example, a jitter amplitude can be more than about 0.02 (e.g., 0.03, 0.04, 0.05, 0.08, 0.1, 0.12, 0.15, 0.18, 0.2, 0.25, 0.3, 0.35, 0.4 or more). For example, a jitter amplitude can be from about 0.01 to about 0.5 (e.g., from about 0.01 to about 0.45, from about 0.01 to about 0.4, from about 0.01 to about 0.35, from about 0.01 to about 0.3, from about 0.01 to about 0.25, from about 0.01 to about 0.2, from about 0.01 to about 0.15, from about 0.01 to about 0.1, from about 0.01 to about 0.05, from about 0.05 to about 0.5, from about 0.08 to about 0.5, from about 0.1 to about 0.5, from about 0.13 to about 0.5, from about 0.15 to about 0.5, from about 0.2 to about 0.5, from about 0.25 to about 0.5, from about 0.3 to about 0.5, from about 0.35 to about 0.5, from about 0.4 to about 0.5, from about 0.45 to about 0.5, from about 0.05 to about 0.45, from about 0.1 to about 0.4, from about 0.15 to about 0.35, from about 0.2 to about 0.3, from about 0.1 to about 0.2, or from about 0.3 to about 0.4). In some cases, a plurality of dots in a dot pattern can have a size (e.g., a dimension such as a maximum dimension and/or a volume) that varies randomly from a nominal value. The random variation can be equal to or less than a jitter amplitude. For example, a jitter amplitude can be less than about 0.5 times the nominal value (e.g., 0.4, 0.35, 0.3, 0.25, 0.2, 0.18, 0.15, 0.12, 0.1, 0.8, 0.05 times the nominal value). For example, a jitter amplitude can be more than about 0.02 times the nominal value (e.g., 0.03, 0.04, 0.05, 0.08, 0.1, 0.12, 0.15, 0.18, 0.2, 0.25, 0.3, 0.35, 0.4 times the nominal value). For example, a jitter amplitude can be from about 0.01 times the nominal value to about 0.5 times the nominal value (e.g., from about 0.01 to about 0.45, from about 0.01 to about 0.4, from about 0.01 to about 0.35, from about 0.01 to about 0.3, from about 0.01 to about 0.25, from about 0.01 to about 0.2, from about 0.01 to about 0.15, from about 0.01 to about 0.1, from about 0.01 to about 0.05, from about 0.05 to about 0.5, from about 0.08 to about 0.5, from about 0.1 to about 0.5, from about 0.13 to about 0.5, from about 0.15 to about 0.5, from about 0.2 to about 0.5, from about 0.25 to about 0.5, from about 0.3 to about 0.5, from about 0.35 to about 0.5, from about 0.4 to about 0.5, from about 0.45 to about 0.5, from about 0.05 to about 0.45, from about 0.1 to about 0.4, from about 0.15 to about 0.35, from about 0.2 to about 0.3, from about 0.1 to about 0.2, or from about 0.3 to about 0.4 times the nominal value).

A dot pattern can cover (e.g., can occupy) any appropriate amount of a lens surface. In some cases, a dot pattern can cover a bulk of a peripheral diffusion lens. In some cases, a dot pattern can cover from about 10% to about 99% (e.g., from about 10% to about 90%, from about 10% to about 75%, from about 10% to about 60%, from about 10% to about 50%, from about 10% to about 40%, from about 10% to about 35%, from about 10% to about 30%, from about 10% to about 25%, from about 10% to about 20%, from about 10% to about 15%, from about 15% to about 99%, from about 20% to about 99%, from about 30% to about 99%, from about 40% to about 99%, from about 50% to about 99%, from about 60% to about 99%, from about 75% to about 99%, from about 12% to about 75%, from about 15% to about 50%, from about 20% to about 40%, from about 15% to about 25%, from about 20% to about 40%, from about 30% to about 50%, from about 40% to about 60%, or from about 50% to about 70%) of a lens surface. For example, a dot pattern can cover 50% or less (e.g., 40% or less, 30% or less, 20% or less) of a lens surface. For example, a dot pattern can cover about 20% of a lens surface. For example, a dot pattern can cover about 40% of a lens surface.

A peripheral diffusion lens can include an aperture. In some cases, when wearing a peripheral diffusion lens described herein, an aperture can be aligned to be in front of a human's pupil (e.g., when in distance gaze). In some cases, an aperture can be a clear aperture (e.g., an aperture free of dots). In some cases, an aperture can be on the viewing axis. An aperture can be any appropriate size. In some cases, an aperture can have a size (e.g., a maximum dimension) of from about 0.2 mm to about 1.5 cm (e.g., from about 0.2 mm to about 1.2 cm, from about 0.2 mm to about 1 cm, from about 0.2 mm to about 8 mm, from about 0.2 mm to about 7 mm, from about 0.2 mm to about 6 mm, from about 0.2 mm to about 5 mm, from about 0.2 mm to about 4 mm, from about 0.2 mm to about 3 mm, from about 0.2 mm to about 2 mm, from about 0.2 mm to about 1 mm, from about 0.2 mm to about 0.5 mm, from about 0.5 mm to about 1.5 cm, from about 0.8 mm to about 1.5 cm, from about 1 mm to about 1.5 cm, from about 1.2 mm to about 1.5 cm, from about 1.5 mm to about 1.5 cm, from about 2 mm to about 1.5 cm, from about 2.5 mm to about 1.5 cm, from about 3 mm to about 1.5 cm, from about 5 mm to about 1.5 cm, from about 8 mm to about 1.5 cm, from about 1 cm to about 1.5 cm, from about 1.2 cm to about 1.5 cm, from about 1.3 cm to about 1.5 cm, from about 0.5 mm to about 1.2 cm, from about 1 mm to about 1 cm, from about 1.5 mm to about 0.5 cm, from about 2 mm to about 8 mm, from about 3 mm to about 7 mm, or from about 4 mm to about 6 mm). For example, an aperture can be about 5 mm in size. An aperture can be any appropriate shape. For example, an aperture can be circular. For example, an aperture can be non-circular (e.g., elliptical or polygonal such as having 4, 6, or 8 sides). In some cases, an aperture can be a circular aperture having a diameter of about 5 mm. In some cases, a clear aperture located on a lens viewing axis can allows a user (e.g., a human) to experience maximal visual acuity when viewing on-axis objects, while objects in the periphery of the user's visual field are viewed through a dot pattern (e.g., viewed with reduced contrast and acuity). In some cases, the aperture may be a step-function aperture, where the lens transitions from a dot-free area to a dot-density area in a step-function fashion (i.e., from dot-free aperture directly to the dot density found in the periphery). In other cases, the aperture may contain a transition zone, where between the dot-free area and the periphery there is a transition zone, where the density of dots is higher than the dot free area and lower than the peripheral area.

A myopia control spectacle lens can be any appropriate type of spectacle lens. A lens can include flat or curved surfaces. A myopia control spectacle lens can be made from any appropriate material (e.g., polycarbonate or Trivex®). In some cases, spectacles can include a myopia control spectacle lens in a single (e.g., the left or the right) lens. In some cases, spectacles can include myopia control spectacle lenses in both (e.g., the left and the right) lenses. In some cases, when spectacles can include myopia control spectacle lenses in both (e.g., the left and the right) lenses, the myopia control spectacle lenses can be the same or different.

In some cases, a myopia control spectacle lenses can be as described elsewhere (see, e.g., Appendix A, WO 2018/026697, U.S. Pat. No. 7,506,983, US 2011/0051079, and 2017/0131567).

Treatment with Defocus Lenses

As an alternative to, or in addition to, treatment with myopia control spectacle lenses, children may be fitted with spectacle lenses incorporating optical defocus. Defocus lenses include regions of the lens that provide "plus" power in order to move the focal plane from behind the retina to even with, or in front of, the retina (i.e., inside the eye). Such defocus regions may be applied to various regions of the spectacle lens. For example they may be in the bottom half or bottom third of the lens (e.g., a progressive or bifocal), in the periphery of the lens, or in concentric rings around the center of the lens. Alternatively, defocus regions may comprise one or more defocusing centers in the periphery of the lens, where each defocus center forms a "lenslet" providing plus power to that region. Defocus lenses may provide optical power in the range of +1.0 D to +6.0 D. For example, defocus lenses may provide optical power in the range of +2.00 D to +5.00 D, or +2.00 D, +2.25 D, +2.50 D, +2.75 D, +3.00 D, +3.25 D, +3.50 D, +3.75 D, +4.00 D, +4.25 D, +4.50 D, +4.75 D, or +5.00 D.

A spectacle lens may contain one or more lenslets, e.g., independent island shaped areas with a different optical power compared to the Rx for correcting the subject's myopia. The shape and composition of such lenslets have been described previously, e.g., for example in US 2017/0131567. It may contain 10-1000 lenslets, e.g., for example between 100-500 lenslets, or about 200-400, or about 350 lenslets. Lenslets may be from +2.00 D to +4.00 D, or about +3.50 D.

Treatment Protocols

In some cases, a child having, or suspected of having, myopia can be treated by having the juvenile human wear spectacles containing one or more (e.g., one or two) spectacle lenses with a dot pattern having a dot diameter of 0.14 mm and a dot spacing of 0.24 mm covering about 20% of a lens surface, and a 5 mm clear aperture.

When treating a human having, or suspected of having, myopia as described herein, the human can wear one or more (e.g., one or two) myopia control spectacle lenses described herein for any appropriate amount of time. In some cases, a human having, or suspected of having, myopia can wear one or more myopia control spectacle lenses for at least 12 months (e.g., at least 18 months, at least 24 months, at least 30 months, at least 36 months, at least 42 months, at least 48 months). For example, a human having, or suspected of having, myopia can wear one or more myopia control spectacle lenses for at least 12 months. For example, a human having, or suspected of having, myopia can wear one or more myopia control spectacle lenses for at least 24 months. For example, a human having, or suspected of having, myopia can wear one or more myopia control spectacle lenses for at least 36 months. In some cases, a human having, or suspected of having, myopia can wear one or more myopia control spectacle lenses for at least 6 hours (e.g., at least 7, at least 8, at least 9, at least 10, at least 11, at least 12, at least 13, at least 14, at least 15, at least 16, at least 17, or at least 18 hours) of each day that the one or more myopia control spectacle lenses are worn. For example, a human having, or suspected of having, myopia can be treated by having the human wear one or more myopia control spectacle lenses for at least 10 hours of each day that the one or more myopia control spectacle lenses are worn.

When treating a human having, or suspected of having, myopia as described herein, after the human has worn one or more (e.g., one or two) myopia control spectacle lenses described herein for an appropriate amount of time, the human can be assessed for any change in visual acuity. Visual acuity can be determined using any appropriate methods and/or instruments. Examples of methods and/or instruments that can be used to determine visual acuity in at least one eye of a human include, without limitation, visual acuity tests (e.g., using logMAR charts, Snellen charts, or ETDRS charts), contrast sensitivity tests (e.g., high contrast or low contrast vision charts to establish contrast sensitivity thresholds), peripheral visual acuity (e.g., by fixating gaze in one place and using logMAR charts, Snellen charts, or ETDRS charts in a peripheral region of specified eccentricity(ies) to fixation (e.g., 25 degrees) and of specified location(s) (e.g., superonasal visual quadrant) to assess the ability of the human to distinguish the letters and/or symbols of the charts), or peripheral contrast (e.g., by fixating gaze in one place and using high contrast or low contrast vision charts in a peripheral region). In cases where visual acuity is peripheral visual acuity or peripheral contrast, the peripheral region can be more than about 5 degrees, more than about 10 degrees, more than about 20 degrees, or more than about 24 degrees of eccentration from the point of fixation. In cases where visual acuity is peripheral visual acuity or peripheral contrast, the peripheral visual acuity or peripheral contrast can be tested in one or more (e.g., one, two, three, or all 4) quadrants of vision (e.g., superonasal, superotemporal, inferonasal, and/or inferotemporal fields), and can be measured, e.g., for example, in logMAR. In some cases, based, at least in part, on a change in visual acuity after having worn one or more myopia control spectacle lenses described herein for an appropriate amount of time, a human can be selected for continued wear of (e.g., another cycle of wearing) one or more myopia control spectacle lenses (e.g., one or more second myopia control spectacle lenses). In some cases, a human can be fitted for one or more second myopia control spectacle lenses. One or more myopia control spectacle lenses (e.g., one or more second myopia control spectacle lenses) for continued wear can include the same myopia control spectacle lenses or different myopia control spectacle lenses (e.g., as compared to one or more first myopia control spectacle lenses). For example, when visual acuity is reduced after having worn one or more myopia control spectacle lenses for an appropriate period of time, a human can be fitted for one or more new myopia control spectacle lenses (e.g., myopia control spectacle lenses having a different degree of correction, different peripheral diffusion or light scattering features, or different amounts of optical defocus). For example, when visual acuity is unchanged after having worn one or more myopia control spectacle lenses for an appropriate period of time, a human can be fitted for one or more different myopia control spectacle lenses (e.g., myopia control spectacle lenses having a higher or lower dot pattern density, higher or lower defocus power, or higher or lower reduction in visual acuity or contrast). For example, when visual acuity is improved after having worn one or more myopia control spectacle lenses for an appropriate period of time, a human can be fitted for one or more different myopia control spectacle lenses (e.g., myopia control spectacle lenses having a higher or lower dot pattern density, higher or lower defocus power, or higher or lower reduction in visual acuity or contrast) or can terminate wearing one or more myopia control spectacle lenses. After having worn one or more second myopia control spectacle lenses for an appropriate period of time, a human can be assessed for any change in visual acuity. This cycle (e.g., repeating a method including determining a visual acuity in at least one eye of a human identified as having myopia or as being likely to develop myopia can be determined, fitting that human for one or more peripheral diffusion lenses, having the human wear the one or more myopia control spectacle lenses for an appropriate period of time, and assessing the human for any change in visual acuity) can be repeated any appropriate number of times (e.g., 1, 2, 3, 4, 5, 6, 7, 8, 9, or more times).

Assessing Treatment

When treating a human having, or suspected of having, myopia as described herein (e.g., by having the human wear one or more (e.g., one or two) myopia control spectacle lenses), the treatment can be effective to correct the myopia or to reduce/eliminate progression of the myopia (e.g., as compared to a control). In some cases, treating a human having, or suspected of having, myopia as described herein can be effective to correct the myopia or to reduce/eliminate progression of the myopia (by greater than 15%, 20%, 25%, 30%, 35%, 40%, 45%, 50%, 55%, or 60%) after having the human wear the one or more myopia control spectacle lenses for an appropriate period of time (e.g., about 3 years). As used herein, a control can include, without limitation, measurements (e.g., axial lengths and/or SER errors) taken from a human prior to treatment, an untreated human, a human treated with one or more control lenses (e.g., lacking a dot pattern or optical defocus as described herein), such as a standard single vision lens, a lens with an optical tint, a standard contact lens, etc. A control can include a single human or a group of humans (e.g., a control group).

In some cases, treating a human having, or suspected of having, myopia as described herein (e.g., by having the human wear one or more (e.g., one or two) myopia control spectacle lenses) can be effective to reverse or partially reverse the myopia. For example, wearing one or more (e.g., one or two) myopia control spectacle lenses described herein can be effective to reduce an axial length in at least one eye (e.g., one eye or both eyes) of that human. For example, wearing one or more (e.g., one or two) myopia control spectacle lenses described herein can be effective to increase a SER error in at least one eye (e.g., one eye or both eyes) of that human. This reversal could be measured at any time point, e.g., for example, 30 days or 6, 12, 18, 24, 30, or 36 months.

In some cases, treating a human having, or suspected of having, myopia as described herein (e.g., by having the human wear one or more (e.g., one or two) myopia control spectacle lenses) can be effective to reduce/eliminate progression of the myopia compared to a control. For example, wearing one or more (e.g., one or two) myopia control spectacle lenses described herein can be effective to reduce/eliminate an increase in axial length (e.g., reduce/eliminate axial lengthening) in at least one eye (e.g., one eye or both eyes) of that human. For example, wearing one or more (e.g., one or two) myopia control spectacle lenses described herein can be effective to reduce/eliminate a change in SER (e.g., reduce/eliminate a decrease of a SER) in at least one eye (e.g., one eye or both eyes) of that human.

In some cases, wearing one or more (e.g., one or two) myopia control spectacle lenses described herein (e.g., by having the human wear one or more (e.g., one or two) myopia control spectacle lenses) can be effective to reduce progression of the myopia by at least 0.45 D (e.g., 0.46 D, 0.5 D, 0.55 D, 0.56 D, 0.6 D, 0.65 D, 0.7 D, or 0.75 D, or more). For example, wearing one or more (e.g., one or two) myopia control spectacle lenses described herein can be effective to reduce progression of the myopia by at least 0.45 D after three years of treatment. For example, wearing one or more (e.g., one or two) myopia control spectacle lenses described herein can be effective to reduce progression of the myopia by at least 0.45 D as compared to a control group.

In some cases, treating a human having, or suspected of having, myopia as described herein (e.g., by having the human wear one or more (e.g., one or two) myopia control spectacle lenses) can be effective to shorten an axial length of at least one eye (e.g., one eye or both eyes) of that human and/or to reduce/eliminate a change in axial length (e.g., reduce/eliminate axial lengthening) in at least one eye (e.g., one eye or both eyes) of that human. Axial length can be measured using any appropriate methods and/or machines. Examples of methods and/or machines that can be used to evaluate axial length include, without limitation, interferometry, such as an IOLMaster or Lenstar system. Axial length can be evaluated by any appropriate human (e.g., an ophthalmic clinician or an observer such as a masked observer). In some cases, treating a human having, or suspected of having, myopia as described herein, can be effective to shorten an axial length (e.g., by about 0.01, 0.02, 0.03, 0.04, 0.05, 0.1, or 0.15 mm) in at least one eye of that human. For example, in cases where a human having, or suspected of having, myopia has, prior to a treatment described herein, an axial length of from about 20 mm to about 30 mm in each eye, wearing myopia control spectacle lenses as described herein can be effective to shorten an axial length (e.g., by about 0.01, 0.02, 0.03, 0.04, 0.05, 0.1, or 0.15 mm) in at least one eye of that human. In some cases, treating a human having, or suspected of having, myopia as described herein, can be effective to reduce (e.g., slow) a change (e.g., an increase) in axial length. For example, in cases where a human having, or suspected of having, myopia has, prior to a treatment described herein, an axial length of from about 20 mm to about 30 mm in each eye, wearing myopia control spectacle lenses as described herein can be effective to reduce a change in the axial length (e.g., to slow (e.g., retard) axial length increase such that the axial length growth is not greater than about 0.1, 0.2, or 0.3 mm) in at least one eye of that human over a period of time (e.g., 1, 2, or 3 years). In some cases, treating a human having, or suspected of having, myopia as described herein, can be effective to maintain an axial length. For example, in cases where a human having, or suspected of having, myopia has, prior to a treatment described herein, an axial length of from about 20 mm to about 30 mm in each eye, wearing myopia control spectacle lenses as described herein can be effective to eliminate a change of >0.1 mm in axial length (e.g., to maintain the axial length) in at least one eye of that human. Changes in axial length could be compared to a particular subject's baseline (i.e., starting measurement before treatment) or compared to a control group of patients.

Figure 8A:
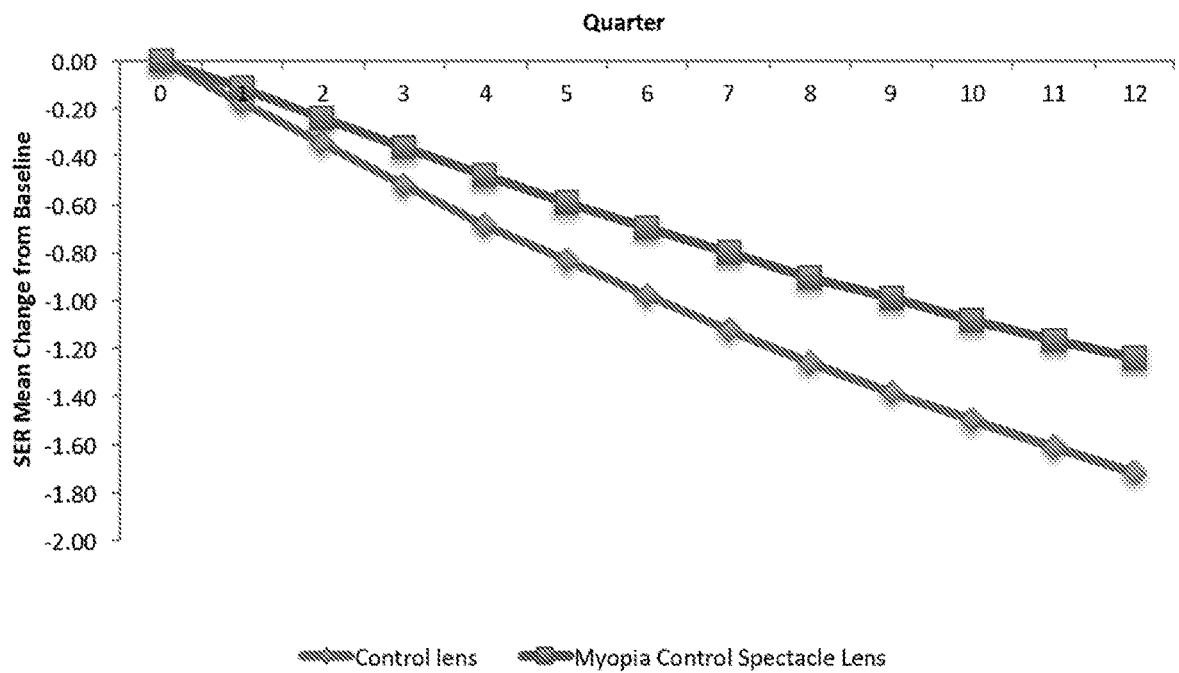
FIGS. 8A and 8B are plots based on the simulated numbers shown in FIG. 7.
Figure 8B:
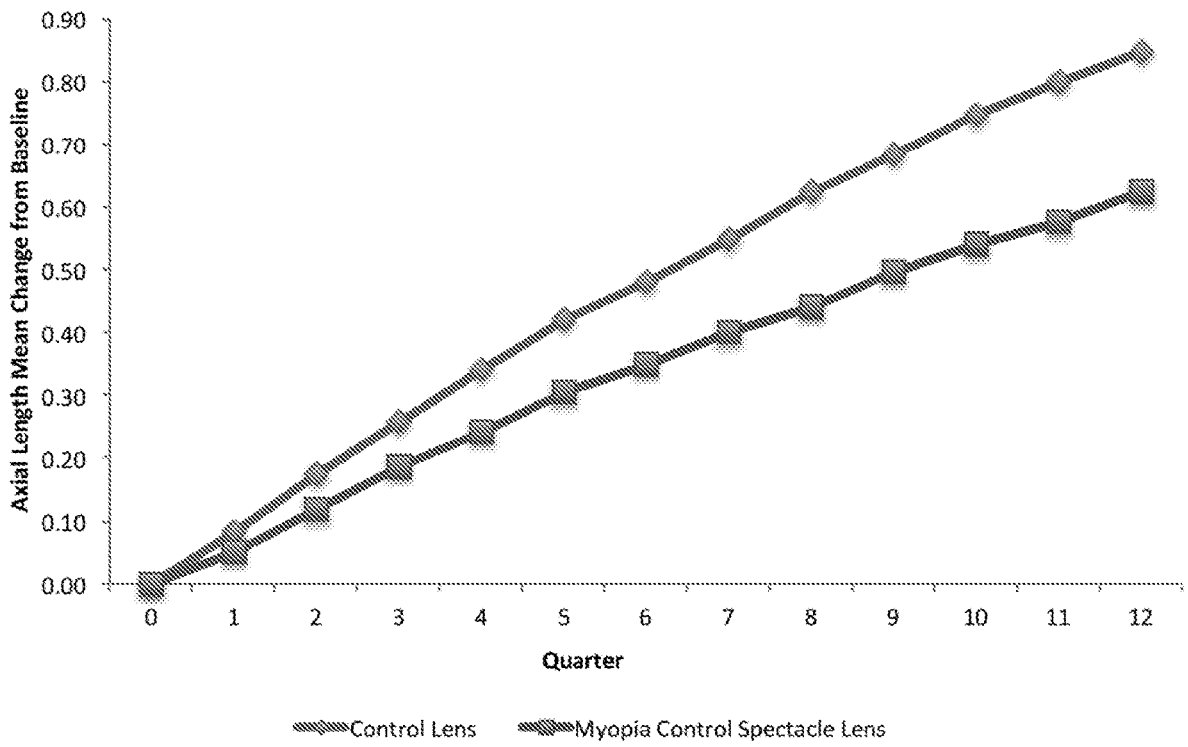
Figure 11A:
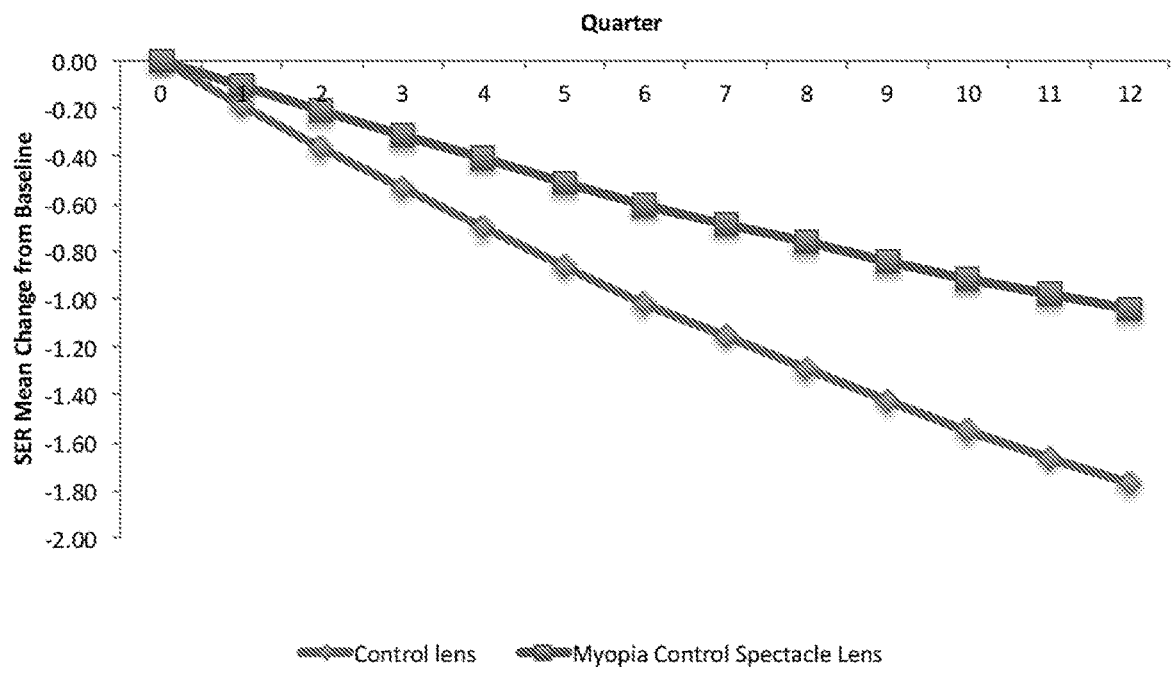
FIGS. 11A and 11B are plots based on the simulated numbers shown in FIG. 10.
Figure 11B:
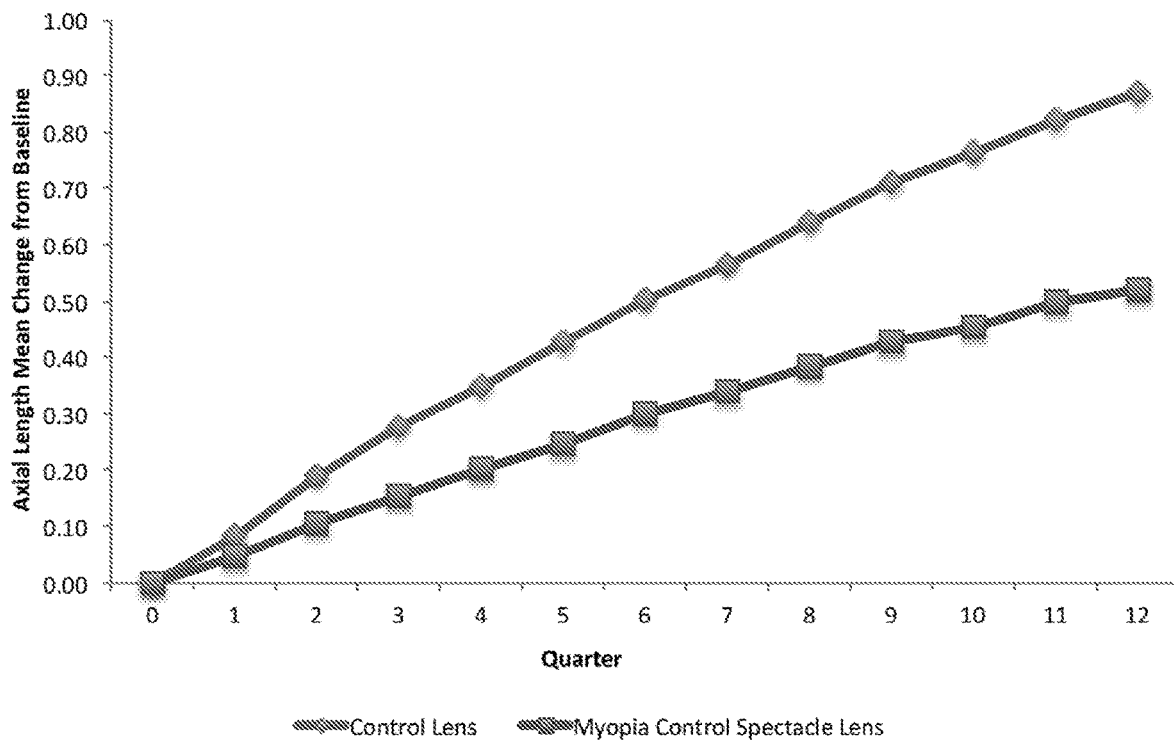
Figure 14A:
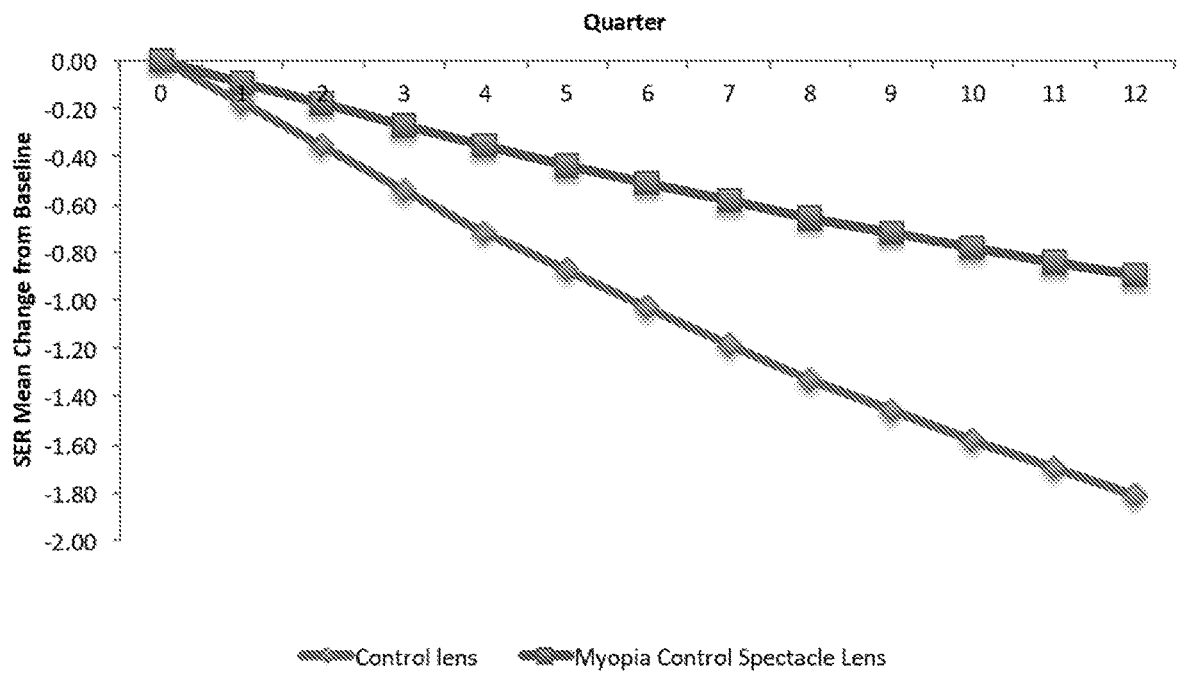
FIGS. 14A and 14B are plots based on the simulated numbers shown in FIG. 13.
Figure 14B:
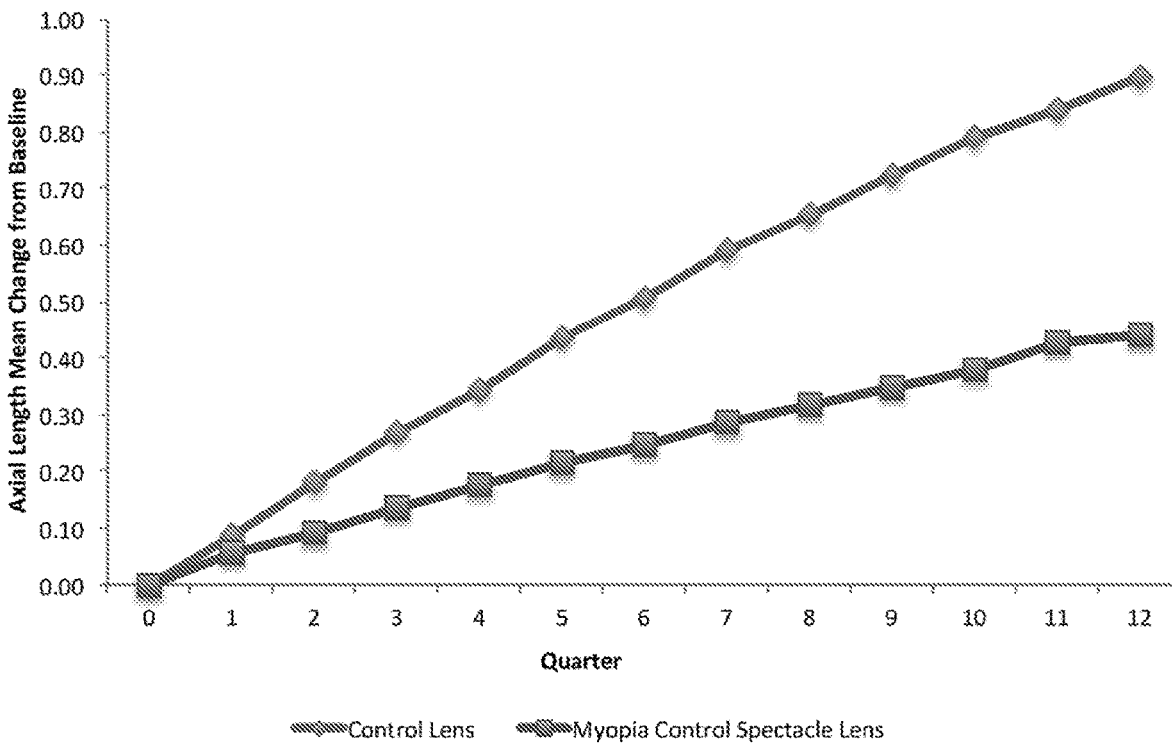

In some cases, treating a human in a fast progressor group having, or suspected of having, myopia as described herein, can be effective to reduce axial length growth by at least 30% (e.g., at least 40%, at least 50%, at least 60%, or more). For example, treating a human in a fast progressor group with at least one (e.g., one or two) myopia control spectacle lenses described herein can be effective to reduce axial length growth by about 30% as compared to a human treated with at least one (e.g., one or two) control lenses (see, e.g., FIG. 8B). For example, treating a human in a fast progressor group with at least one (e.g., one or two) myopia control spectacle lenses described herein can be effective to reduce axial length growth by about 40% as compared to a human treated with at least one (e.g., one or two) control lenses (see, e.g., FIG. 11B). For example, treating a human in a fast progressor group with at least one (e.g., one or two) myopia control spectacle lenses described herein can be effective to reduce axial length growth by about 50% as compared to a human treated with at least one (e.g., one or two) control lenses (see, e.g., FIG. 14B).

Figure 17A:
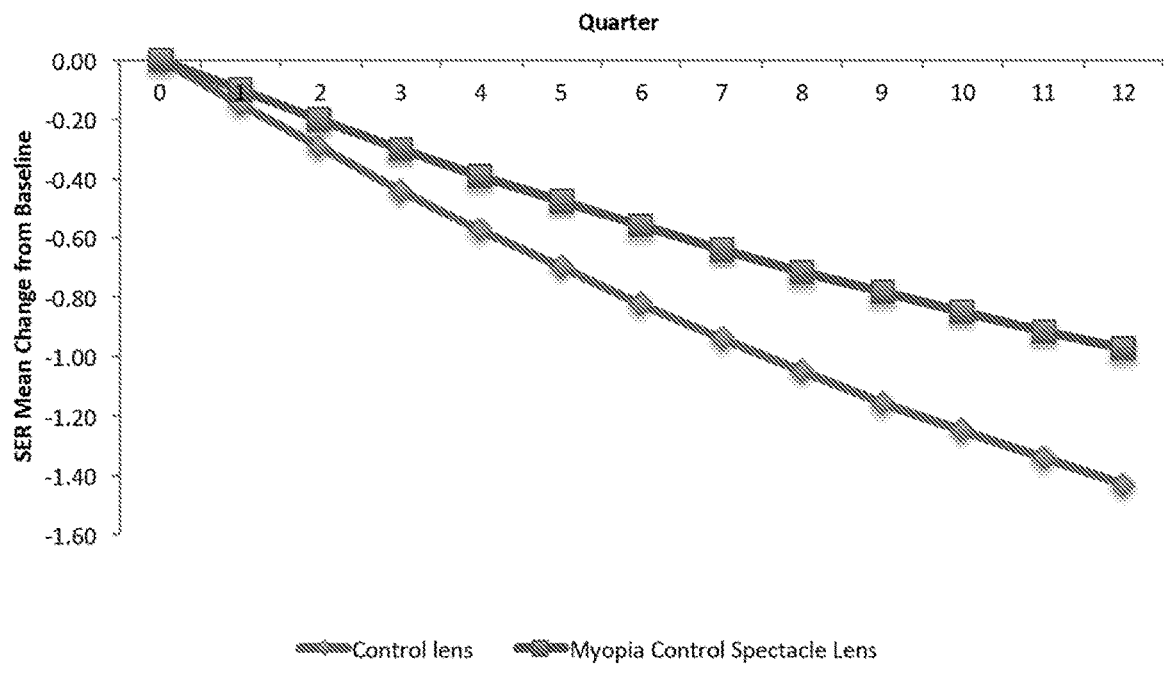
FIGS. 17A and 17B are plots based on the simulated numbers shown in FIG. 16.
Figure 17B:
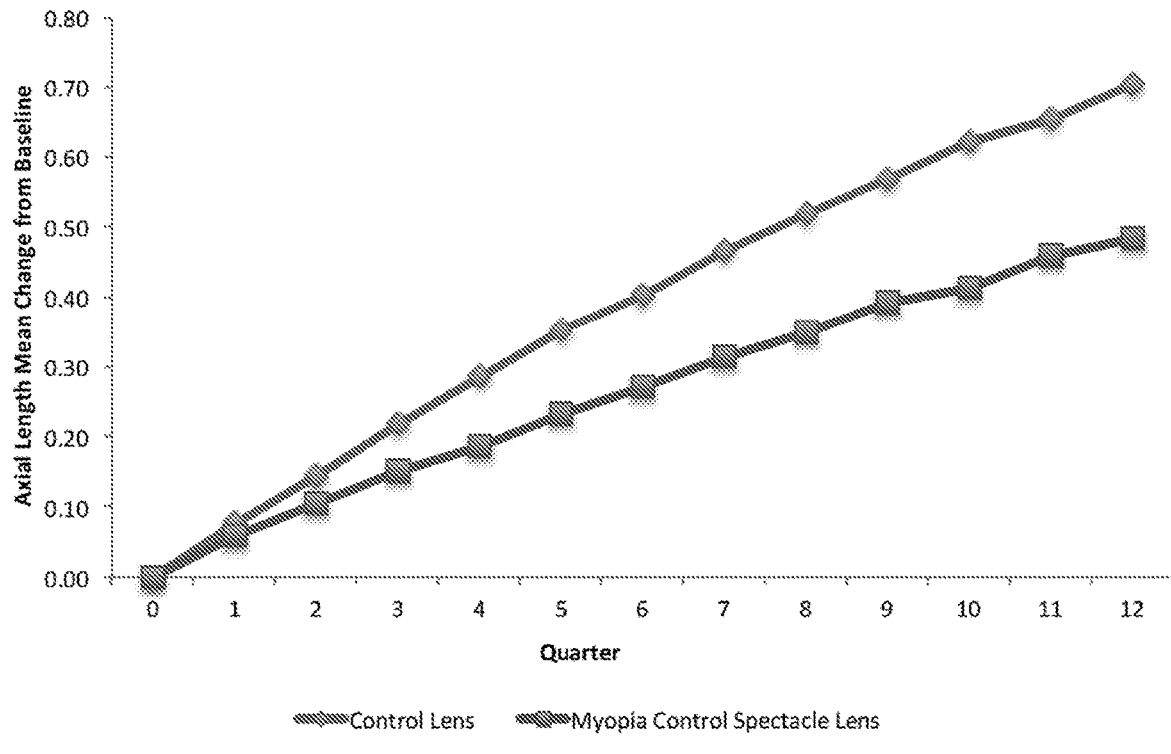
Figure 20A:
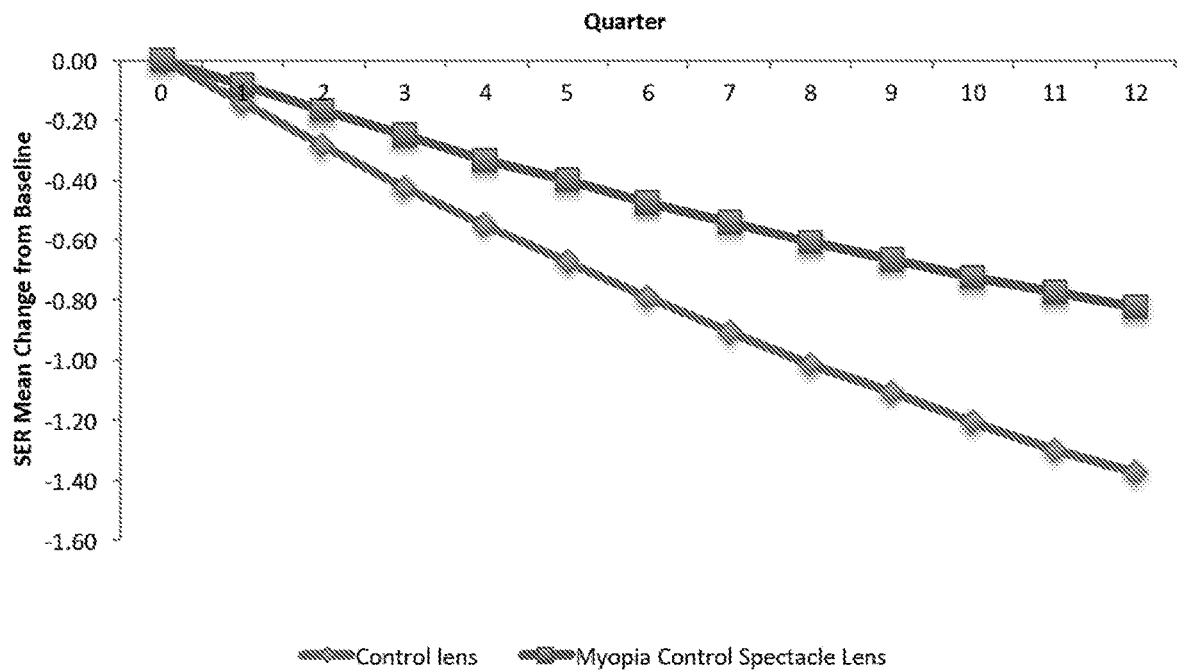
FIGS. 20A and 20B are plots based on the simulated numbers shown in FIG. 19.
Figure 20B:
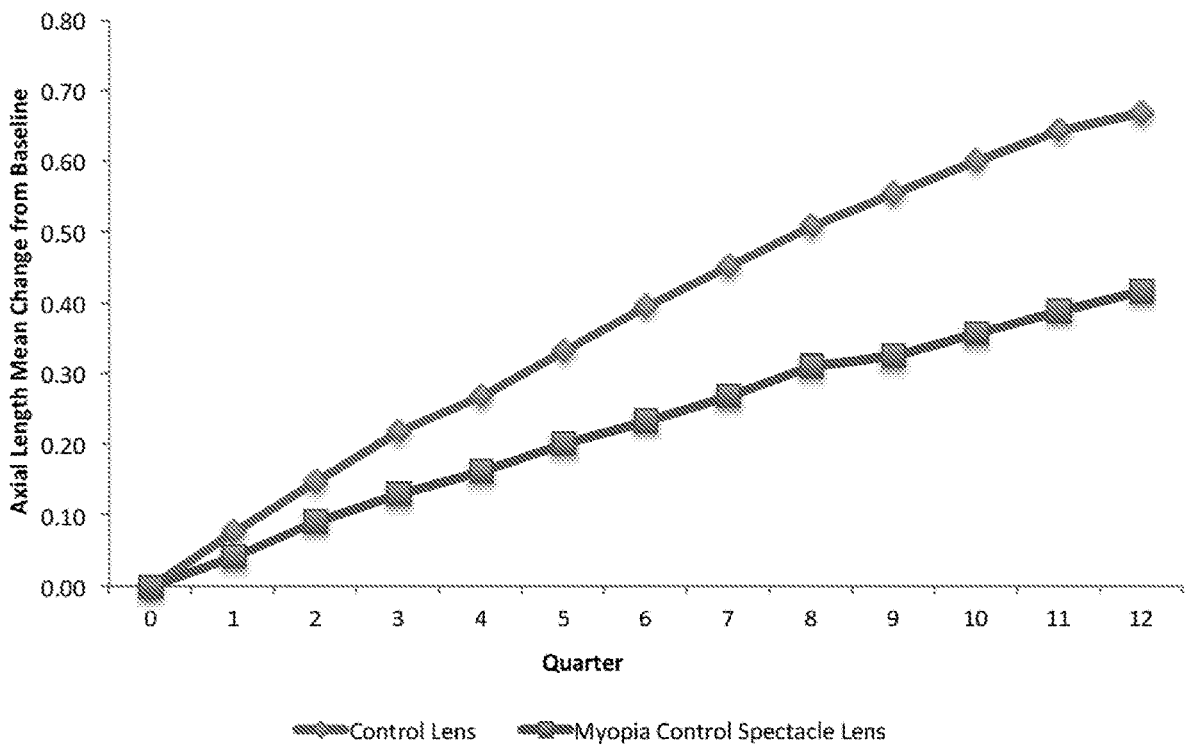
Figure 23A:
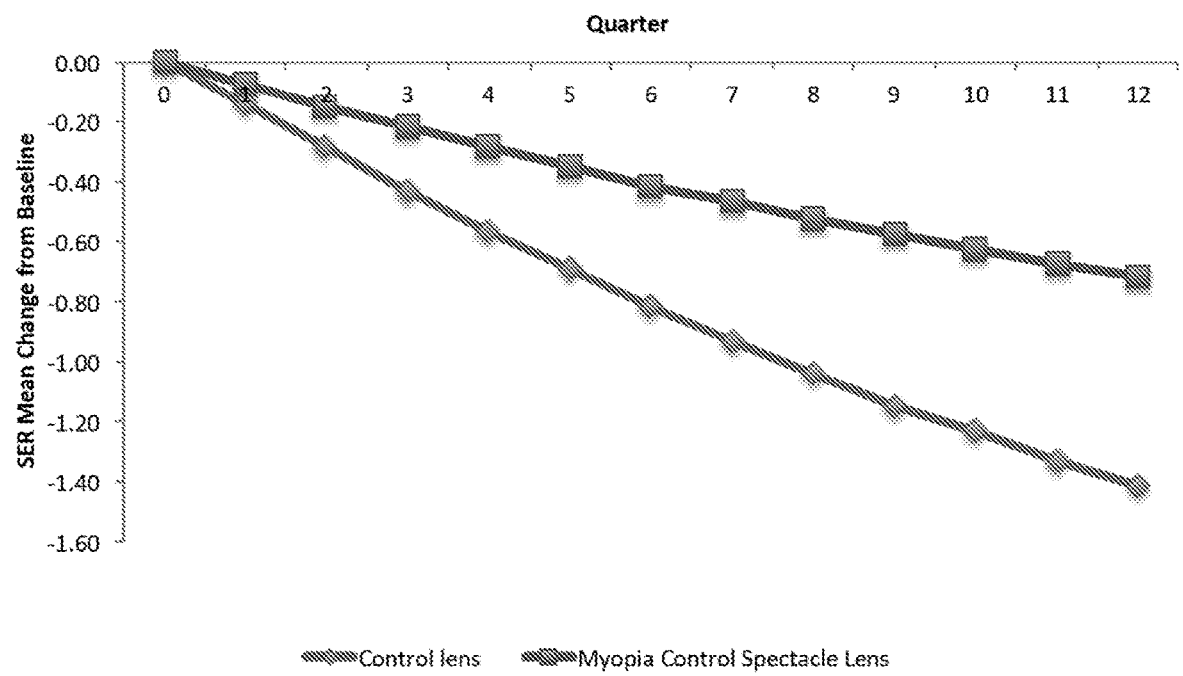
FIGS. 23A and 23B are plots based on the simulated numbers shown in FIG. 22.
Figure 23B:
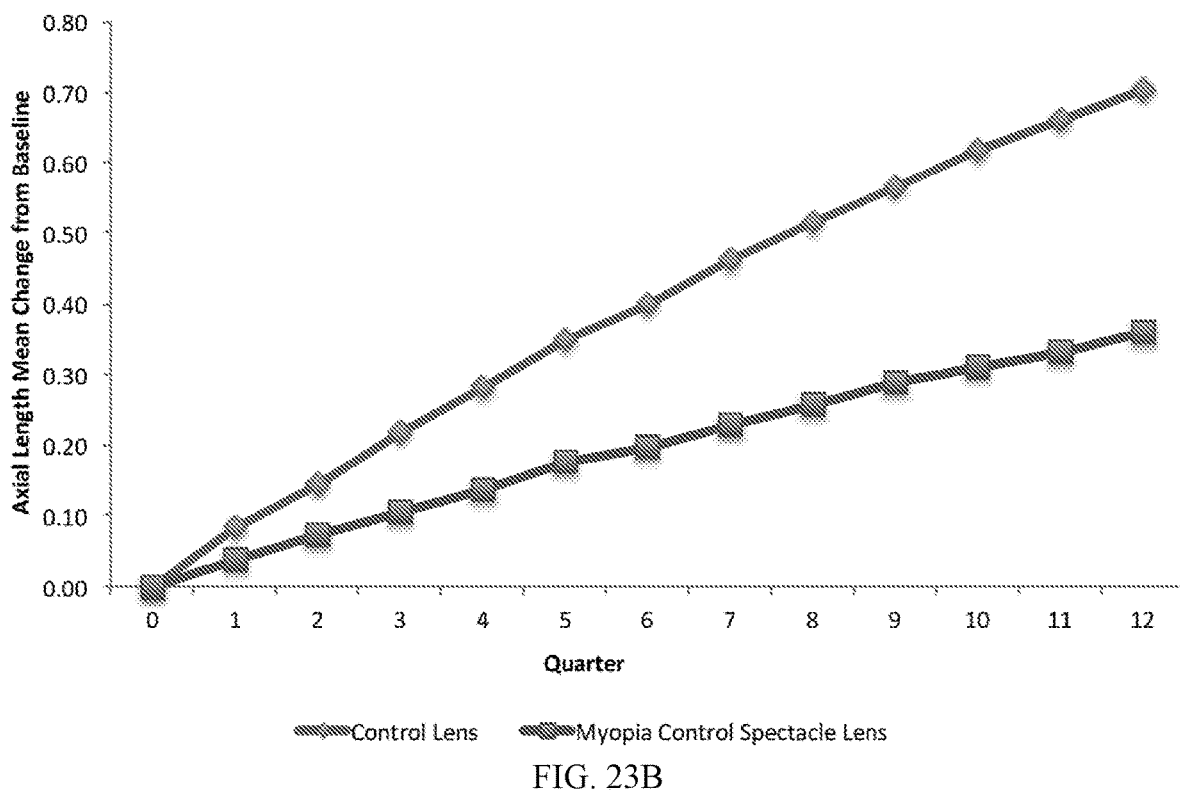

In some cases, treating a human in a COMET-like population (see, e.g., Gwiazda et al, 2003 Invest Ophthalmol Vis Sci 44:1492-500) having, or suspected of having, myopia as described herein, can be effective to reduce axial length growth by at least 30% (e.g., at least 40%, at least 50%, at least 60%, or more). For example, treating a human in a COMET-like population with at least one (e.g., one or two) myopia control spectacle lenses described herein can be effective to reduce axial length growth by about 30% as compared to a human treated with at least one (e.g., one or two) control lenses (see, e.g., FIG. 17B). For example, treating a human in a COMET-like population with at least one (e.g., one or two) myopia control spectacle lenses described herein can be effective to reduce axial length growth by about 40% as compared to a human treated with at least one (e.g., one or two) control lenses (see, e.g., FIG. 20B). For example, treating a human in a COMET-like population with at least one (e.g., one or two) myopia control spectacle lenses described herein can be effective to reduce axial length growth by about 50% as compared to a human treated with at least one (e.g., one or two) control lenses (see, e.g., FIG. 23B).

In some cases, treating a human having, or suspected of having, myopia as described herein (e.g., by having the human wear one or more (e.g., one or two) myopia control spectacle lenses) can be effective to increase a SER in at least one eye (e.g., one eye or both eyes) of that human and/or to reduce/eliminate a worsening in SER (e.g., reduce/eliminate a decrease in SER) in at least one eye (e.g., one eye or both eyes) of that human. SER can be evaluated using any appropriate methods and/or machines. Examples of methods and/or machines that can be used to evaluate SER error include, without limitation, auto-refractors (e.g., an open field autorefractor such as a Grand Seiko WR-5100K, Shin-Nippon, or equivalent). SER can be evaluated at any appropriate time. In some cases, SER can be measured when a human having, or suspected of having, myopia is in a cycloplegic state. SER can be evaluated by any appropriate human (e.g., an ophthalmic clinician or an observer such as a masked observer). In some cases, treating a human having, or suspected of having, myopia as described herein, can be effective to increase a SER (e.g., by about 0.25 D or 0.50 D) in at least one eye of that human, measured at 30 days or 6, 12, 18, 24, 30, or 36 months. For example, in cases where a human having, or suspected of having, myopia has, prior to a treatment described herein, SER of between about −0.75 D and about −4.50 D in each eye, wearing myopia control spectacle lenses as described herein can be effective to increase the SER (e.g., to between about −0.25 D and about −4.25 D) in at least one eye of that human. In some cases, treating a human having, or suspected of having, myopia as described herein, can be effective to reduce (e.g., slow) a change (e.g., a decrease) in SER error. For example, in cases where a human having, or suspected of having, myopia has, prior to a treatment described herein, a SER error of between about −0.75 D and about −4.50 D in each eye, wearing myopia control spectacle lenses as described herein can be effective to reduce a change in the SER compared to a control in at least one eye of that human, so that on average, patients wearing myopia control spectacle lenses may have reduced progression by greater than or equal to 0.3 D, 0.4 D, 0.46 D, 0.5 D, 0.56 D, 0.6 D, 0.7 D, 0.73 D, 0.75 D, or more. In some cases, treating a human having, or suspected of having, myopia as described herein, can be effective to maintain SER. For example, in cases where a human having, or suspected of having, myopia has, prior to a treatment described herein, SER between about −0.75 D and about −4.50 D in each eye, wearing myopia control spectacle lenses as described herein can be effective to eliminate a change in SER error (e.g., to maintain the SER error at between about −0.75 D and about −4.50 D) in at least one eye of that human. Changes in SER could be compared to a particular subject's baseline (i.e., starting measurement before treatment) or compared to a control group of patients.

Figure 9:
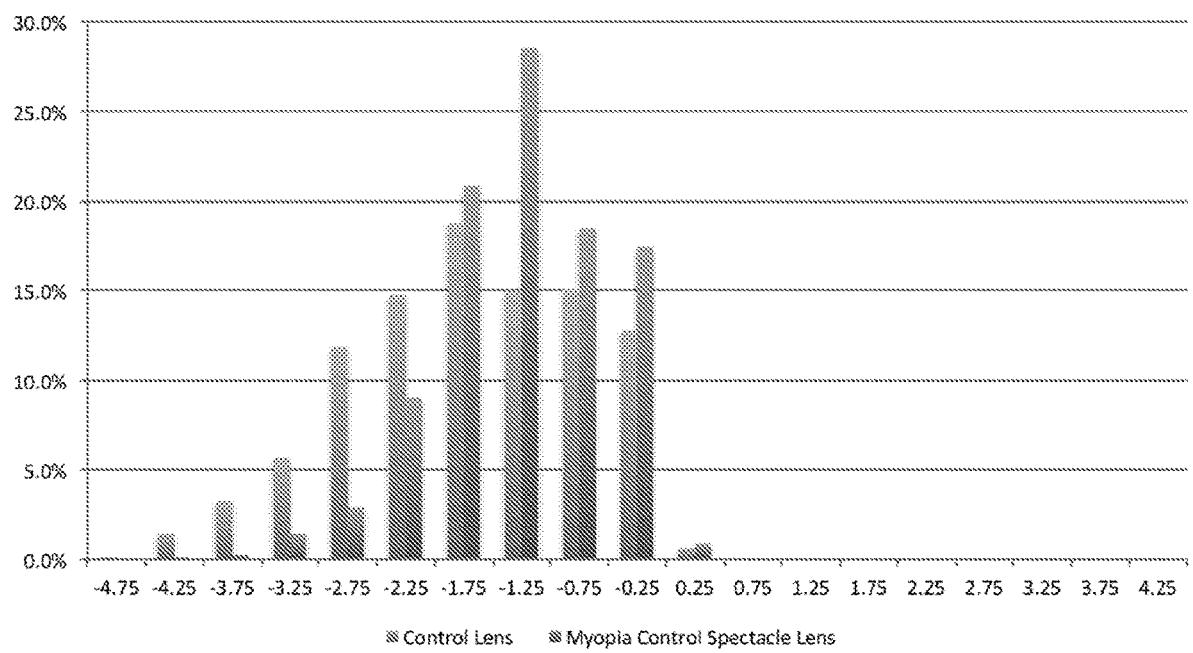
FIG. 9 contains a table and a plot showing a 30% reduction in SER distribution in patients in a fast progressor group treated with either a myopia control spectacle lens relative to patients treated with a control lens.
Figure 12:
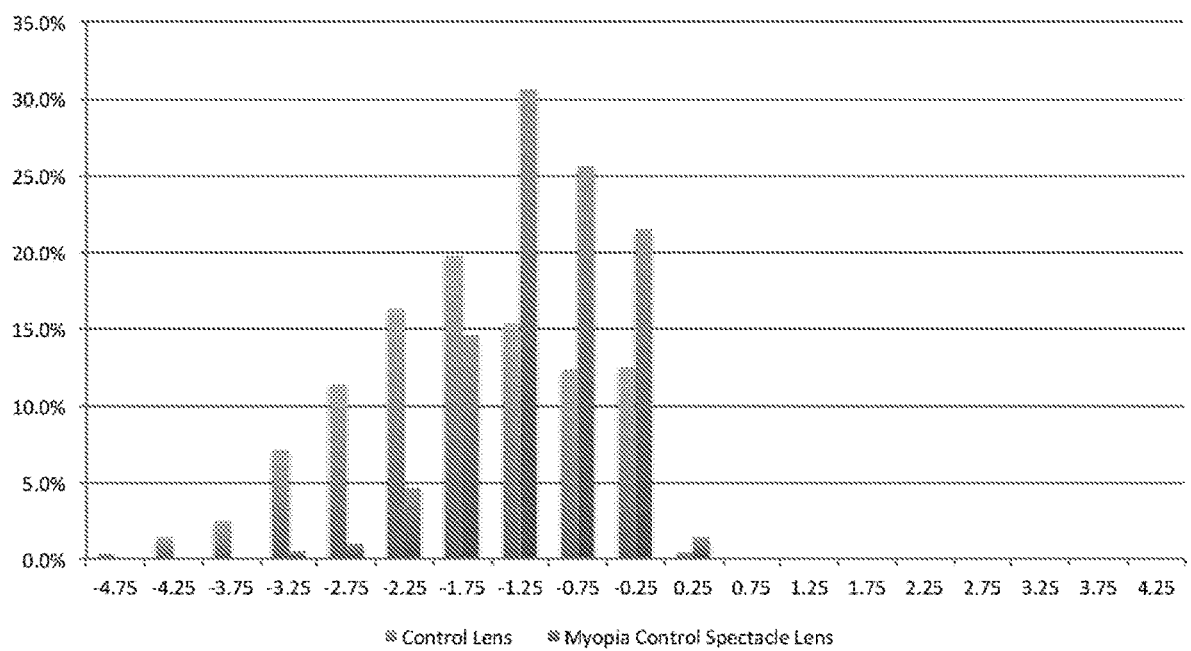
FIG. 12 contains a table and a plot showing a 40% reduction in SER distribution in patients in a fast progressor group treated with either a myopia control spectacle lens relative to patients treated with a control lens.
Figure 15:
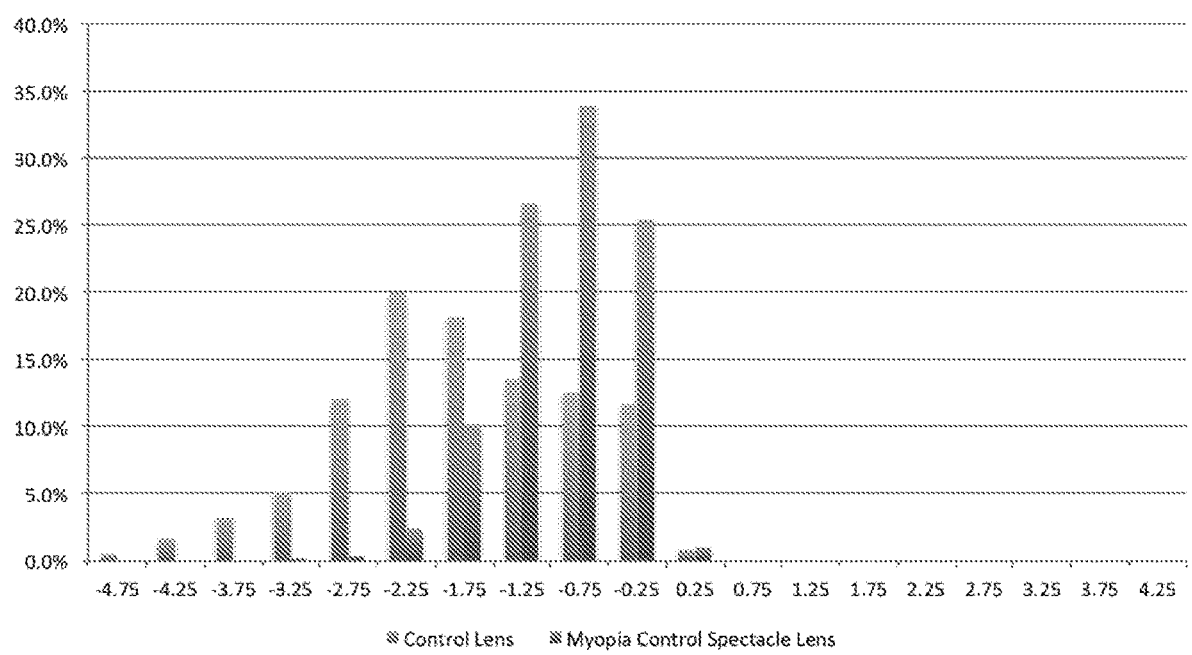
FIG. 15 contains a table and a plot showing a 50% reduction in SER distribution in patients in a fast progressor group treated with either a myopia control spectacle lens relative to patients treated with a control lens.

In some cases, treating a human in a fast progressor group having, or suspected of having, myopia as described herein, can be effective to reduce SER progression and/or SER distribution by at least 30% (e.g., at least 40%, at least 50%, at least 60%, or more). For example, treating a human in a fast progressor group with at least one (e.g., one or two) myopia control spectacle lenses described herein can be effective to reduce SER progression and/or SER distribution by about 30% as compared to a human treated with at least one (e.g., one or two) control lenses (see, e.g., FIG. 8A and FIG. 9). For example, treating a human in a fast progressor group with at least one (e.g., one or two) myopia control spectacle lenses described herein can be effective to reduce SER progression and/or SER distribution by about 40% as compared to a human treated with at least one (e.g., one or two) control lenses (see, e.g., FIG. 11A and FIG. 12). For example, treating a human in a fast progressor group with at least one (e.g., one or two) myopia control spectacle lenses described herein can be effective to reduce SER progression and/or SER distribution by about 50% as compared to a human treated with at least one (e.g., one or two) control lenses (see, e.g., FIG. 14A and FIG. 15).

Figure 18:
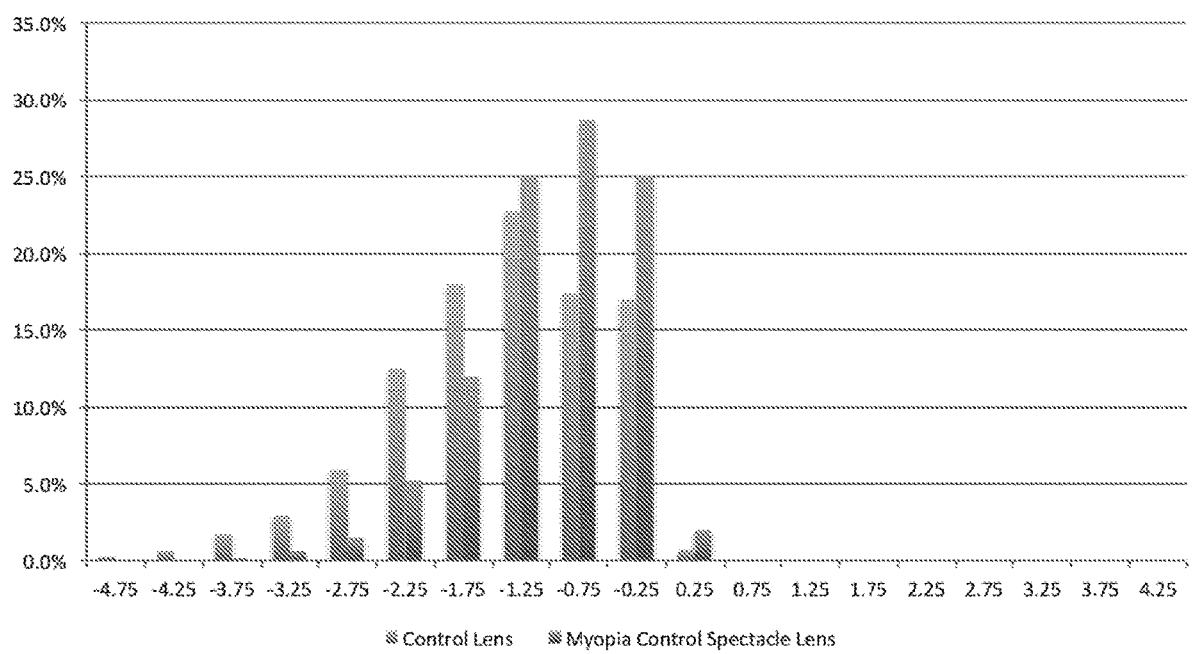
FIG. 18 contains a table and a plot showing a 30% reduction in SER distribution in patients in a COMET-like population treated with either a myopia control spectacle lens relative to patients treated with a control lens.
Figure 21:
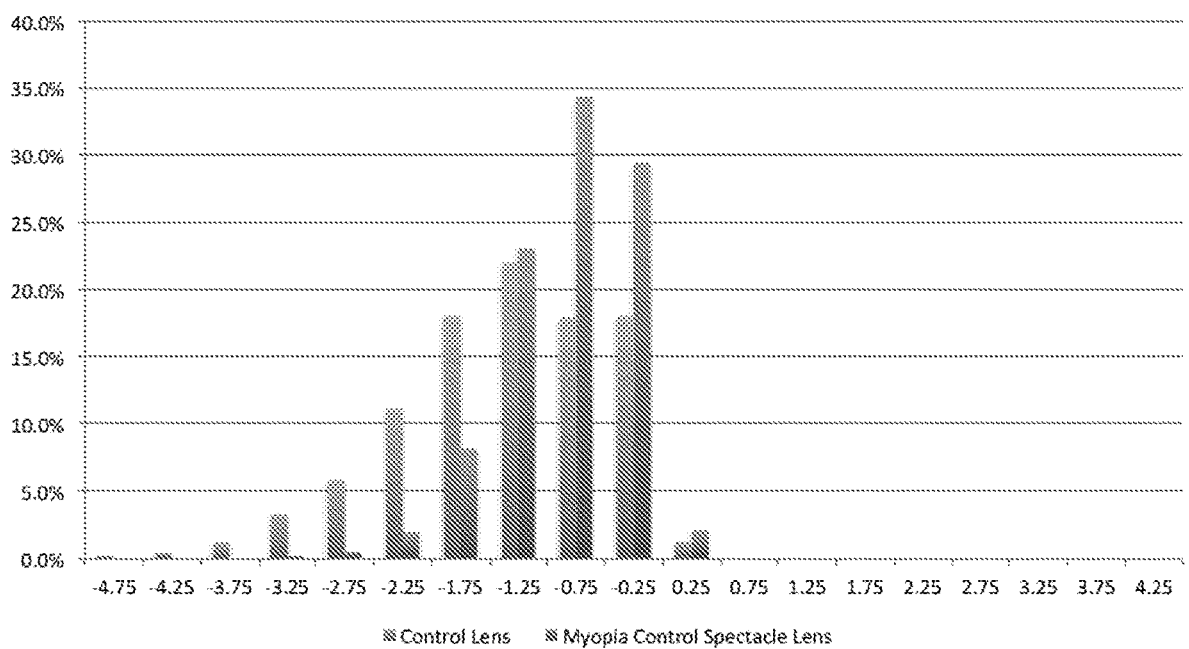
FIG. 21 contains a table and a plot showing a 40% reduction in SER distribution in patients in a COMET-like population treated with either a myopia control spectacle lens relative to patients treated with a control lens.
Figure 24:
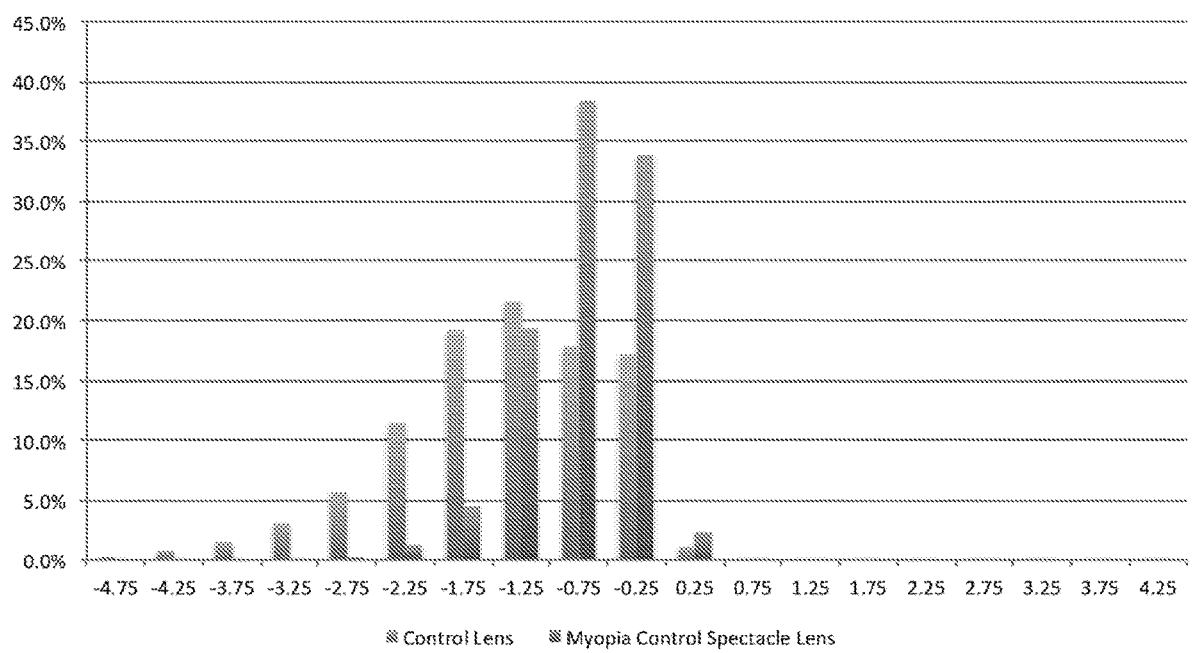
FIG. 24 contains a table and a plot showing a 50% reduction in SER distribution in patients in a COMET-like population treated with either a myopia control spectacle lens relative to patients treated with a control lens.

In some cases, treating a human in a COMET-like population (see, e.g., Gwiazda et al, 2003 Invest Ophthalmol Vis Sci 44:1492-500) having, or suspected of having, myopia as described herein, can be effective to reduce SER progression and/or SER distribution by at least 30% (e.g., at least 40%, at least 50%, at least 60%, or more). For example, treating a human in a COMET-like population with at least one (e.g., one or two) myopia control spectacle lenses described herein can be effective to reduce SER progression and/or SER distribution by about 30% as compared to a human treated with at least one (e.g., one or two) control lenses (see, e.g., FIG. 17A and FIG. 18). For example, treating a human in a COMET-like population with at least one (e.g., one or two) myopia control spectacle lenses described herein can be effective to reduce SER progression and/or SER distribution by about 40% as compared to a human treated with at least one (e.g., one or two) control lenses (see, e.g., FIG. 20A and FIG. 21). For example, treating a human in a COMET-like population with at least one (e.g., one or two) myopia control spectacle lenses described herein can be effective to reduce SER progression and/or SER distribution by about 50% as compared to a human treated with at least one (e.g., one or two) control lenses (see, e.g., FIG. 23A and FIG. 24).

In some cases, treating a human having, or suspected of having, myopia as described herein can be effective to reduce progression of the myopia by 40% to 75% in a treatment group compared to a control group whose SER progresses −0.6 D to −1 D after having the treatment group wear the one or more myopia control spectacle lenses for 12 months. The myopia control spectacle lenses can be peripheral diffusion lenses such as those shown in FIGS. 5A-5F, described above, or having other appropriate dot patterns. In some cases, the myopia control spectacle lenses can be myopic defocus lenses. SER change from baseline for the treatment group for percentage reductions from 40% to 75% are shown in the table in FIG. 25A for control group progression from −0.60 D to −1.00 D in −0.05 D increments.

As can be seen in the table, outcomes can vary from −0.15 D (75% reduction vs. control progression of −0.60 D) to −0.60 D (40% reduction vs. control progression of −1.00 D) after 12 months. Outcomes can vary from −0.15 D to −0.36

D, e.g., for −0.60 D control group progression. Outcomes can vary from −0.16 D to −0.39 D, e.g., for −0.65 D control group progression. Outcomes can vary from −0.18 D to −0.42 D, e.g., for −0.70 D control group progression. Outcomes can vary from −0.19 D to −0.45 D, e.g., for −0.75 D control group progression. Outcomes can vary from −0.20 D to −0.48 D, e.g., for −0.80 D control group progression. Outcomes can vary from −0.21 D to −0.51 D, e.g., for −0.85 D control group progression. Outcomes can vary from −0.23 D to −0.54 D, e.g., for −0.90 D control group progression. Outcomes can vary from −0.24 D to −0.57 D, e.g., for −0.95 D control group progression. Outcomes can vary from −0.25 D to −0.60 D, e.g., for −1.00 D control group progression.

The differences in SER between the treatment group and the control group for these reductions are shown in the table in FIG. 25B. As can be seen in this table, outcomes can vary from 0.24 D (40% reduction vs. control progression of −0.60 D) to 0.75 D (75% reduction vs. control progression of −1.00 D) after 12 months. Outcomes can vary from 0.24 D to 0.45 D, e.g., for −0.60 D control group progression. Outcomes can vary from 0.26 D to 0.49 D, e.g., for −0.65 D control group progression. Outcomes can vary from 0.28 D to 0.53 D, e.g., for −0.70 D control group progression. Outcomes can vary from 0.30 D to 0.56 D, e.g., for −0.75 D control group progression. Outcomes can vary from 0.32 D to 0.60 D, e.g., for −0.80 D control group progression. Outcomes can vary from 0.34 D to 0.64 D, e.g., for −0.85 D control group progression. Outcomes can vary from 0.36 D to 0.68 D, e.g., for −0.90 D control group progression. Outcomes can vary from 0.38 D to 0.71 D, e.g., for −0.95 D control group progression. Outcomes can vary from 0.40 D to 0.75 D, e.g., for −1.00 D control group progression.

In some cases, treating a human having, or suspected of having, myopia as described herein can be effective to reduce progression of the myopia by 40% to 75% in a treatment group compared to a control group whose SER progresses −1.15 D to −1.55 D after having the treatment group wear the one or more myopia control spectacle lenses for 24 months. The myopia control spectacle lenses can be peripheral diffusion lenses such as those shown in FIGS. 5A-5F, described above, or having other appropriate dot patterns. In some cases, the myopia control spectacle lenses can be myopic defocus lenses. SER change from baseline for the treatment group for percentage reductions from 40% to 75% are shown in the table in FIG. 26A for control group progression from −1.15 D to −1.55 D in −0.05 D increments.

As can be seen in the table, outcomes can vary from −0.29 D (75% reduction vs. control progression of −1.15 D) to −0.93 D (40% reduction vs. control progression of −1.55 D) after 24 months. Outcomes can vary from −0.29 D to −0.69 D, e.g., for −1.15 D control group progression. Outcomes can vary from −0.30 D to −0.72 D, e.g., for −1.20 D control group progression. Outcomes can vary from −0.31 D to −0.75 D, e.g., for −1.25 D control group progression. Outcomes can vary from −0.33 D to −0.78 D, e.g., for −1.30 D control group progression. Outcomes can vary from −0.34 D to −0.81 D, e.g., for −1.35 D control group progression. Outcomes can vary from −0.35 D to −0.84 D, e.g., for −1.40 D control group progression. Outcomes can vary from −0.35 D to −0.87 D, e.g., for −1.45 D control group progression. Outcomes can vary from −0.38 D to −0.90 D, e.g., for −1.50 D control group progression. Outcomes can vary from −0.39 D to −0.93 D, e.g., for −1.55 D control group progression.

The differences in SER between the treatment group and the control group for these reductions are shown in the table in FIG. 26B. As can be seen in this table, outcomes can vary from 0.46 D (40% reduction vs. control progression of −1.15 D) to 1.16 D (75% reduction vs. control progression of −1.55 D) after 24 months. Outcomes can vary from 0.46 D to 0.86 D, e.g., for −1.15 D control group progression. Outcomes can vary from 0.48 D to 0.90 D, e.g., for −1.20 D control group progression. Outcomes can vary from 0.50 D to 0.94 D, e.g., for −1.25 D control group progression. Outcomes can vary from 0.52 D to 0.98 D, e.g., for −1.30 D control group progression. Outcomes can vary from 0.54 D to 1.01 D, e.g., for −1.35 D control group progression. Outcomes can vary from 0.56 D to 1.05 D, e.g., for −1.40 D control group progression. Outcomes can vary from 0.58 D to 1.09 D, e.g., for −1.45 D control group progression. Outcomes can vary from 0.60 D to 1.13 D, e.g., for −1.50 D control group progression. Outcomes can vary from 0.62 D to 1.16 D, e.g., for −1.55 D control group progression.

In some cases, treating a human having, or suspected of having, myopia as described herein can be effective to reduce progression of the myopia by 40% to 75% in a treatment group compared to a control group whose SER progresses −1.70 D to −2.10 D after having the treatment group wear the one or more myopia control spectacle lenses for 36 months. The myopia control spectacle lenses can be peripheral diffusion lenses such as those shown in FIGS. 5A-5F, described above, or having other appropriate dot patterns. In some cases, the myopia control spectacle lenses can be myopic defocus lenses. SER change from baseline for the treatment group for percentage reductions from 40% to 75% are shown in the table in FIG. 27A for control group progression from −1.70 D to −2.10 D in −0.05 D increments.

As can be seen in the table, outcomes can vary from −0.42 D (75% reduction vs. control progression of −1.70 D) to −1.26 D (40% reduction vs. control progression of −2.10 D) after 36 months. Outcomes can vary from −0.42 D to −1.02 D, e.g., for −1.70 D control group progression. Outcomes can vary from −0.44 D to −1.05 D, e.g., for −1.75 D control group progression. Outcomes can vary from −0.45 D to −1.08 D, e.g., for −1.80 D control group progression. Outcomes can vary from −0.46 D to −1.11 D, e.g., for −1.85 D control group progression. Outcomes can vary from −0.47 D to −1.14 D, e.g., for −1.90 D control group progression. Outcomes can vary from −0.49 D to −1.17 D, e.g., for −1.95 D control group progression. Outcomes can vary from −0.50 D to −1.20 D, e.g., for −2.00 D control group progression. Outcomes can vary from −0.51 D to −1.23 D, e.g., for −2.05 D control group progression. Outcomes can vary from −0.52 D to −1.26 D, e.g., for −2.10 D control group progression.

The differences in SER between the treatment group and the control group for these reductions are shown in the table in FIG. 27B. As can be seen in the table, outcomes can vary from 0.68 D (40% reduction vs. control progression of −1.70 D) to 1.58 D (75% reduction vs. control progression of −2.10 D) after 36 months. Outcomes can vary from 0.68 D to 1.28 D, e.g., for −1.70 D control group progression. Outcomes can vary from 0.70 D to 1.31 D, e.g., for −1.75 D control group progression. Outcomes can vary from 0.72 D to 1.35 D, e.g., for −1.80 D control group progression. Outcomes can vary from 0.74 D to 1.39 D, e.g., for −1.85 D control group progression. Outcomes can vary from 0.76 D to 1.43 D, e.g., for −1.90 D control group progression. Outcomes can vary from 0.78 D to 1.46 D, e.g., for −1.95 D control group progression. Outcomes can vary from 0.80 D to 1.50 D, e.g., for −2.00 D control group progression. Outcomes can vary from 0.82 D to 1.54 D, e.g., for −2.05 D control group progression. Outcomes can vary from 0.84 D to 1.58 D, e.g., for −2.10 D control group progression.

In some cases, treating a human having, or suspected of having, myopia as described herein can be effective to reduce progression of the myopia by 40% to 75% in a treatment group compared to a control group whose axial length increases 0.250 mm to 0.500 mm after having the treatment group wear the one or more myopia control spectacle lenses for 12 months. The myopia control spectacle lenses can be peripheral diffusion lenses such as those shown in FIGS. 5A-5F, described above, or having other appropriate dot patterns. In some cases, the myopia control spectacle lenses can be myopic defocus lenses. Axial length change from baseline for the treatment group for percentage reductions from 40% to 75% are shown in the table in FIG. 28A for control group progression from 0.250 mm to 0.500 mm in 0.025 mm increments.

As can be seen in the table, outcomes can vary from 0.06 mm (75% reduction vs. control progression of 0.250 mm) to 0.30 mm (40% reduction vs. control progression of 0.500 mm) after 12 months. Outcomes can vary from 0.06 mm to 0.15 mm, e.g., for 0.250 mm control group progression. Outcomes can vary from 0.07 mm to 0.17 mm, e.g., for 0.275 mm control group progression. Outcomes can vary from 0.07 mm to 0.18 mm, e.g., for 0.300 mm control group progression. Outcomes can vary from 0.08 mm to 0.20 mm, e.g., for 0.325 mm control group progression. Outcomes can vary from 0.09 mm to 0.21 mm, e.g., for 0.350 mm control group progression. Outcomes can vary from 0.09 mm to 0.23 mm, e.g., for 0.375 mm control group progression. Outcomes can vary from 0.10 mm to 0.24 mm, e.g., for 0.400 mm control group progression. Outcomes can vary from 0.11 mm to 0.26 mm, e.g., for 0.425 mm control group progression. Outcomes can vary from 0.11 mm to 0.27 mm, e.g., for 0.450 mm control group progression. Outcomes can vary from 0.12 mm to 0.29 mm, e.g., for 0.475 mm control group progression. Outcomes can vary from 0.13 mm to 0.30 mm, e.g., for 0.500 mm control group progression.

The differences in axial length change between the treatment group and the control group for these reductions are shown in the table in FIG. 28B. As can be seen in this table, outcomes can vary from −0.10 mm (40% reduction vs. control progression of 0.250 mm) to −0.38 mm (75% reduction vs. control progression of 0.500 mm) after 12 months. Outcomes can vary from −0.10 mm to −0.19 mm, e.g., for 0.250 mm control group progression. Outcomes can vary from −0.11 mm to −0.21 mm, e.g., for 0.275 mm control group progression. Outcomes can vary from −0.12 mm to −0.23 mm, e.g., for 0.300 mm control group progression. Outcomes can vary from −0.13 mm to −0.24 mm, e.g., for 0.325 mm control group progression. Outcomes can vary from −0.14 mm to −0.26 mm, e.g., for 0.350 mm control group progression. Outcomes can vary from −0.15 mm to −0.28 mm, e.g., for 0.375 mm control group progression. Outcomes can vary from −0.16 mm to −0.30 mm, e.g., for 0.400 mm control group progression. Outcomes can vary from −0.17 mm to −0.32 mm, e.g., for 0.425 mm control group progression. Outcomes can vary from −0.18 mm to −0.34 mm, e.g., for 0.450 mm control group progression. Outcomes can vary from −0.19 mm to −0.36 mm, e.g., for 0.475 mm control group progression. Outcomes can vary from −0.20 mm to −0.38 mm, e.g., for 0.500 mm control group progression.

In some cases, treating a human having, or suspected of having, myopia as described herein can be effective to reduce progression of the myopia by 40% to 75% in a treatment group compared to a control group whose axial length increases 0.500 mm to 0.750 mm after having the treatment group wear the one or more myopia control spectacle lenses for 24 months. The myopia control spectacle lenses can be peripheral diffusion lenses such as those shown in FIGS. 5A-5F, described above, or having other appropriate dot patterns. In some cases, the myopia control spectacle lenses can be myopic defocus lenses. Axial length change from baseline for the treatment group for percentage reductions from 40% to 75% are shown in the table in FIG. 29A for control group progression from 0.500 mm to 0.750 mm in 0.025 mm increments.

As can be seen in the table, outcomes can vary from 0.13 mm (75% reduction vs. control progression of 0.500 mm) to 0.45 mm (40% reduction vs. control progression of 0.750 mm) after 24 months. Outcomes can vary from 0.13 mm to 0.30 mm, e.g., for 0.500 mm control group progression. Outcomes can vary from 0.13 mm to 0.32 mm, e.g., for 0.525 mm control group progression. Outcomes can vary from 0.14 mm to 0.33 mm, e.g., for 0.550 mm control group progression. Outcomes can vary from 0.14 mm to 0.35 mm, e.g., for 0.575 mm control group progression. Outcomes can vary from 0.15 mm to 0.21 mm, e.g., for 0.600 mm control group progression. Outcomes can vary from 0.16 mm to 0.38 mm, e.g., for 0.625 mm control group progression. Outcomes can vary from 0.16 mm to 0.39 mm, e.g., for 0.650 mm control group progression. Outcomes can vary from 0.17 mm to 0.41 mm, e.g., for 0.675 mm control group progression. Outcomes can vary from 0.18 mm to 0.42 mm, e.g., for 0.700 mm control group progression. Outcomes can vary from 0.18 mm to 0.44 mm, e.g., for 0.725 mm control group progression. Outcomes can vary from 0.19 mm to 0.45 mm, e.g., for 0.750 mm control group progression.

The differences in axial length change between the treatment group and the control group for these reductions are shown in the table in FIG. 29B. As can be seen in this table, outcomes can vary from −0.20 mm (40% reduction vs. control progression of 0.500 mm) to −0.56 mm (40% reduction vs. control progression of 0.750 mm) after 24 months. Outcomes can vary from −0.20 mm to −0.38 mm, e.g., for 0.500 mm control group progression. Outcomes can vary from −0.21 mm to −0.39 mm, e.g., for 0.525 mm control group progression. Outcomes can vary from −0.22 mm to −0.41 mm, e.g., for 0.550 mm control group progression. Outcomes can vary from −0.23 mm to −0.43 mm, e.g., for 0.575 mm control group progression. Outcomes can vary from −0.24 mm to −0.45 mm, e.g., for 0.600 mm control group progression. Outcomes can vary from −0.25 mm to −0.47 mm, e.g., for 0.625 mm control group progression. Outcomes can vary from −0.26 mm to −0.49 mm, e.g., for 0.650 mm control group progression. Outcomes can vary from −0.27 mm to −0.51 mm, e.g., for 0.675 mm control group progression. Outcomes can vary from −0.28 mm to −0.53 mm, e.g., for 0.700 mm control group progression. Outcomes can vary from −0.29 mm to −0.54 mm, e.g., for 0.725 mm control group progression. Outcomes can vary from −0.30 mm to −0.56 mm, e.g., for 0.750 mm control group progression.

In some cases, treating a human having, or suspected of having, myopia as described herein can be effective to reduce progression of the myopia by 40% to 75% in a treatment group compared to a control group whose axial length increases 0.800 mm to 1.050 mm after having the treatment group wear the one or more myopia control spectacle lenses for 36 months. The myopia control spectacle lenses can be peripheral diffusion lenses such as those shown in FIGS. 5A-5F, described above, or having other appropriate dot patterns. In some cases, the myopia control spectacle lenses can be myopic defocus lenses. Axial length change from baseline for the treatment group for percentage reductions from 40% to 75% are shown in the table in FIG.

30A for control group progression from 0.800 mm to 1.050 mm in 0.025 mm increments.

As can be seen in the table, outcomes can vary from 0.20 mm (75% reduction vs. control progression of 0.800 mm) to 0.63 mm (40% reduction vs. control progression of 1.050 mm) after 36 months. Outcomes can vary from 0.20 mm to 0.48 mm, e.g., e.g., for 0.800 mm control group progression. Outcomes can vary from 0.21 mm to 0.50 mm, e.g., e.g., for 0.825 mm control group progression. Outcomes can vary from 0.21 mm to 0.51 mm, e.g., e.g., for 0.850 mm control group progression. Outcomes can vary from 0.22 mm to 0.53 mm, e.g., e.g., for 0.875 mm control group progression. Outcomes can vary from 0.23 mm to 0.54 mm, e.g., e.g., for 0.900 mm control group progression. Outcomes can vary from 0.23 mm to 0.56 mm, e.g., e.g., for 0.925 mm control group progression. Outcomes can vary from 0.24 mm to 0.57 mm, e.g., e.g., for 0.950 mm control group progression. Outcomes can vary from 0.24 mm to 0.59 mm, e.g., e.g., for 0.975 mm control group progression. Outcomes can vary from 0.25 mm to 0.60 mm, e.g., e.g., for 1.000 mm control group progression. Outcomes can vary from 0.26 mm to 0.62 mm, e.g., e.g., for 1.025 mm control group progression. Outcomes can vary from 0.26 mm to 0.63 mm, e.g., e.g., for 1.050 mm control group progression.

The differences in axial length change between the treatment group and the control group for these reductions are shown in the table in FIG. 30B. As can be seen in this table, outcomes can vary from −0.32 mm (40% reduction vs. control progression of 0.800 mm) to −0.79 mm (75% reduction vs. control progression of 1.050 mm) after 36 months. Outcomes can vary from −0.32 mm to −0.60 mm, e.g., e.g., for 0.800 mm control group progression. Outcomes can vary from −0.33 mm to −0.62 mm, e.g., e.g., for 0.825 mm control group progression. Outcomes can vary from −0.34 mm to −0.64 mm, e.g., e.g., for 0.850 mm control group progression. Outcomes can vary from −0.35 mm-0.66 mm, e.g., e.g., for 0.875 mm control group progression. Outcomes can vary from −0.36 mm to −0.68 mm, e.g., e.g., for 0.900 mm control group progression. Outcomes can vary from −0.37 mm to −0.69 mm, e.g., e.g., for 0.925 mm control group progression. Outcomes can vary from −0.38 mm to −0.71 mm, e.g., e.g., for 0.950 mm control group progression. Outcomes can vary from −0.39 mm to −0.73 mm, e.g., e.g., for 0.975 mm control group progression. Outcomes can vary from −0.40 mm to −0.75 mm, e.g., e.g., for 1.000 mm control group progression. Outcomes can vary from −0.41 mm to −0.77 mm, e.g., e.g., for 1.025 mm control group progression. Outcomes can vary from −0.42 mm to −0.79 mm, e.g., e.g., for 1.050 mm control group progression.

In certain cases, the degree to which the treatment described above is effective to reduce progression of myopia can depend on the average amount of time each day the human wears one or more (e.g., one or two) myopia control spectacle lenses during the treatment period. For example, the percentage by which the human's myopic progression is reduced can increase (e.g., in proportion to) the average amount of time each day they wear the myopia control spectacle lenses. In some implementations, wearing the myopia control spectacle lenses for at least 6 hours (e.g., at least 7, at least 8, at least 9, at least 10, at least 11, at least 12, at least 13, at least 14, at least 15, at least 16, at least 17, or at least 18 hours) a day on average can yield a greater reduction in myopia progression compared to wearing the myopia control spectacle lenses for 1 hour or more (e.g., 2 hours or more, 3 hours or more, 4 hours or more, 5 hours or more) less each day on average.

In some cases, the degree to which the treatment described above is effective to reduce progression of myopia does not vary depending on the average amount of time each day the human wears one or more (e.g., one or two) myopia control spectacle lenses during the treatment period. For example, the percentage by which the human's myopic progression is reduced can be substantially the same irrespective of the average amount of time each day they wear the myopia control spectacle lenses. For instance wearing the spectacle lenses 6 hours a day on average can yield substantially the same reduction in myopia progression as 7 hours a day or more (e.g., 8 hours a day or more, 9 hours a day or more, 10 hours a day or more, 11 hours a day or more, 12 hours a day or more, 13 hours a day or more, 14 hours a day or more 15 hours a day or more).

Additional Embodiments

While the foregoing methods of treatment involve use of myopia control lenses, other devices are also possible. For example, in some cases, a region (e.g., a peripheral region or a central region) of a lens can include one or more microlenses such that the optical power of the lens varies from each microlens and the regions of the lens between the microlenses. For example, a region (e.g., a peripheral region or a central region) of a myopia control lens can include microlenses that are spaced apart from each other. In some embodiments, lenses can have annular regions of increased or decreased optical power relative to the clear aperture of the lens.

In some cases, the methods and devices described herein can also be applied to any appropriate type of ophthalmic lens. Examples of ophthalmic lens which can contain a myopia control lens described herein include, without limitation, monocles, contact lenses, and intraocular lens implants.

In some cases, when treating a human having, or suspected of having, myopia as described herein (e.g., by having the human wear one or more (e.g., one or two) myopia control spectacle lenses), the treatment also can include one or more additional myopia treatments. Examples of myopia treatments include, without limitation, medications (e.g., anti-muscarinic topical medications such as pirenzepine gel, cyclopentolate eye drops, and atropine eye drops or gel), surgery (e.g., scleral reinforcement surgery and refractive surgeries such as photorefractive keratectomy (PRK), LASIK, and phakic intra-ocular lens implantation), therapy (e.g., eye exercises and relaxation techniques), orthokeratology lenses, or defocus lenses such as spectacle or contact lenses.

In some cases, the methods and devices described herein can also be applied to any appropriate model system. A model system can include any appropriate mammal having, or suspected of having, myopia. Examples of mammals that can be used in a model system utilizing the methods and devices described herein include, without limitation, non-human primates (such as monkeys) or chicks.

In some cases, the methods and devices herein can also be applied where they can control myopia without impacting the subject's normal, corrected vision. For example, without impacting the subject's peripheral vision, peripheral visual acuity, visual field, or peripheral contrast. In other cases, the peripheral vision, peripheral visual acuity, visual field, or peripheral contrast could be impacted by less than 5%, less than 10%, less than 15%, less than 20%, or less than 25%, compared to baseline or compared to a control group.

The invention will be further described in the following examples, which do not limit the scope of the invention described in the claims.

EXAMPLES

Example 1: Control of Myopia Using Peripheral Diffusion Lenses: Efficacy and Safety Study (CYPRESS)

Study Design

Randomized, controlled, multisite, subject- and observer-masked, 3-arm parallel group clinical trial.
- 3-arm study made up of 2 test groups (2 different investigational spectacle lens patterns) and 1 control group.
- Subjects are masked to the treatment arm and masked observers are utilized for axial length and cycloplegic auto-refraction measurements.
- Visits at screening, baseline, day 30, months 6, 12, 18, 24, 30, and 36.

Number of Sites

Approximately 12-14 sites are utilized for this study. One site is located in Canada and all other sites are in the United States.

Competitive enrollment is utilized, but no single site enrolls more than 20% of the total number of study subjects.

Primary Objective

To compare axial length change from baseline after 36 months' use of DOT and control spectacles and ensure that cycloplegic autorefraction is trending in the beneficial direction.

Secondary Objectives
- To compare spherical equivalent refraction (SER) mean change over time.
- To compare the proportion of subjects whose myopic progression based on SER change from baseline as measured by cycloplegic auto-refraction is more than 1.25 D at 36 months.
- To compare axial length change from baseline after 12 and 24 months.

Number of Subjects

Approximately 255 subjects (1:1:1 randomization with approximately 85 subjects per arm).

Study Population

Children between the ages of 6 and 10 years old (inclusive) with myopia. This population was selected as the incidence of juvenile myopia begins around 5 or 6 years of age and typically progresses until the mid-teens. As age of myopia onset is an important determinate in an individual's final (adult) refractive state, the younger a child develops myopia, the more likely that they will develop a higher level of myopia as an adult and are thus at a higher risk of developing a sight-threatening condition. Therefore, intervening early to reduce the overall progression of myopia is thus important.

Subject Selection Criteria

Inclusion Criteria:
- Children 6-10 years of age (inclusive) at time of informed consent/assent;
- Spherical equivalent refractive error between −0.75 and −4.50 D inclusive (by manifest refraction) in each eye;
- Best corrected visual acuity by manifest refraction of +0.10 logMAR (20/25 Snellen equivalent) or better in each eye;
- The difference in spherical equivalent power between the two eyes (based on manifest refraction) must be less than or equal to 1.50 D;
- Agree to wear the assigned spectacles constantly except for sleeping, swimming, or other activities in which spectacle wear would be dangerous or otherwise not possible (minimum of 10 hours per day);
- Ability to comply with study procedures, including high and low contrast visual acuity, axial length, and cycloplegic auto-refraction measurements taken for both eyes at the baseline visit;
- The subject's parent(s) or legal guardian(s) must read, understand and sign the Statement of Informed Consent and receive a fully executed copy of the form.

Exclusion Criteria:
- Subject had previously or currently wears contact lenses (greater than 1-month usage);
- Current or prior use of bifocals, progressive addition spectacle lenses;
- Current or prior use of myopia control treatment (e.g., atropine, multifocal contact lenses, etc.);
- Astigmatism worse than −1.25 DC (by manifest refraction) in either eye;
- Amblyopia in either eye;
- Strabismus by cover test at far (4 m) or near (40 cm) wearing distance correction;
- Any ocular or systemic conditions that could influence refractive development or status [e.g., keratoconus, congenital glaucoma, ocular trauma, diabetes, Marfan syndrome or other connective tissue disorder, Down's syndrome, family history of poor night vision (to prevent against enrolling subjects with congenital stationary night blindness)];
- History of photosensitive epilepsy;
- Known allergy to proparacaine, tetracaine, or tropicamide;
- Participation in any investigational clinical study within 30 days of the Baseline visit;
- Subject's sibling or other household member is already enrolled in this trial.

Baseline Summary

Baseline Demographics by Age and SER

|  | Group A (n, %) | | Group B (n, %) | | Group C (n, %) | | Pooled (n, %) | |
|---|---|---|---|---|---|---|---|---|
| 6 years old | 8 | 10% | 10 | 11% | 10 | 11% | 28 | 11% |
| 7 years old | 15 | 19% | 18 | 19% | 20 | 22% | 53 | 20% |
| 8 years old | 18 | 23% | 25 | 26% | 23 | 26% | 66 | 25% |
| 9 years old | 29 | 36% | 31 | 33% | 28 | 31% | 88 | 33% |
| 10 years old | 10 | 13% | 11 | 12% | 9 | 10% | 30 | 11% |
| Total | 80 | 100% | 95 | 100% | 90 | 100% | 265 | 100% |
| Lower SER | 58 | 73% | 63 | 66% | 61 | 68% | 182 | 69% |
| Higher SER | 22 | 28% | 32 | 34% | 29 | 32% | 83 | 31% |

Baseline Demographics by Race and Ethnicity

|  | Group A (n, %) | | Group B (n, %) | | Group C (n, %) | | Pooled (n, %) | |
|---|---|---|---|---|---|---|---|---|
| White | 53 | 66% | 67 | 71% | 65 | 72% | 185 | 70% |
| Black or African American | 12 | 15% | 15 | 16% | 16 | 18% | 43 | 16% |
| Other Asian | 1 | 1% | 3 | 3% | 2 | 2% | 6 | 2% |
| Asian Indian | 5 | 6% | 1 | 1% | 1 | 1% | 7 | 3% |
| Asian Indian or Alaska Native, White | 1 | 1% | 1 | 1% | 0 | 0% | 2 | 1% |
| Black or African American, White | 2 | 3% | 1 | 1% | 1 | 1% | 4 | 2% |
| Chinese | 1 | 1% | 1 | 1% | 2 | 2% | 4 | 2% |
| Chinese, White | 1 | 1% | 2 | 2% | 0 | 0% | 3 | 1% |
| American Indian or Alaska Native | 0 | 0% | 1 | 1% | 1 | 1% | 2 | 1% |

-continued

|  | Group A (n, %) | | Group B (n, %) | | Group C (n, %) | | Pooled (n, %) | |
| --- | --- | --- | --- | --- | --- | --- | --- | --- |
| American Indian or Alaska Native, Black or African American | 0 | 0% | 0 | 0% | 1 | 1% | 1 | 0% |
| Asian Indian, Black or African American | 0 | 0% | 1 | 1% | 0 | 0% | 1 | 0% |
| Filipino | 2 | 3% | 1 | 1% | 0 | 0% | 3 | 1% |
| Japanese, White | 1 | 1% | 1 | 1% | 0 | 0% | 2 | 1% |
| Native Hawaiian or Other Pacific Islander | 0 | 0% | 0 | 0% | 1 | 1% | 1 | 0% |
| Other Asian, White | 1 | 1% | 0 | 0% | 0 | 0% | 1 | 0% |
| Hispanic or Latino | 12 | 15% | 17 | 18% | 20 | 22% | 49 | 18% |
| Not Hispanic or Latino | 68 | 85% | 78 | 82% | 70 | 78% | 216 | 82% |

Demographics Comparison

|  | CYPRESS (All Randomized) | US Population (2010 census) | COMET (Hyman 2005) | BLINK (Walline 2017) |
| --- | --- | --- | --- | --- |
| White | 69.8% | 72.4% | 46.5% | 68.0% |
| Black or African American | 16.2% | 12.6% | 26.2% | 10.2% |
| Asian | 7.5% | 4.8% | 7.7% | 8.5% |
| Native Hawaiian or Other Pacific Islander | 0.01% | 0.2% | NR | 0.3% |
| Mixed | 5.3% | 2.9% | 5.1% | 10.2% |
| Other | 0.01% | 6.2% | NR | 2.7% |
| Hispanic | See below | See below | 14.5% | See below |
| Hispanic of any race | 18.5% | 16.3% | See above | 26.3% |

259 total subjects for whom baseline axial length and cycloplegic autorefraction were measured and who were not discontinued due to an inclusion/exclusion criteria violation.

Average age of subjects at screening was 8.141 years with standard deviation of 1.172 years (integer age).

Average age of subjects at screening was 8.659 years with standard deviation of 1.190 years (decimal age).

Average axial length of subjects for both eyes was 24.025 mm with a standard deviation of 0.772 mm. Axial length of subjects ranged from 22.025 mm to 26.25 mm. Between eyes square of correlation coefficient was 0.950.

Average manifest refraction was −2.017 D with a standard deviation of 0.890 D. Manifest refraction ranged from −4.375 D to −0.75 D.

Investigational Devices

Test Arm 1:

Single vision spectacle lenses with SightGlass Vision DOT Pattern 1 (dot spacing of 0.365 mm) and a clear (i.e., dot-free) aperture. No chromatic tint is added.

Test Arm 2:

Single vision, impact-resistant spectacle lenses with SightGlass Vision DOT Pattern 2 (dot spacing of 0.24 mm) with a clear (i.e., dot-free) aperture. No chromatic tint is added.

The spherical power, cylindrical power and axis is determined by manifest refraction at baseline and 6-month intervals. Spectacle prescription is updated if ≥0.50 D manifest SER change is found in either eye or deemed necessary to improve vision.

Control Device

Single vision, impact-resistant spectacle lenses with a slight green tint to aid subject masking.

The spherical power, cylindrical power and axis is determined by manifest refraction at baseline and 6-month intervals. Spectacle prescription is updated if ≥0.50 D manifest SER change is found in either eye or deemed necessary to improve vision.

Duration of Subject Participation and Duration of Study

Subjects are on the study for 36 months. The total duration of the trial is about 42 months, which includes a 6-month allotment for subject enrollment.

Concomitant Therapy

Periodic usage of impact-resistant spectacle frames containing single-vision lenses (i.e., sports goggles) is allowed for all study subjects provided that these spectacles are only worn for activities in which the study spectacles would be unsafe and that the assigned study spectacles are still worn for at least 10 hours per day.

Contact lens usage during the study is prohibited as is the use of any other myopia control treatments such as atropine.

Efficacy Evaluations

| Evaluation | Instrument | Rationale |
| --- | --- | --- |
| Axial length (in millimeters) | Lenstar 900 (Haag-Streit, Koeniz, Switzerland) | Co-primary and secondary efficacy endpoints |
| Cycloplegic auto-refraction (in diopters of spherical equivalent refraction) | WR-5100K Binocular Auto Refractometer (Grand Seiko Co, Ltd., Hiroshima, Japan) or equivalent [e.g., Grand Seiko WAM-5500, NVision-K 5001 (Shin-Nippon by Rexxam Co., Ltd., Osaka, Japan)] | Co-primary and secondary efficacy endpoints |
| Stereopsis (in seconds of arc) | Random Dot 3 LEA SYMBOLS ® Stereoacuity Test | Assessment of amblyopia for exclusion criteria |
| Monocular and binocular high contrast distance visual acuity under normal room illumination | Precision Vision 100% contrast Sloan (ETDRS style) chart measured at 4 meters in logMAR VA or equivalent logMAR high contrast distance chart | Safety endpoint |
| Monocular low contrast distance visual acuity under normal room illumination | Precision Vision 10% contrast Sloan (ETDRS style) chart measured at 4 meters in logMAR VA or equivalent logMAR 10% contrast distance chart | Safety endpoint |
| Peripheral visual field | 24-2 Swedish Interactive Thresholding Algorithm (SITA) full-threshold Humphrey visual field | Safety endpoint |

| Evaluation | Instrument | Rationale |
|---|---|---|
| | (Carl Zeiss Meditec Inc., Dublin, CA) with standard ophthalmic trial lenses or equivalent | |
| Genetic analysis (highly encouraged, but not mandatory) | Oragene saliva DNA collection kit (DNA Genotek Inc., Ottawa, ON, Canada) | Exploratory endpoint |
| Monocular scotopic, low mesopic, and high mesopic pupil size (in millimeters) | NeurOptics VIP-300 (NeurOptics Inc., Irvine, CA) | To explore potential influence of pupil size on myopia development |
| Binocular color vision (in number of plates correctly identified) | HRR Pseudoisochromatic Plates 4th Edition | To explore potential influence of color vision disorders on myopia development (see, e.g., Qian et al, 2009 Invest Ophthalmol Vis Sci. 50(4): 1598-605) |
| Slit-lamp examination | Biomicroscope | Standard of care |
| Dilated fundus examination | Binocular indirect ophthalmoscope with or without biomicroscope | Standard of care |
| Medical and ocular history including number of biological myopic parents (unknown, 0, 1, at least 1, or 2) | In-office electronic data capture | Standard of care and to explore potential influence of number of myopic parents on myopia development |
| Parent questionnaire | In-office electronic data capture | To record compliance, explore subject issues with glare and halos, and probe for other complaints. |
| Parent diary | At-home electronic data capture | To record compliance and vision problems, explore potential influence on myopia development, and keep up study engagement. |
| Subject questionnaire | In-office electronic data capture | To monitor visual and social impact of study spectacles, explore issues with glare and halos, and explore potential impact on myopia development. |

Co-Primary Endpoint
  For each test arm vs. control:
  Axial length change from baseline at 36 months.
  Spherical equivalent refraction (SER) change from baseline at 36 months, as measured by cycloplegic auto-refraction, trends in the positive benefit direction.
Secondary Endpoints
  For each test arm vs. control:
  SER change from baseline at 36 months, as measured by cycloplegic auto-refraction;
  Axial length change from baseline at 24 months;
  Axial length change from baseline at 12 months;
  SER change from baseline at 24 months, as measured by cycloplegic auto-refraction;
  Proportion of subjects whose myopic progression based on SER change from baseline as measured by cycloplegic auto-refraction is less than 1.00 D at 36 months.
Exploratory Endpoints
  For each test arm vs. control:
  SER change from baseline at 12 months, as measured by cycloplegic auto-refraction;
  Proportion of subjects whose myopic progression based on SER change from baseline as measured by cycloplegic auto-refraction at 36 months is (with each cutpoint for status analyzed separately):
    Less than 1.25 D;
    Less than 0.75 D;
    Less than 0.50 D; or
    Less than 0.25 D.
  Proportion of subjects whose SER as measured by cycloplegic autorefraction is −5.00 D or better at 36 months.
  Explore the effect of the following factors on axial length and SER change from baseline:
    Cone opsin haplotype
    Highest degree of exon skipping
    Baseline refractive error
    Baseline age
    Number of myopic parents
    Compliance with wearing study spectacles
  Change from baseline in Vitreous Chamber Depth (VCD) at each visit
  All analyses performed for each test group are performed for both test groups pooled vs. control.
Safety Evaluations
  Adverse Events
  Device Deficiencies
  Stereopsis
  Best-corrected visual acuity (BCVA)
  Monocular and binocular high contrast logMAR distance visual acuity with assigned spectacles
  Monocular low contrast logMAR distance visual acuity with assigned spectacles
  Peripheral visual acuity testing
  Symptoms, problems, and complaints Statistical Methods The main analysis of the primary efficacy outcome measures will be on the modified intent-to-treat (mITT) population, which is a subset of intent-to-treat subjects excluding those without a baseline value for either axial length or SER (as measured by cycloplegic auto-refraction).

Adverse events are tabulated by incidence overall, by device related, maximum severity, and those resulting in study discontinuation. Serious adverse events are listed. Data summarized as well as additional collected data are provided in supporting line listings. Ocular assessments such as BCVA, biomicroscopic slit lamp and ophthalmoscopy findings are summarized descriptively.

Interim Analysis

The study has an interim analysis (IA) on the 12-month and 24-month data. The IA evaluates the change from baseline in axial length and spherical equivalent refraction, as well as the adverse events.

Schedule of Assessments

| Procedure | Visit 0 Screening Day −28 to −7 | Visit 1 Baseline Day 0 | Visit 2 Day 30 +/− 7 days | Visit 3 Month 6 $^2$ +/− 21 days | Visit 3a ~1-2 weeks after Visit 3 | Visit 4 Month 12 $^2$ +/− 21 days | Visit 4a ~1-2 weeks after Visit 4 | Visit 5 Month 18 $^2$ +/− 21 days |
|---|---|---|---|---|---|---|---|---|
| Informed consent/assent | X | — | — | — | — | — | — | — |
| Demographics | X | — | — | — | — | — | — | — |
| Ocular and medical history and # of myopic parents | X | — | — | — | — | — | — | — |
| Concomitant medication/therapy review | X | X | X | X | — | X | — | X |
| Inclusion/exclusion criteria | X | — | — | — | — | — | — | — |
| Randomization | X | — | — | — | — | — | — | — |
| Auto-refraction (non-cycloplegic) | X | — | — | X | — | X | — | X |
| Monocular high contrast logMAR dist. visual acuity with habitual spectacles | X | X | — | — | — | — | — | — |
| Binocular high contrast logMAR dist. visual acuity with habitual spectacles | X | — | — | — | — | — | — | — |
| Monocular low contrast logMAR dist. visual acuity with habitual spectacles | X | — | — | — | — | — | — | — |
| Binocular high contrast logMAR near visual acuity with habitual spectacles | — | X | — | — | — | — | — | — |
| Monocular scotopic, low mesopic, and high mesopic pupil size | X | — | — | — | — | X | — | — |
| Color vision | X | — | — | — | — | — | — | — |
| Stereopsis | X$^3$ | — | X | X | — | X | — | X |
| Manifest refraction and BCVA (logMAR) | X$^3$ | — | — | X | — | X | — | X |
| Slit-lamp examination | X | X | — | — | — | X | — | — |
| Order study spectacles | X | — | — | X$^4$ | — | X$^4$ | — | X$^4$ |
| Monocular high contrast logMAR dist. visual acuity with existing study spectacles | — | — | X | X | — | X | — | X |
| Binocular high contrast logMAR dist. visual acuity with existing study spectacles | — | — | X | — | — | — | — | — |
| Monocular low contrast logMAR dist. visual acuity with existing study spectacles | — | — | — | — | — | — | — | — |
| Binocular high contrast logMAR near visual acuity with existing spectacles | — | — | — | — | — | — | — | — |
| Collect habitual spectacles | — | X | — | — | — | — | — | — |
| Dispense new study spectacles | — | X | — | X$^6$ | — | X$^6$ | — | X$^6$ |
| Monocular high contrast logMAR dist. visual acuity with new study spectacles | — | X | — | X$^6$ | — | X$^6$ | — | X$^6$ |
| Binocular high contrast logMAR visual dist. acuity with new study spectacles | — | X | — | X$^6$ | — | X$^6$ | — | X$^6$ |
| Monocular low contrast logMAR visual dist. acuity with new study spectacles | — | X | — | — | — | X$^6$ | — | — |
| Binocular high contrast logMAR near visual acuity with new study spectacles | — | X | — | — | — | X$^6$ | — | — |
| Ocular biometry (after the subject is awake for at least 2 hours) | X | X$^3$ | X | X | — | X | — | X |
| Peripheral visual acuity testing | X$^3$ | — | — | — | — | X | — | — |

-continued

| Procedure | | | | | | | | |
|---|---|---|---|---|---|---|---|---|
| Cycloplegic auto-refraction | — | X | — | — | — | X | — | — |
| Dilated fundus examination | — | X | — | — | — | X | — | — |
| Parent questionnaire | X[3] | — | X | X | — | X | — | X |
| Subject questionnaire | X[3] | — | X | X | — | X | — | X |
| Adverse events | X | X | X | X | X | X | X | X |
| Device deficiencies | — | X | X | X | X | X | X | X |
| Saliva collection[7] | — | — | X | — | — | — | — | — |
| Collect study spectacles | — | — | — | X[6] | — | X[6] | — | X[6] |
| Compliance | Will be assessed at-home via electronic data capture approximately every 2 weeks ||||||||

| Procedure | Visit 5a ~1-2 weeks after Visit 5 | Visit 6 Month 24[2] +/− 21 days | Visit 6a ~1-2 weeks after Visit 6 | Visit 7 Month 30[2] +/− 21 days | Visit 7a ~1-2 weeks after Visit 7 | Visit 8 Month 36[2] +/− 21 days or Exit | U/S visit[1] As needed |
|---|---|---|---|---|---|---|---|
| Informed consent/assent | — | — | — | — | — | — | — |
| Demographics | — | — | — | — | — | — | — |
| Ocular and medical history and # of myopic parents | — | — | — | — | — | — | — |
| Concomitant medication/therapy review | — | X | — | X | — | X | X |
| Inclusion/exclusion criteria | — | — | — | — | — | — | — |
| Randomization | — | — | — | — | — | — | — |
| Auto-refraction (non-cycloplegic) | — | X | — | X | — | X | X |
| Monocular high contrast logMAR dist. visual acuity with habitual spectacles | — | — | — | — | — | — | — |
| Binocular high contrast logMAR dist. visual acuity with habitual spectacles | — | — | — | — | — | — | — |
| Monocular low contrast logMAR dist. visual acuity with habitual spectacles | — | — | — | — | — | — | — |
| Binocular high contrast logMAR near visual acuity with habitual spectacles | — | — | — | — | — | — | — |
| Monocular scotopic, low mesopic, and high mesopic pupil size | — | X | — | — | — | X | — |
| Color vision | — | — | — | — | — | — | — |
| Stereopsis | — | X | — | X | — | X | — |
| Manifest refraction and BCVA (logMAR) | — | X | — | X | — | X | X |
| Slit-lamp examination | — | X | — | — | — | X | X |
| Order study spectacles | — | X[4] | — | X[4] | — | — | — |
| Monocular high contrast logMAR dist. visual acuity with existing study spectacles | — | X | — | X | — | X[5] | — |
| Binocular high contrast logMAR dist. visual acuity with existing study spectacles | — | — | — | — | — | X[5] | — |
| Monocular low contrast logMAR dist. visual acuity with existing study spectacles | — | — | — | — | — | X[5] | — |
| Binocular high contrast logMAR near visual acuity with existing spectacles | — | — | — | — | — | X[5] | — |
| Collect habitual spectacles | — | — | — | — | — | — | — |
| Dispense new study spectacles | X[6] | X[6] | — | X[6] | — | — | — |
| Monocular high contrast logMAR dist. visual acuity with new study spectacles | X[6] | X[6] | — | X[6] | — | — | — |
| Binocular high contrast logMAR visual dist. acuity with new study spectacles | X[6] | X[6] | — | X[6] | — | — | — |
| Monocular low contrast logMAR visual dist. acuity with new study spectacles | — | X[6] | — | — | — | — | — |
| Binocular high contrast logMAR near visual acuity with new study spectacles | — | X[6] | — | — | — | — | — |
| Ocular biometry (after the subject is awake for at least 2 hours) | — | X | — | X | — | X | — |
| Peripheral visual acuity testing | — | X | — | — | — | X | — |
| Cycloplegic auto-refraction | — | X | — | — | — | X | — |
| Dilated fundus examination | — | X | — | — | — | X | — |

-continued

| | | | | | | | |
|---|---|---|---|---|---|---|---|
| Parent questionnaire | — | X | — | X | — | X | — |
| Subject questionnaire | — | X | — | X | — | X | — |
| Adverse events | X | X | X | X | X | X | X |
| Device deficiencies | X | X | X | X | X | X | X |
| Saliva collection[7] | — | — | — | — | — | — | — |
| Collect study spectacles | X[6] | X[6] | | X[6] | | X | — |
| Compliance | Will be assessed at-home via electronic data capture approximately every 2 weeks | | | | | | |

[1] Unscheduled visit - minimum assessments required.
[2] For clarity, Visits 3-8 are to be scheduled relative to Visit 1 (Day 0). For example, if the Baseline visit occurs on Aug. 15$^{th}$, 2018, then Visit 5 (month 18 ± 21 days) should be targeted for Feb. 15$^{th}$, 2020 and occur between Jan. 25$^{th}$, 2020 and Mar. 7$^{th}$, 2020.
[3] To be considered baseline assessment.
[4] All spectacle lenses will be replaced every 6 months, even if a prescription update not warranted. Spectacle frames can be replaced at Months 12 and 24 or sooner in case of breakage. Spectacle prescription must be updated if ≥0.50 D manifest SER change is found in either eye or deemed necessary to improve vision.
[5] If necessary, a handheld ophthalmic trial lens should be utilized to correct any spherical over-refraction for this assessment.
[6] Collection of existing study spectacles, dispensing of new study spectacles, and visual acuity measurements with new study spectacles at Months 6, 12, 18, 24, and 30 may need to occur approximately 1-2 weeks after visit to allow for manufacturing and shipment of new study spectacles.
[7] Highly encouraged, but not mandatory for subject to participate in study.

OTHER EMBODIMENTS

It is to be understood that while the invention has been described in conjunction with the detailed description thereof, the foregoing description is intended to illustrate and not limit the scope of the invention, which is defined by the scope of the appended claims.

Other aspects, advantages, and modifications are within the scope of the following claims.

What is claimed is:

1. A method for reducing progression of myopia in a human child having, or suspected of having, myopia, the method comprising:
   identifying the human child having, or suspected of having, myopia; and
   treating the human child with spectacles comprising at least one myopia control spectacle lens, wherein the myopia control spectacle lens comprises (i) a clear aperture, and (ii) a surrounding annular region, both (i) and (ii) substantially centered on a lens axis, the clear aperture corresponding to the central region and the annular region corresponding to the peripheral region and comprising a plurality of spaced apart scattering centers sized and shaped to scatter incident light, and
   wherein said myopia control spectacle lens provides normal visual acuity to the human child when viewed through a central region of the lens and reduced visual acuity for the when viewed through a peripheral region of the lens, and wherein said myopia control spectacle lens reduces myopia progression in the human child by 0.4 D or more after three years of treatment compared to a control group.

2. The method of claim 1, wherein the reduced visual acuity is provided by a dot pattern in the peripheral region of the lens.

3. The method of claim 1, wherein treating the human child comprises treating both of the human child's eyes with corresponding myopia control spectacle lenses.

4. The method of claim 1, wherein, at the time of the identifying, the human child is younger than 12 years old.

5. The method of claim 4, wherein, at the time of the identifying, the human child is 6 to 10 years old.

6. The method of claim 1, wherein the scattering centers are formed on a surface of the myopia control spectacle lens.

7. The method of claim 1, wherein the scattering centers have a diameter of 0.2 mm or less.

8. The method of claim 1, wherein, in the annular region, the scattering centers have an average density in a range from 2 to 5 per mm".

9. The method of claim 1, wherein the scattering centers are arranged in a pattern that includes a random variation in spacing between adjacent dots and/or a random variation in dot size.

10. The method of claim 9, wherein the scattering centers are positioned relative to a regular array of lattice sites, wherein each scattering center is displaced in at least one dimension from a corresponding one of the lattice sites by an amount equal to or less than a jitter amplitude, the jitter amplitude being a fraction of the distance between adjacent lattice sites.

11. The method of claim 10, wherein the jitter amplitude is 0.5 or less.

12. The method of claim 1, wherein the annular region corresponds to an area of 50% or more of the lens surface.

13. The method of claim 1, wherein the myopia control spectacle lens has optical power to correct the human's on-axis vision to 20/20 or better through the central region, and, corrects the human's vision to 20/25 or better through the peripheral region.

14. The method of claim 1, wherein the child, prior to said treatment, has a spherical equivalent refractive error between −0.75 diopters and −4.50 diopters in at least one eye.

15. The method of claim 1, wherein said spectacles reduce myopia progression by at least 0.20 mm as measured by axial length change from baseline.

16. The method of claim 1, wherein said spectacles reduce myopia progression by at least 0.46 D as measured by autorefraction change from baseline.

17. The method of claim 1, wherein said treatment comprises wearing said spectacles for at least 6 hours per day.

18. The method of claim 1, wherein said treatment comprises using said spectacles for at least 12 months.

19. The method of claim 1, wherein said myopia control spectacle lens is made from polycarbonate or a urethane-based monomer.

20. The method of claim 1, wherein said child has a genetic pre-disposition for myopia progression.

21. The method of claim 1, wherein said child is less than 8 years old when initiating therapy with said spectacles, and said reduction in myopia progression is greater than 0.20 D after 3 years.

22. The method of claim 1, wherein said child is less than 8 years old when initiating therapy with said spectacles, and said reduction in myopia progression is greater than 15% after 3 years.

23. Spectacles for reducing progression of myopia in a human child, the spectacles comprising at least one myopia control spectacle lens comprising a single vision region and a myopia control region, wherein the myopia control spectacle lens comprises (i) a clear aperture, and (ii) a surrounding annular region, both (i) and (ii) substantially centered on a lens axis, the clear aperture corresponding to the central region and the annular region corresponding to the peripheral region and comprising a plurality of spaced apart scattering centers sized and shaped to scatter incident light, and wherein the myopia control spectacle lens reduces myopia progression in the human child by 0.4 D or more after three years of treatment compared to a control group.

* * * * *

UNITED STATES PATENT AND TRADEMARK OFFICE
CERTIFICATE OF CORRECTION

| | | |
|---|---|---|
| PATENT NO. | : 12,092,905 B2 | Page 1 of 1 |
| APPLICATION NO. | : 17/259779 | |
| DATED | : September 17, 2024 | |
| INVENTOR(S) | : Joseph Michael Rappon et al. | |

It is certified that error appears in the above-identified patent and that said Letters Patent is hereby corrected as shown below:

In the Claims

Column 49, Claim 8, Line 67 delete "mm" and insert -- $mm^{2-}$ --.

Signed and Sealed this
Twenty-fourth Day of June, 2025

Coke Morgan Stewart
*Acting Director of the United States Patent and Trademark Office*